United States Patent
Kurosawa

(10) Patent No.: US 11,926,994 B2
(45) Date of Patent: Mar. 12, 2024

(54) EXCAVATOR, DISPLAY DEVICE FOR EXCAVATOR, AND TERMINAL APPARATUS

(71) Applicant: SUMITOMO CONSTRUCTION MACHINERY CO., LTD., Tokyo (JP)

(72) Inventor: Ryota Kurosawa, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 372 days.

(21) Appl. No.: 17/232,272

(22) Filed: Apr. 16, 2021

(65) Prior Publication Data

US 2021/0230841 A1 Jul. 29, 2021

Related U.S. Application Data

(63) Continuation of application No. PCT/JP2019/041180, filed on Oct. 18, 2019.

(30) Foreign Application Priority Data

Oct. 19, 2018 (JP) ................. 2018-197615

(51) Int. Cl.
*E02F 9/26* (2006.01)
*E02F 9/20* (2006.01)

(52) U.S. Cl.
CPC ............ *E02F 9/261* (2013.01); *E02F 9/2033* (2013.01)

(58) Field of Classification Search
None
See application file for complete search history.

(56) References Cited

U.S. PATENT DOCUMENTS

| | | | | |
|---|---|---|---|---|
| 9,030,332 B2* | 5/2015 | Tafazoli Bilandi | ..... | E02F 9/262 |
| | | | | 348/222.1 |
| 10,544,567 B2* | 1/2020 | Petrany | ............... | E02F 9/205 |
| 2012/0327261 A1 | 12/2012 | Tafazoli Bilandi et al. | | |
| 2013/0182066 A1 | 7/2013 | Ishimoto | | |
| 2014/0375814 A1* | 12/2014 | Ishimoto | ............... | H04N 7/183 |
| | | | | 348/148 |
| 2015/0217976 A1 | 8/2015 | Tanizumi et al. | | |
| 2017/0036602 A1* | 2/2017 | Kröll | ............... | E02F 3/181 |
| 2017/0191243 A1 | 7/2017 | Sharp et al. | | |
| 2017/0344221 A1 | 11/2017 | Hokkanen et al. | | |

FOREIGN PATENT DOCUMENTS

| | | |
|---|---|---|
| JP | 2003-105807 | 4/2003 |
| JP | 2012-074929 | 4/2012 |
| JP | 2014-051332 | 3/2014 |
| JP | 2014-224410 | 12/2014 |
| JP | 2018-017115 | 2/2018 |
| JP | 2018-035669 | 3/2018 |
| JP | 2018-135759 | 8/2018 |

OTHER PUBLICATIONS

International Search Report for PCT/JP2019/041180 dated Dec. 3, 2019.

* cited by examiner

*Primary Examiner* — K. Wong
(74) *Attorney, Agent, or Firm* — IPUSA, PLLC

(57) ABSTRACT

An excavator includes a display device configured to display an image representing a work area around the excavator. The display device is configured to display the image in such a state that coordinates that are predefined with respect to the work area and an image component portion included in the image are associated with each other.

12 Claims, 20 Drawing Sheets

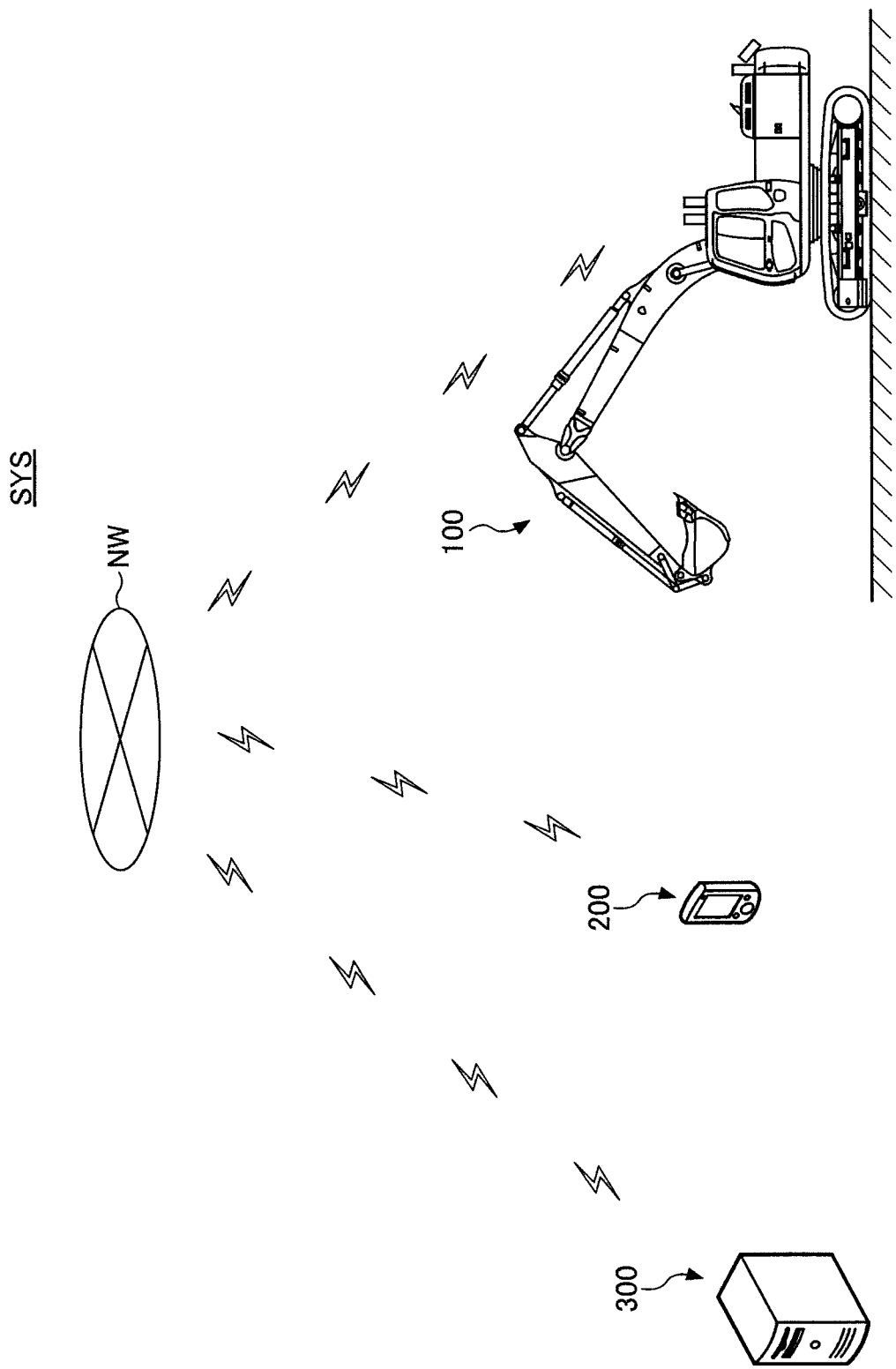

EXCAVATOR, DISPLAY DEVICE FOR EXCAVATOR, AND TERMINAL APPARATUS

CROSS-REFERENCE TO RELATED APPLICATION

The present application is a continuation of International Application No. PCT/JP2019/041180 filed on Oct. 18, 2019, which is based on and claims priority to Japanese Patent Application No. 2018-197615, filed on Oct. 19, 2018. The contents of these applications are incorporated herein by reference in their entirety.

BACKGROUND OF THE INVENTION

1. Field of the Invention

The present disclosure relates to an excavator.

2. Description of the Related Art

Conventionally, a technique is known in which an excavator can recognize an object by attaching an identification mark or the like to a predetermined object in the work area around the excavator.

Such a technique allows the excavator to recognize a predetermined object in the work area (e.g., an obstacle present in the work area, a specific location in the work area, etc.) by using, for example, an imaging device. Therefore, the excavator can make settings relating to the work area based on the position of the recognized object (for example, setting an object to be avoided in the work area or setting a waste soil disposal site and the like as the work target in the work area).

SUMMARY OF THE INVENTION

According to one aspect of the present invention, there is provided an excavator including a display device configured to display an image representing a work area around the excavator, wherein the display device is configured to display the image in such a state that coordinates that are preset with respect to the work area and an image component portion included in the image are associated with each other.

BRIEF DESCRIPTION OF THE DRAWINGS

FIG. 14 is a diagram illustrating an example of a configuration of an excavator management system.

DETAILED DESCRIPTION OF THE PREFERRED EMBODIMENTS

Figure 1A:
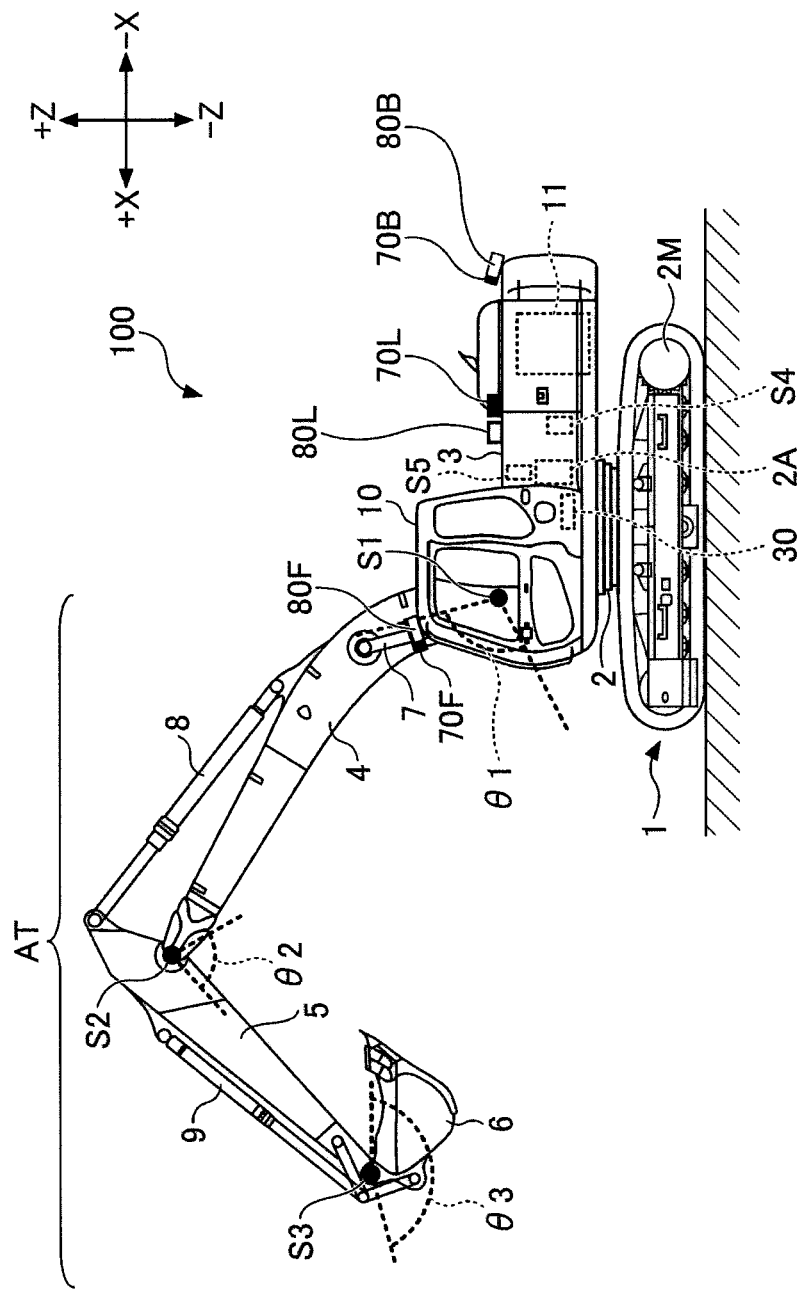
FIG. 1A is the external view of an excavator.

In the related art described above, it is necessary for the operator of the excavator or a worker or the like in the surroundings to attach the identification mark or the like on the object beforehand, and, therefore, the workability may be degraded.

Therefore, in view of the above, it is desirable to provide an excavator capable of making settings relating to the work area while considering the workability.

Hereinafter, an embodiment for carrying out the invention with reference to the drawings will be described.

In the description of the present embodiment, the same or corresponding elements are denoted by the same reference numerals, and overlapping descriptions may be omitted.

<Overview of Excavator>

Figure 1B:
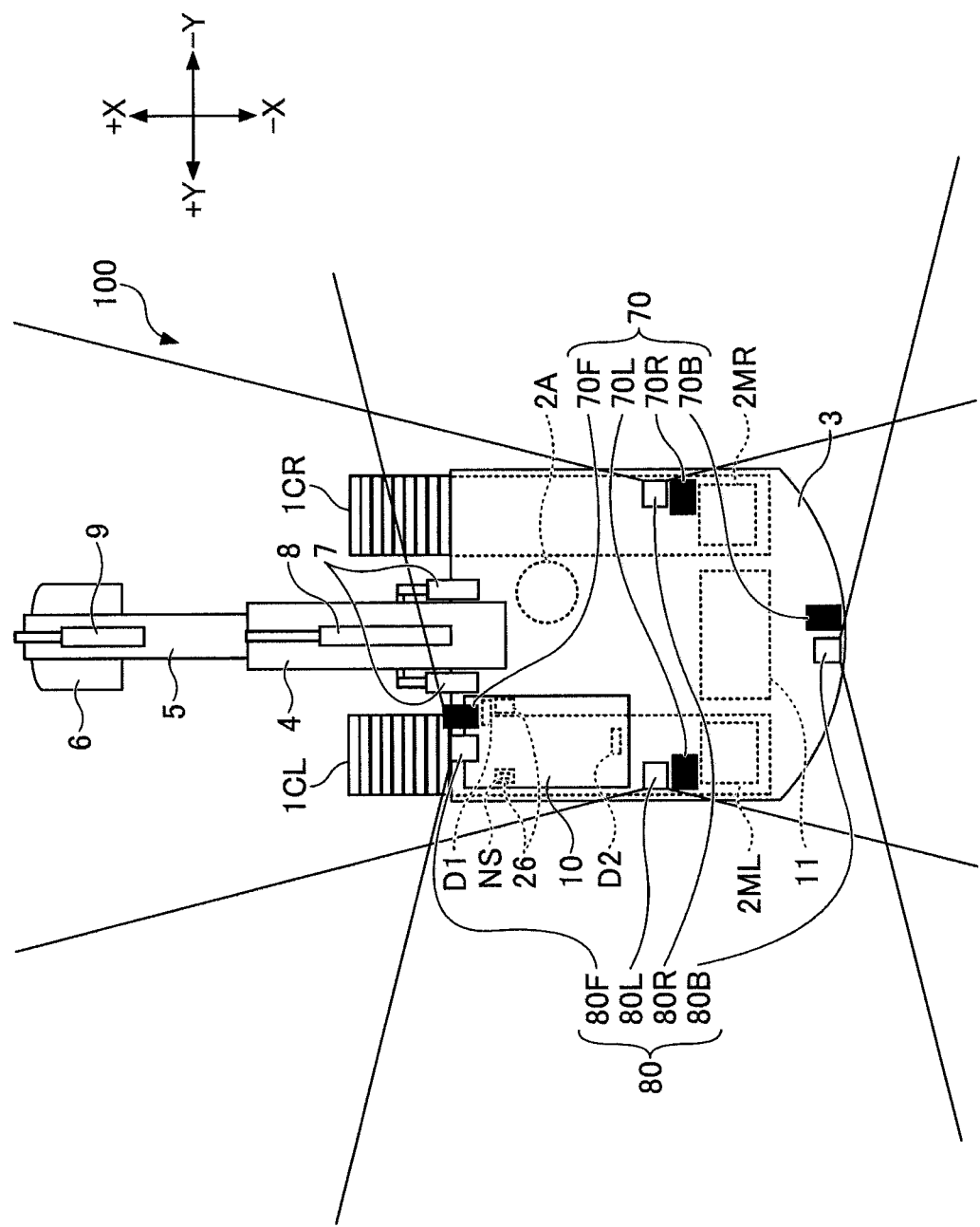
FIG. 1B is the external view of the excavator.

First, an outline of an excavator 100 according to the present embodiment will be described with reference to FIG. 1 (FIGS. 1A and 1B).

FIGS. 1A and 1B are exterior views of the excavator 100 according to the present embodiment. Specifically, FIG. 1A is a side view of the excavator 100 and FIG. 1B is a top view of the excavator 100.

The excavator 100 according to the present embodiment includes a lower traveling body 1; an upper turning body 3 mounted to the lower traveling body 1 in a turnable manner via a turning mechanism 2; a boom 4, an arm 5, and a bucket 6 constituting an attachment AT; and a cabin 10.

The lower traveling body 1 includes a pair of left and right crawlers 1C, specifically, a left crawler 1CL and a right crawler 1CR. The lower traveling body 1 causes the excavator 100 to travel by hydraulically driving the left crawler 1CL and the right crawler 1CR with a traveling hydraulic motor 2M, respectively. The traveling hydraulic motor 2M includes a traveling hydraulic motor 2ML for driving the left crawler 1CL and a traveling hydraulic motor 2MR for driving the right crawler 1CR.

The upper turning body 3 is driven by a turning hydraulic motor 2A to rotate relative to the lower traveling body 1. The upper turning body 3 may be electrically driven by an electric motor instead of being hydraulically driven by the turning hydraulic motor 2A. Hereinafter, as a matter of convenience, the side on which the attachment AT is mounted of the upper turning body 3 is the front side, and the side on which a counterweight is mounted is the back side.

The boom 4 is pivotally mounted to the front center of the upper turning body 3 so as to be elevated, the arm 5 is pivotally mounted to the leading end of the boom 4 so as to turn upward and downward, and the bucket 6 is pivotally mounted to the leading end of the arm 5 so as to turn upward and downward. The boom 4, the arm 5, and the bucket 6 are hydraulically driven by a boom cylinder 7, an arm cylinder 8, and a bucket cylinder 9, respectively, as hydraulic actuators.

The cabin 10 is an operator's cabin where an operator is seated, and is mounted on the front left side of the upper turning body 3.

<Example of Excavator>

Next, an example of the excavator 100 according to the present embodiment will be described in detail with reference to FIGS. 2 to 8 in addition to FIGS. 1A and 1B.

(Configuration of Excavator)

First, the configuration of the excavator 100 according to the present example will be described with reference to FIGS. 1 to 5.

Figure 2:
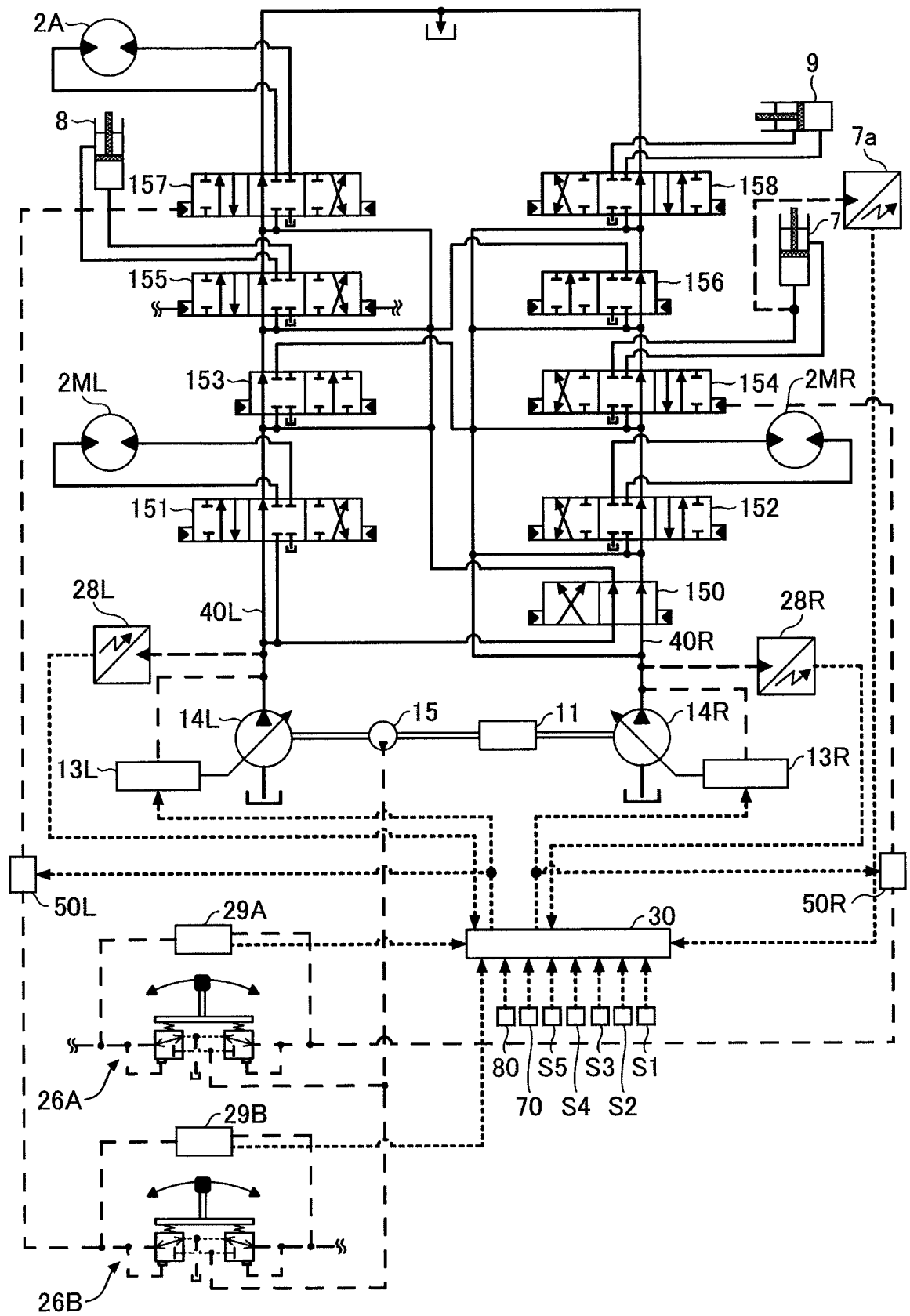
FIG. 2 is a schematic diagram illustrating an example of a configuration centering around a hydraulic system of the excavator.
Figure 3A:
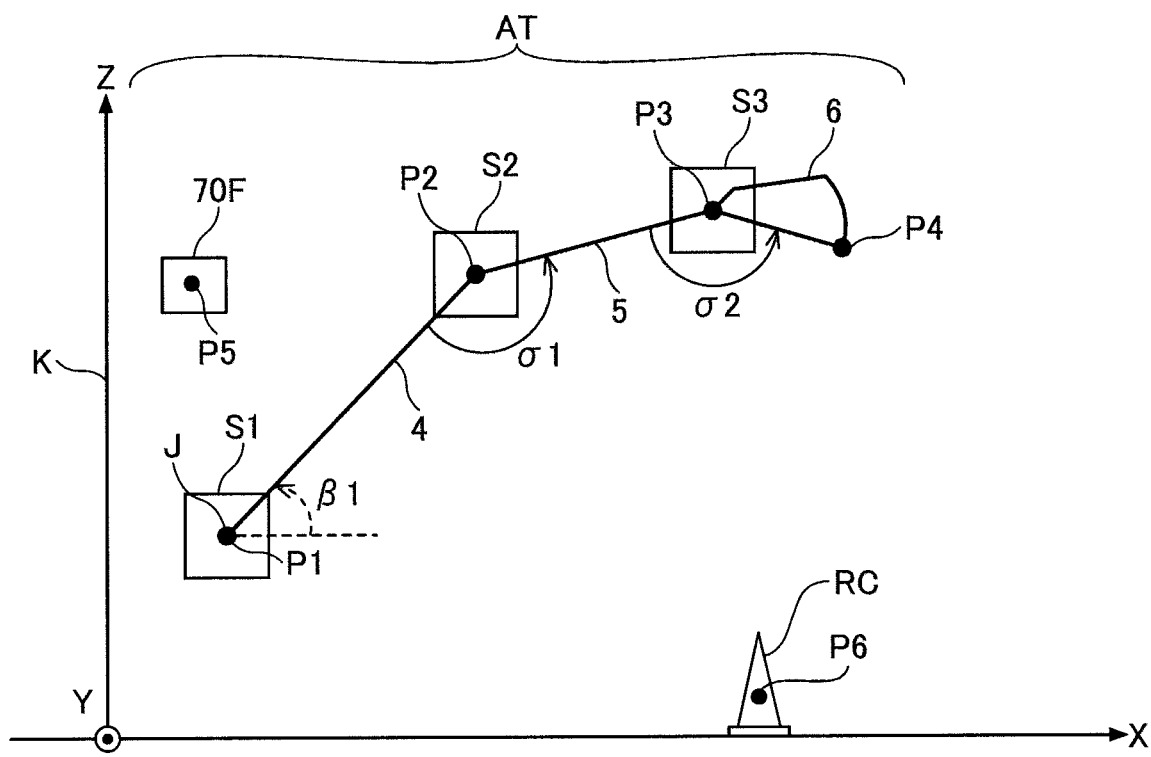
FIG. 3A is a diagram illustrating the positional relationship of each component part of the excavator and the positional relationship of the excavator and surrounding objects.
Figure 3B:
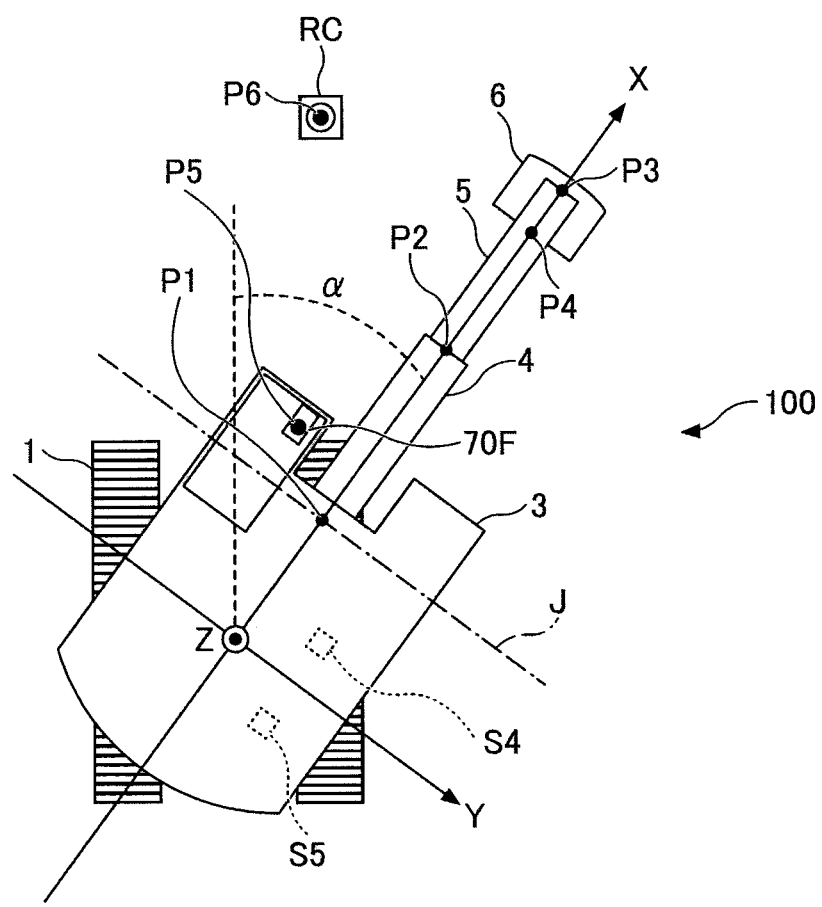
FIG. 3B is a diagram illustrating the positional relationship of each component part of the excavator and the positional relationship of the excavator and surrounding objects.
Figure 4:
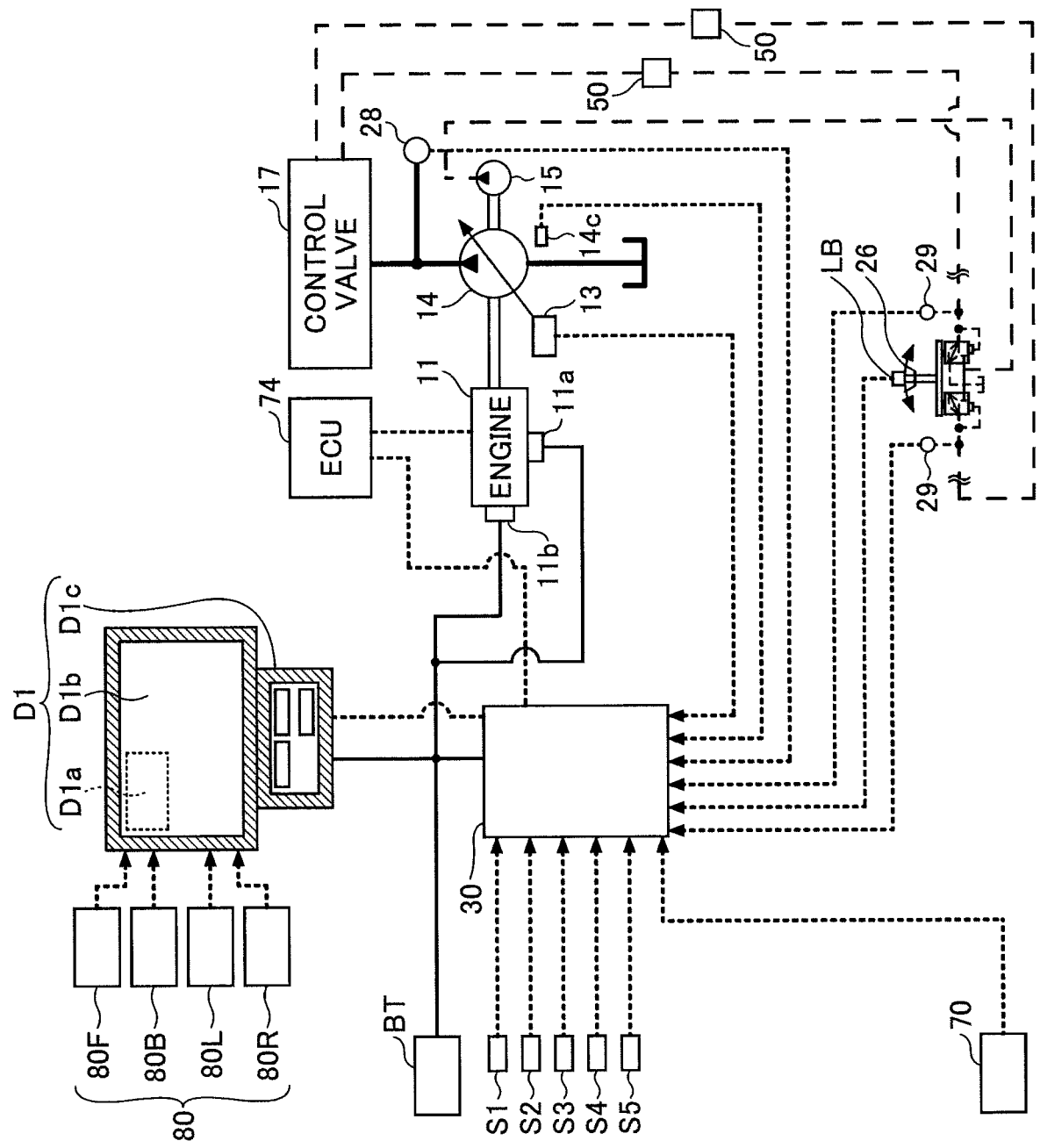
FIG. 4 is a schematic diagram illustrating an example of a configuration centering around a control system of the excavator.
Figure 5:
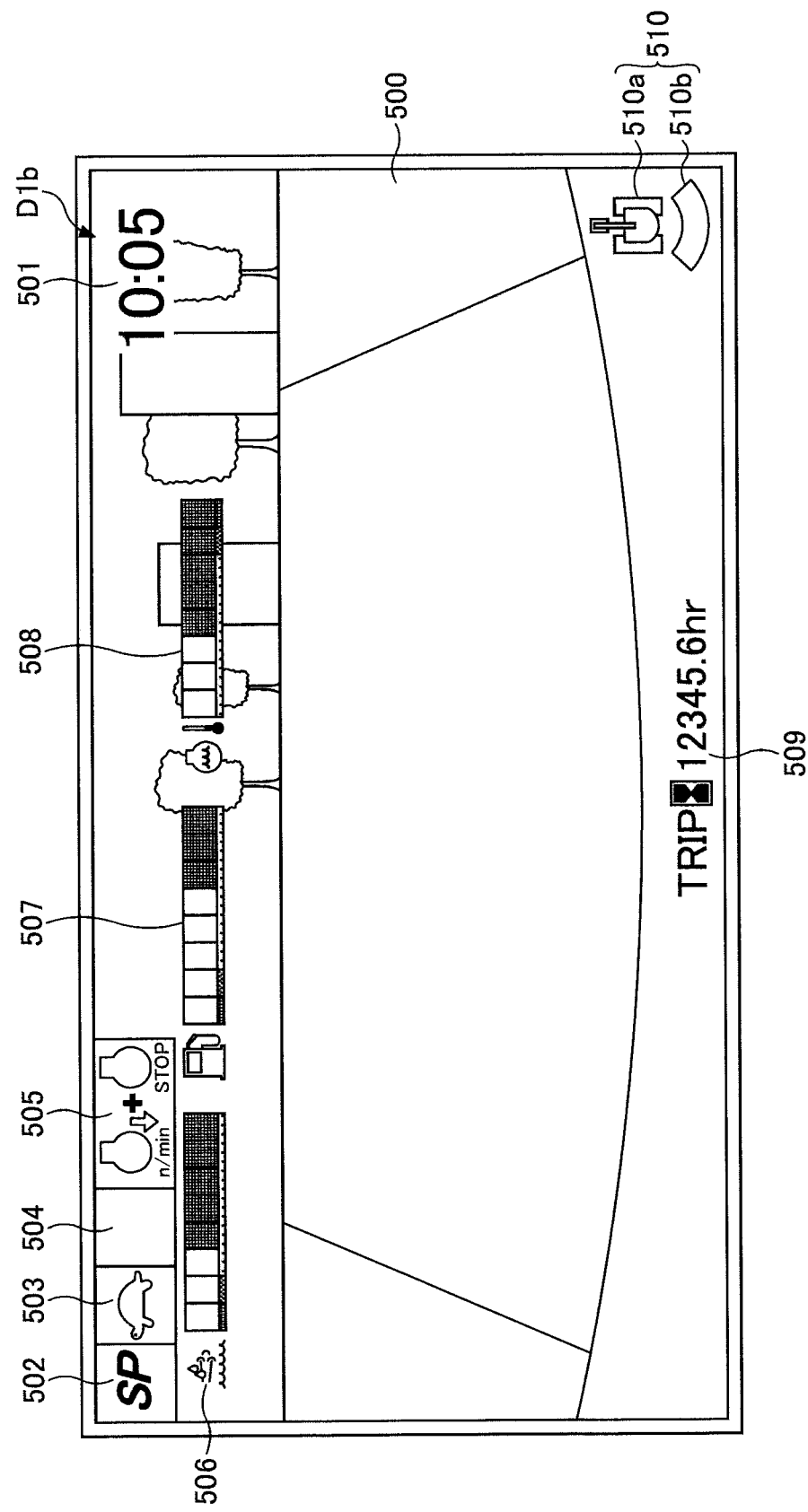
FIG. 5 is a diagram illustrating an example of the display contents of a display device in the surrounding image mode.

FIG. 2 is a schematic diagram illustrating an example of a configuration centering around the hydraulic system of the excavator 100 according to the present embodiment. FIG. 3 (FIGS. 3A and 3B) illustrates the positional relationship of the respective components of the excavator 100 and the positional relationship between the excavator 100 and a surrounding object (in this example, a road cone RC). Specifically, FIGS. 3A and 3B are diagrams illustrating the positional relationship between the respective components of the excavator 100 and the positional relationship between the excavator 100 and surrounding object, viewed from the right side and the top of the excavator 100, respectively. FIG. 4 is a schematic diagram illustrating an example of a configuration centering around a control system of the excavator 100. FIG. 5 is a diagram illustrating an example of the display contents of a display device in a camera mode.

In FIG. 2, the mechanical power transmission system, a hydraulic oil line, a pilot line, and an electrical control system are represented by double lines, solid lines, dashed lines, and dotted lines, respectively. In FIG. 4, the mechanical power transmission system, the hydraulic oil line, the pilot line, the electrical control system, and the power supply system are represented by double lines, thick solid lines, dashed lines, dotted lines, and thin solid lines, respectively. In FIG. 3A, for the sake of clarity, the attachment AT is illustrated as a simplified model, upon omitting the illustration of the elements other than the attachment AT among the main elements of the excavator 100.

The excavator 100 according to the present example includes the traveling hydraulic motors 2ML and 2MR for hydraulically driving the lower traveling body 1, the upper turning body 3, the boom 4, the arm 5, and the bucket 6, respectively, as the turning hydraulic motor 2A, the boom cylinder 7, the arm cylinder 8, and the bucket cylinder 9, as a configuration relating to the hydraulic system, as described above. Further, the excavator 100 according to the present example includes an engine 11, a regulator 13, a main pump 14, a pilot pump 15, a control valve 17, an operation device 26, a discharge pressure sensor 28, an operation pressure sensor 29, and a decompression valve 50 as configurations relating to the hydraulic system.

The engine 11 is the main power source of the hydraulic system and is mounted, for example, at the back of the upper turning body 3. Specifically, the engine 11 constantly rotates at a predetermined target revolution speed under the control of an ECU 74 to drive the main pump 14 and the pilot pump 15 or the like. The engine 11 is, for example, a diesel engine fueled with diesel oil.

The regulator 13 controls the discharge amount of the main pump 14. For example, the regulator 13 adjusts the angle ("tilt angle") of the swash plate of the main pump 14 in response to control instructions from a controller 30. The regulator 13 includes regulators 13L and 13R respectively corresponding to main pumps 14L and 14R described below.

The main pump 14, for example, similarly to the engine 11, is mounted at the back of the upper turning body 3 and is driven by the engine 11 as described above to supply hydraulic oil to the control valve 17 through a high pressure hydraulic line. The main pump 14 is, for example, a variable capacity hydraulic pump, and as described above, under the control of the controller 30, the length of the piston stroke is adjusted as the regulator 13 adjusts the tilt angle of the swash plate, and the discharge flow rate (discharge pressure) is controlled. The main pump 14 includes the main pumps 14L and 14R.

The pilot pump 15, for example, is mounted at the back of the upper turning body 3 and provides pilot pressure to the operation device 26 through a pilot line. The pilot pump 15 is, for example, a fixed capacitive hydraulic pump driven by the engine 11 as described above.

The control valve 17 is, for example, mounted at the center of the upper turning body 3, and is a hydraulic control device that controls the hydraulic actuator in response to an operation to the operation device 26 by an operator. As described above, the control valve 17 is connected to the main pump 14 through a high pressure hydraulic line and selectively supplies hydraulic oil supplied from the main pump 14 to a hydraulic actuator (the traveling hydraulic motors 2ML and 2MR, the turning hydraulic motor 2A, the boom cylinder 7, the arm cylinder 8, and the bucket cylinder 9), according to the operation state at the operation device 26. Specifically, the control valve 17 includes control valves 150 to 158 (see FIG. 2) for controlling the flow rate and flow direction and the like of hydraulic oil supplied from the main pump 14 to each of the hydraulic actuators.

As illustrated in FIG. 2, the hydraulic system of the excavator 100 circulates hydraulic oil from the main pumps 14L and 14R driven by the engine 11 to a hydraulic oil tank through center bypass pipelines 40L and 40R.

The center bypass pipeline 40L starts at the main pump 14L and passes through control valves 151, 153, 155, and 157 disposed within the control valve 17, in the stated order, to reach the hydraulic oil tank.

The center bypass pipeline 40R starts at the main pump 14R and passes through the control valves 150, 152, 154, 156, and 158 disposed within the control valve 17, in the stated order, to reach the hydraulic oil tank.

The control valve 150 is provided at the most upstream of the center bypass pipeline 40R and is a spool valve that switches between supplying hydraulic oil from the main pumps 14L and 14R to the traveling hydraulic motors 2ML and 2MR, respectively, or supplying hydraulic oil from one main pump 14L to both the traveling hydraulic motors 2ML and 2MR. Specifically, when the traveling hydraulic motor 2ML, the traveling hydraulic motor 2MR, and other hydraulic actuators are operated simultaneously, the control valve 150 causes the hydraulic oil upstream of the center bypass pipeline 40R to flow into the parallel pipeline disposed in parallel with the center bypass pipeline 40L so as to be supplied to the control valves 153, 155, and 157 downstream of the control valve 151, and causes the hydraulic oil upstream of the control valve 151 in the center bypass pipeline 40L to flow into the downstream side of the center bypass pipeline 40R. Therefore, when the traveling hydraulic motor 2ML, the traveling hydraulic motor 2MR, and other actuators are operated simultaneously, the traveling hydraulic motor 2ML and the traveling hydraulic motor 2MR are driven by hydraulic oil supplied from one main pump 14L, and, therefore, the direct advancing property of the lower traveling body 1 is improved. On the other hand, when the other hydraulic actuators are not operated, the control valve 150 causes the hydraulic oil upstream of the center bypass pipeline 40R to pass directly to the downstream side, and causes the hydraulic oil upstream of the center bypass pipeline 40L to flow into the parallel pipeline disposed in parallel with the center bypass pipeline 40L so as to be supplied to the control valves 153, 155, and 157. Therefore, hydraulic oil from the main pumps 14L and 14R is supplied to the traveling hydraulic motor 2ML and the traveling hydraulic motor 2MR, respectively.

The control valve 151 is a spool valve that supplies hydraulic oil discharged from the main pump 14L to the traveling hydraulic motor 2ML and discharges the hydraulic oil in the traveling hydraulic motor 2ML to the hydraulic oil tank.

The control valve 152 is a spool valve that supplies hydraulic oil discharged from the main pumps 14L and 14R to the traveling hydraulic motor 2MR and discharges the hydraulic oil in the traveling hydraulic motor 2MR to the hydraulic oil tank.

The control valve 153 is a spool valve that supplies the hydraulic oil discharged from the main pumps 14L and 14R to the boom cylinder 7.

The control valve 154 is a spool valve that supplies hydraulic oil discharged from the main pump 14R to the boom cylinder 7 and discharges the hydraulic oil in the boom cylinder 7 to the hydraulic oil tank.

The control valve 155 is a spool valve that supplies hydraulic oil discharged from the main pumps 14L and 14R to the arm cylinder 8 and discharges hydraulic oil from the arm cylinder 8 to the hydraulic oil tank.

The control valve 156 is a spool valve that switches the flow of hydraulic oil to supply hydraulic oil discharged from the main pump 14R to the arm cylinder 8.

The control valve 157 is a spool valve that circulates hydraulic oil discharged from the main pumps 14L and 14R by the turning hydraulic motor 2A.

The control valve 158 is a spool valve that supplies hydraulic oil discharged from the main pump 14R to the bucket cylinder 9 and discharges the hydraulic oil in the bucket cylinder 9 to the hydraulic oil tank.

The operation device 26 is provided near the operator's seat of the cabin 10 and is an operation input means for the operator to perform the operations of various motion elements (the lower traveling body 1, the upper turning body 3, the boom 4, the arm 5, the bucket 6, and the like). That is, the operation device 26 is an operation input means for the operator to operate the hydraulic actuators (that is, the traveling hydraulic motors 2ML and 2MR, the turning hydraulic motors 2A, the boom cylinder 7, the arm cylinder 8, the bucket cylinder 9, and the like) driving the respective motion elements. The operation device 26 is connected to the control valve 17 through a pilot line on the secondary side thereof. Thus, the control valve 17 receives input of pilot pressure corresponding to the operation states of the lower traveling body 1, the upper turning body 3, the boom 4, the arm 5, the bucket 6 and the like, at the operation device 26. Thus, the control valve 17 can selectively drive each hydraulic actuator according to the operation state at the operation device 26. The operation device 26 includes a boom operation lever 26A corresponding to the operation of the boom 4 (the boom cylinder 7) and a turning operation lever 26B corresponding to the operation of the upper turning body 3 (the turning hydraulic motor 2A).

The boom operation lever 26A is used for the operation of raising and lowering the boom 4. The boom operation lever 26A uses the hydraulic oil discharged by the pilot pump 15 to apply control pressure (pilot pressure) according to the lever operation amount (i.e., the tilt amount, or the angle of tilt, etc.) to either the left or right pilot port of the control valve 154. Accordingly, the stroke of the spool in the control valve 154 is controlled and the flow rate of hydraulic oil supplied to the boom cylinder 7 is controlled. The same applies to the control valve 153.

Note that in FIG. 2, for the sake of clarity, the pilot line connecting the boom operation lever 26A and each of the left and right pilot ports of the control valve 153 and the left pilot port of the control valve 154 is not illustrated.

The turning operation lever 26B is an operation device that drives the turning hydraulic motor 2A to move the turning mechanism 2. The turning operation lever 26B uses, for example, hydraulic oil discharged by the pilot pump 15 to introduce control pressure according to the amount of lever operation into either the left or right pilot port of the control valve 157. Accordingly, the stroke of the spool in the control valve 157 is controlled and the flow rate supplied to the turning hydraulic motor 2A is controlled.

Note that in FIG. 2, for the sake of clarity, the pilot line connecting the turning operation lever 26B and the right pilot port of the control valve 157 is not illustrated.

Similarly, the operation device 26 includes a traveling lever (or traveling pedal), an arm operation lever, and a bucket operation lever that correspond to the respective operations of the lower traveling body 1 (the traveling hydraulic motors 2ML, 2MR), the arm 5 (the arm cylinder 8), and the bucket 6 (the bucket cylinder 9). That is, the traveling lever (or traveling pedal), the arm operation lever, and the bucket operation lever are respectively used for the traveling of the lower traveling body 1, opening and closing the arm 5, and opening and closing the bucket 6. Similar to the boom operation lever 26A or the like, the hydraulic oil discharged by the pilot pump 15 is used to apply control pressure (pilot pressure) according to a lever operation amount (or a pedal operation amount corresponding to a pedal stepping amount) to either the left or right pilot port of the corresponding control valve.

The discharge pressure sensor 28 detects the discharge pressure of the main pump 14. A detection signal corresponding to the discharge pressure detected by the discharge pressure sensor 28 is incorporated into the controller 30. The discharge pressure sensor 28 includes discharge pressure sensors 28L and 28R for detecting the discharge pressure of the main pumps 14L and 14R, respectively.

The operation pressure sensor 29 detects the pilot pressure on the secondary side of the operation device 26, i.e., the pilot pressure (hereinafter, "operation pressure") corresponding to the operation state (i.e., the operation content)

of each motion element (i.e., the hydraulic actuators) at the operation device 26. A detection signal of the pilot pressure corresponding to an operation state of the lower traveling body 1, the upper turning body 3, the boom 4, the arm 5, the bucket 6 and the like at the operation device 26 according to the operation pressure sensor 29 is incorporated into the controller 30. The operation pressure sensor 29 includes operation pressure sensors 29A and 29B.

The operation pressure sensor 29A detects the operator's operation content (e.g., operation direction and lever operation amount) with respect to the boom operation lever 26A in the form of operation pressure.

The operation pressure sensor 29B detects the operator's operation content with respect to the turning operation lever 26B in the form of operation pressure.

Further, the operation pressure sensor 29 includes an operation pressure sensor corresponding to each of the above-described traveling lever (or traveling pedal), arm operation lever, and bucket operation lever. These sensors respectively detect the operation content of an operator or the like in the form of operation pressure, similar to the operation pressure sensors 29A and 29B.

The decompression valve 50 is provided on a pilot line on the secondary side of the operation device 26, i.e., the pilot line between the operation device 26 and the control valve 17, and adjusts (decompresses) the pilot pressure corresponding to the operation content (operation amount) at the operation device 26 under the control of the controller 30. This allows the controller 30 to limit the motion of the various motion elements by controlling the decompression valve 50. The decompression valve 50 includes decompression valves 50L and 50R.

The decompression valve 50L is provided on the pilot line between the turning operation lever 26B and the control valve 157, and under the control of the controller 30, adjusts (decompresses) the control pressure (pilot pressure) corresponding to the content of the operation (hereinafter referred to as "turning operation") of the upper turning body 3 with respect to the turning operation lever 26B.

In FIG. 2, a configuration for adjusting the control pressure acting on the left pilot port of the control valve 157 is illustrated, and a configuration for adjusting the control pressure acting on the right pilot port of the control valve 157 is not illustrated.

The decompression valve 50R is provided on the pilot line between the boom operation lever 26A and the control valve 154, and under the control of the controller 30, adjusts (decompresses) the control pressure (pilot pressure) corresponding to the content of the operation (hereinafter referred to as "boom operation") of the boom operation lever 26A with respect to the boom operation lever 26A.

In FIG. 2, a configuration for adjusting the control pressure acting on the right pilot port of the control valve 154 is illustrated, and a configuration for adjusting the control pressure acting on the left pilot port of the control valve 154 is not illustrated.

The excavator 100 according to the present example includes, as configurations relating to the control system, mainly the controller 30, the ECU (Engine Control Unit) 74, a boom angle sensor S1, an arm angle sensor S2, a bucket angle sensor S3, a machine tilt sensor S4, a turning state sensor S5, a boom cylinder pressure sensor 7a, an object detection device 70, an imaging device 80, a display device D1, and a voice sound output device D2.

The controller 30 is, for example, a control device mounted within the cabin 10 for controlling the driving of the excavator 100. The controller 30 operates by power supplied from a battery BT. Hereinafter, the same shall apply to the display device D1 and various sensors (for example, the object detection device 70, the imaging device 80, the boom angle sensor S1, and the like). The functions of the controller 30 may be implemented by any hardware or any combination of hardware and software. The controller 30 is configured mainly by a computer including, for example, a CPU (Central Processing Unit), a memory device such as a RAM (Random Access Memory), a non-volatile auxiliary storage device such as a ROM (Read Only Memory), an interface device for input and output with an external device, and the like. In this case, the controller 30 can implement various functions by reading a program installed in the auxiliary storage device, loading the program into the memory device, and executing the program on the CPU.

Some of the functions of the controller 30 may be implemented by other controllers (control devices). That is, the functions of the controller 30 may be implemented so as to be distributed among a plurality of the controllers. Further, the battery BT is charged by generated power of an alternator 11b driven by the engine 11.

For example, the controller 30 controls the regulator 13 or the like based on detection signals taken from various sensors such as the boom angle sensor S1, the arm angle sensor S2, the bucket angle sensor S3, the boom cylinder pressure sensor 7a, the discharge pressure sensor 28, the operation pressure sensor 29, and the like.

For example, the controller 30 outputs a control signal to the decompression valve 50 and adjusts the control pressure (pilot pressure) acting on the control valve 17 to control (limit) the motion of various motion elements driven by the hydraulic actuators. Specifically, the controller 30 may control (limit) the turning operation of the upper turning body 3 by outputting a control signal to the decompression valve 50L and adjusting the control pressure acting on the control valve 157. The controller 30 may control (limit) the raising motion (hereinafter, the "boom raising motion") and the lowering motion (hereinafter, the "boom lowering motion") of the boom 4 by outputting a control signal to the decompression valve 50R and adjusting the control pressure acting on the control valve 154.

For example, the controller 30 (an example of a setting unit) makes settings relating to the work area around the excavator 100 according to the operation input of an operator or the like to an operation input unit D1c. Making settings relating to the work area includes setting an object to be a target in the work area (hereinafter, "target object"), setting an object to be avoided in the work area (hereinafter, "avoidance object"), and the like, with respect to predetermined work performed by moving various motion elements of the excavator 100. Target objects in the work area may include, for example, a dump truck to which waste soil is to be loaded, an earthen pipe when replacing a buried earthen pipe, a target construction surface in the machine guidance function and the machine control function described below, and the like. Further, objects to be avoided in the work area may include obstacles such as, for example, road cones, walls, utility poles, wires, and the like. Further, objects to be avoided in the work area may include a target construction surface (specifically, the portion of the target construction surface that has already been constructed) in the machine guidance function and the machine control function. This is because the target construction surface that has been constructed needs to be protected from damage. Further, objects to be avoided in the work area may include a virtual object (e.g., a virtual wall VW as described below) defined by a plurality of obstacles (objects), such as a road cone. The functions of the controller 30 will be described in detail below (see FIGS. 6 to 8, 11, and 12).

For example, the controller 30 recognizes the present orientation of the excavator 100 as a prerequisite for controlling the motion of the various motion elements. Hereinafter, the function of the controller 30 will be described in detail with reference to FIGS. 3A and 3B.

As illustrated in FIG. 3A, the boom 4 swings (rotates) up and down about a swinging axis J parallel to the Y-axis with respect to the upper turning body 3, the arm 5 is rotatably mounted to the leading end of the boom 4, and the bucket 6 is rotatably mounted to the leading end of the arm 5. The boom angle sensor S1 is mounted to a connection (point P1) between the upper turning body 3 and the boom 4, the arm angle sensor S2 is mounted to a connection (point P2) between the boom 4 and the arm 5, and the bucket angle sensor S3 is mounted to a connection (point P3) between the arm 5 and the bucket 6.

In FIGS. 3A and 3B, the swinging axis J is disposed at a position away from a turning axis K (Z-axis), but the turning axis K and the swinging axis J may be disposed so as to intersect each other.

The boom angle sensor S1 measures, for example, an angle $\beta 1$ between the longitudinal direction of the boom 4 and the reference horizontal plane. The reference horizontal plane is, for example, the ground plane of the excavator 100. The arm angle sensor S2 measures the angle $\delta 1$ between the longitudinal direction of the boom 4 and the longitudinal direction of the arm 5, and the bucket angle sensor S3 measures the angle $\delta 2$ between the longitudinal direction of the arm 5 and the longitudinal direction of the bucket 6, for example. In this case, the longitudinal direction of the boom 4 is in the reference vertical plane (in the XZ plane) perpendicular to the swinging axis J and is a direction along the connecting portions at both ends of the boom 4, that is, the line passing through points P1 and P2. Further, the longitudinal direction of the arm 5 is a direction along the connection portions at both ends of the arm 5, i.e., a line passing through points P2 and P3, in a reference vertical plane. Further, the longitudinal direction of the bucket 6 is a direction along a connection portion with the arm 5 and a claw tip of the bucket 6, i.e., a line passing through points P3 and P4, in a reference vertical plane.

As illustrated in FIG. 3B, the upper turning body 3 is configured to freely turn to the left and right with respect to the lower traveling body 1 about the turning axis K constituting the Z-axis, and the machine tilt sensor S4 and the turning state sensor S5 are mounted to the upper turning body 3 as described above.

The machine tilt sensor S4 measures, for example, the angle between the right-left axis (Y-axis) of the upper turning body 3 and a reference horizontal plane (left/right tilt angle) and the angle between the front/back axis (X-axis) of the upper turning body 3 and a reference horizontal plane (front/back tilt angle). The turning state sensor S5 measures, for example, an angle $\alpha$ between the longitudinal direction of the lower traveling body 1 and the front/back axis (X axis) of the upper turning body 3. In this case, the longitudinal direction of the lower traveling body 1 is the extending direction (the traveling direction) of the crawler 1C.

The controller 30 can derive a relative position of the point P1 (a connection portion between the upper turning body 3 and the boom 4) with the origin O as the reference (for example, an intersection of the reference horizontal plane and the Z-axis) based on the detection signals of the machine tilt sensor S4 and the turning state sensor S5. This is because the point P1 is fixed to the upper turning body 3.

Further, the controller 30 can derive the relative positions of the points P2 to P4 with the point P1 as the reference, based on the detection signals of the boom angle sensor S1, the arm angle sensor S2, and the bucket angle sensor S3. Similarly, the controller 30 can derive a relative position of any portion of the attachment AT, such as a predetermined position on the back of the bucket 6, with the point P1 as the reference.

Further, the controller 30 can derive the relative position of the point P5 (the mounting position of a front sensor 70F in the upper turning body 3) with the origin O as the reference, based on the relative position of the point P1. This is because the front sensor 70F is fixed to the top surface of the cabin 10. That is, even if the motion of the attachment AT and the turning motion of the upper turning body 3 are performed, the relative positional relationship of the points P1 and P5 does not change.

The controller 30 can similarly derive the relative positions of the mounting positions of a back sensor 70B, a left sensor 70L, and a right sensor 70R in the upper turning body 3 based on the relative positions of the point P1 with the origin O as the reference.

The controller 30 can derive the relative position of a point P6 (the position of the road cone RC disposed around the excavator 100) with the origin O as the reference, based on the relative position of the point P5 with the origin O as the reference. This is because the front sensor 70F can detect the distance and direction from the point P5 to the road cone RC.

The positional relationship between the road cone RC as the detected object and the excavator 100 is constantly updated at each predetermined control cycle. Therefore, the coordinates of P6 corresponding to the position of the road cone RC on the X-axis, the Y-axis, and the Z-axis centered on the origin O on the turning axis K of the excavator 100 are constantly updated at each control cycle.

Further, when the local coordinate system is determined at the time of measurement at the construction site, the position of the excavator 100 can be identified as the excavator coordinates on the local coordinate system of the construction site. Therefore, the position of the detected road cone RC can be identified as the road cone coordinates in the local coordinate system of the construction site. In this case, the positional relationship between the road cone RC and the excavator 100 is calculated so as to correspond to the local coordinate system of the construction site determined at the time of the measurement.

Further, in the case where a local coordinate system centered on the origin O on the turning axis K of the excavator 100 is used, when a local coordinate system of the construction site determined at the time of measurement is used, or when a world geodetic system is used, the excavator coordinates and road cone coordinates are changed every time the excavator turns or travels. This allows the controller 30 to constantly keep track of relative positions. Further, for example, even when a worker or the like moves the road cone RC, the controller 30 can identify the position of the road cone RC after the movement.

As described above, the controller 30 can derive the orientation of the attachment AT, the position of the claw tip of the bucket 6, and the position of an object (for example, the road cone RC) around the excavator 100 based on the detection signal (output signal) of the boom angle sensor S1, the arm angle sensor S2, the bucket angle sensor S3, the machine tilt sensor S4, the turning state sensor S5, and the object detection device 70.

The ECU 74 drives and controls the engine 11 under the control of the controller 30. For example, the ECU 74 appropriately controls a fuel injection device or the like in response to an ignition-on operation and starts the engine 11 in accordance with the motion of a starter 11*a* driven by power from the battery BT. For example, the ECU 74 appropriately controls a fuel injection device or the like so that the engine 11 can constantly rotate at a set revolution speed specified by a control signal from the controller 30 (isochronous control).

The engine 11 may be directly controlled by the controller 30. In this case, the ECU 74 may be omitted.

The boom angle sensor S1 is mounted to the boom 4 and detects the elevation angle θ1 (hereinafter, the "boom angle") of the boom 4 with respect to the upper turning body 3. The boom angle θ1 is, for example, the rising angle from the state where the boom 4 is lowered most. In this case, the boom angle θ1 is maximized when the boom 4 is raised to the maximum. The boom angle sensor S1 may include, for example, a rotary encoder, an acceleration sensor, a 6-axis sensor, an IMU (Inertial Measurement Unit), or the like. The same shall apply to the arm angle sensor S2, the bucket angle sensor S3, and the machine tilt sensor S4. The boom angle sensor S1 may be a stroke sensor mounted on the boom cylinder 7, and the same applies to the arm angle sensor S2 and the bucket angle sensor S3. A detection signal corresponding to the boom angle θ1 detected by the boom angle sensor S1 is incorporated into the controller 30.

The arm angle sensor S2 is mounted to the arm 5 and detects the rotation angle θ2 (hereinafter, the "arm angle") of the arm 5 with respect to the boom 4. The arm angle θ2 is, for example, an opening angle from the most closed state of the arm 5. In this case, the arm angle θ2 is maximized when the arm 5 is opened most. The detection signal corresponding to arm angle detected by arm angle sensor S2 is incorporated into the controller 30.

The bucket angle sensor S3 is mounted to the bucket 6 and detects the rotation angle θ3 (hereinafter, the "bucket angle") of the bucket 6 with respect to the arm 5. The bucket angle θ3 is an opening angle from the most closed state of the bucket 6. In this case, the bucket angle θ3 is maximized when the bucket 6 is opened most. A detection signal corresponding to the bucket angle detected by the bucket angle sensor S3 is incorporated into the controller 30.

The machine tilt sensor S4 detects the tilt state of a machine (e.g., the upper turning body 3) with respect to a predetermined plane (e.g., a horizontal plane). For example, the machine tilt sensor S4 is mounted on the upper turning body 3 and detects the tilt angle of the excavator 100 (i.e., the upper turning body 3) about the twin axes in the front/back direction and the left/right direction (hereinafter, "front/back tilt angle" and "left/right tilt angle"). A detection signal corresponding to the tilt angle of (front/back tilt angle and left/right tilt angle) detected by the machine tilt sensor S4 is incorporated into the controller 30.

The turning state sensor S5 is mounted to the upper turning body 3 and outputs detection information relating to the turning state of the upper turning body 3. The turning state sensor S5 detects, for example, the turning angular speed and the turning angle of the upper turning body 3. The turning state sensor S5 includes, for example, a gyro sensor, a resolver, a rotary encoder, or the like.

Note that when the machine tilt sensor S4 includes a gyro sensor capable of detecting the angular speed around 3 axes, a 6-axes sensor, an IMU, or the like, the turning state (for example, the turning angular speed) of the upper turning body 3 may be detected based on the detection signal of the machine tilt sensor S4. In this case, the turning state sensor S5 may be omitted.

The boom cylinder pressure sensor 7*a* detects the pressure (hereinafter, referred to as "boom bottom pressure") of the hydraulic oil in the bottom oil chamber of the boom cylinder 7. The detection signal corresponding to the boom bottom pressure detected by the boom cylinder pressure sensor 7*a* is incorporated into the controller 30.

The object detection device 70 detects an object present around the excavator 100. Objects to be detected include, for example, humans, animals, vehicles, construction machines, buildings, walls, fences, holes, and the like. The object detection device 70 includes, for example, at least one of a monocular camera, an ultrasonic sensor, a milliwave radar, a stereo camera, a LIDAR, a distance image sensor, an infrared sensor, and the like. The object detection device 70 may be configured to detect a predetermined object within a predetermined area that is set around the excavator 100. The object detection device 70 may be configured in a manner capable of distinguishing the type of object, for example, distinguishing whether the object is a person or an object other than a person. For example, the object detection device 70 may be configured to detect a predetermined object or distinguish an object type based on a predetermined model such as a pattern recognition model or a machine learning model. The object detection device 70 includes the front sensor 70F, the back sensor 70B, the left sensor 70L, and the right sensor 70R. The output signals corresponding to the detection results of the object detection device 70 (the front sensor 70F, the back sensor 70B, the left sensor 70L, and the right sensor 70R, respectively) are incorporated into the controller 30.

The front sensor 70F is mounted, for example, at the front end of the top surface of the cabin 10 and detects an object located in front of the upper turning body 3.

The back sensor 70B is, for example, mounted to the back end of the top surface of the upper turning body 3 and detects an object located behind the upper turning body 3.

The left sensor 70L is mounted, for example, on the left end of the top surface of the upper turning body 3 and detects an object located on the left side of the upper turning body 3.

The right sensor 70R is mounted, for example, at the right end of the top surface of the upper turning body 3, and detects an object located on the right side of the upper turning body 3.

The imaging device 80 captures views surrounding the excavator 100 and outputs the captured image. The imaging device 80 includes a front camera 80F, a back camera 80B, a left camera 80L and a right camera 80R. Images captured by the imaging device 80 (the front camera 80F, the back camera 80B, the left camera 80L, and the right camera 80R respectively) are taken into a display device D1. The image captured by the imaging device 80 is incorporated into the controller 30 through the display device D1. The image captured by the imaging device 80 may be directly incorporated into the controller 30 without being transmitted through the display device D1.

The front camera 80F is mounted to the front end of the top surface of the cabin 10, e.g., adjacent the front sensor 70F, to capture an image of a view in front of the upper turning body 3.

The back camera 80B is mounted to the back end of the top surface of the upper turning body 3, e.g., adjacent the back sensor 70B, to capture an image of a view behind the upper turning body 3.

The left camera 80L is mounted to the left end of the top surface of the upper turning body 3, e.g., adjacent to the left sensor 70L, to capture an image of a view on the left side of the upper turning body 3.

The right camera 80R is mounted to the right end of the top surface of the upper turning body 3, e.g., adjacent to the right sensor 70R, and to capture an image of a view on the right side of the upper turning body 3.

Note that when the object detection device 70 includes an imaging device, such as a monocular camera or a stereo camera, some or all of the functions of the imaging device 80 may be aggregated into the object detection device 70. For example, if the front sensor 70F includes an imaging device, the functions of the front camera 80F may be aggregated to the front sensor 70F. The same applies to the functions of the back camera 80B, the left camera 80L, and the right camera 80R, when each of the back sensor 70B, the left sensor 70L, and the right sensor 70R includes an imaging device.

The display device D1 is, for example, mounted at a location easily visible from an operator or the like seated in the operator's seat inside the cabin 10 to display various information images. The display device D1 is, for example, a liquid crystal display or an organic EL (electroluminescence) display. For example, the display device D1 displays a captured image taken in from the imaging device 80 or a converted image in which a predetermined conversion process is performed on the captured image (for example, a viewpoint converted image or a composite image combining a plurality of captured images). The display device D1 includes a display control unit D1a, an image display part D1b, and the operation input unit D1c.

The display control unit D1a performs control processes for displaying various information images on the image display part D1b in response to an operation input from an operator, etc., to the operation input unit D1c. Similar to the controller 30, the display control unit D1a may be configured mainly by a computer including, for example, a CPU, a memory device such as a RAM, an auxiliary storage device such as a ROM, and an interface device for input/output with the outside.

The function of the display control unit D1a may be provided outside the display device D1, for example, and may be implemented by the controller 30.

The image display part D1b is an area portion in which the information image in the display device D1 is displayed. The image display part D1b is, for example, configured by a liquid crystal panel or an organic EL panel.

The operation input unit D1c accepts input operations relating to the display device D1. An operation input signal corresponding to the input operation to the operation input unit D1c is incorporated into the display control unit D1a. The operation input unit D1c may accept various operation inputs relating to the excavator 100 other than those relating to the display device D1. In this case, the operation input signals corresponding to various operation inputs to the operation input unit D1c are directly incorporated into the controller 30 or indirectly incorporated into the controller 30 through the display control unit D1a. The operation input unit D1c includes, for example, a touch panel mounted on a liquid crystal panel or an organic EL panel as the image display part D1b. The operation input unit D1c may include any operation member, such as a touch pad, a button, a switch, a toggle, and a lever that is separate from the image display part D1b.

The operation input unit that accepts various operation inputs relating to the excavator 100 other than those relating to the display device D1 may be provided separately from the display device D1 (the operation input unit D1c).

The display device D1 has a plurality of operation modes in which the display contents differ from each other under the control of the display control unit D1a. The display device D1 switches among a plurality of operation modes according to a predetermined operation by an operator. The plurality of operation modes include, for example, a surrounding image mode, a setting mode, and view mode. The same may apply hereinafter for another example of the excavator 100 described below.

In the surrounding image mode, an image representing the surroundings of the excavator 100 (hereinafter, referred to as the "surrounding image") based on the image captured by the imaging device 80 is displayed on the display device D1 (the image display part D1b). The surrounding image may be, for example, at least one output image (captured image) of the front camera 80F, the back camera 80, the left camera 80L, and the right camera 80R. Further, the surrounding image may be a viewpoint conversion image generated based on an output image of at least one of the front camera 80F, the back camera 80B, the left camera 80L, and the right camera 80R. The viewpoint conversion image may be, for example, a combination of a top view image viewing a relatively close area around the excavator 100 from directly above, and a horizontal image viewing a relatively far area around the excavator 100 from a horizontal direction with respect to the excavator 100.

For example, as illustrated in FIG. 5, in the surrounding image mode, a surrounding image 500 is displayed on the display device D1. Further, information images 501 to 510 representing various kinds of information relating to the excavator 100 are displayed on the display device D1. The information images 501 to 510 are displayed in a superimposed manner on the surrounding image 500 at the upper or lower end of the display area (the image display part D1b). Thus, the information images 501 to 510 can cause the operator to recognize various kinds of information while ensuring the visibility of the surrounding image 500.

The information image 501 displays the current time.

The information image 502 displays a driving mode corresponding to the engine revolution speed set through a predetermined input means (e.g., an engine revolution speed adjustment dial).

The information image 503 displays the type of the traveling mode of the lower traveling body 1 that is set. The traveling mode indicates the set state of traveling hydraulic motors 1L and 1R using a variable capacity motor. For example, the traveling mode has a low speed mode and a high speed mode, and in the low speed mode, a mark representing a "turtle" is displayed, and in the high speed mode, a mark representing a "rabbit" is displayed.

The information image 504 displays an icon representing the type of attachment currently mounted.

The information image 505 displays the control state of the engine 11. In the present example, the "automatic deceleration/automatic stop mode" is selected as the control state of the engine 11. The automatic deceleration/automatic stop mode means a control state in which the engine revolution speed is automatically reduced and the engine 11 is automatically stopped according to the duration of the non-operation state of the excavator 100. The control state of the engine 11 represented by the information image 505 may further include an "automatic deceleration mode", an "automatic stop mode", and a "manual deceleration mode".

The information image 506 displays the remaining urea water used in the urea Selective Catalytic Reduction (SCR)

system stored in the urea water tank of the excavator 100. In the present example, the information image 506 displays a bar gauge representing the current residual urea water state. The remaining amount of urea water is displayed based on the data output from a urea water remaining amount sensor provided in the urea water tank.

The information image 507 displays the remaining amount of fuel stored in the fuel tank. In the present example, the information image 507 displays a bar gauge representing the current remaining fuel status. The remaining amount of fuel is displayed based on the data output from a fuel remaining amount sensor provided in the fuel tank.

The information image 508 displays the temperature state of the cooling water (hereinafter, "engine cooling water") of the engine 11. In this example, the information image 508 displays a bar gauge representing the temperature state of the engine cooling water. The temperature of the engine cooling water is displayed based on the data output from a water temperature sensor provided in the engine 11.

The information image 509 displays the cumulative operating time of the engine 11. In the present example, the information image 509 displays the cumulative operating time in units of "hr" (hours). The information image 509 may display the lifetime operating time of the entire period after the excavator 100 is manufactured as the cumulative operating time of the engine 11, or may display the interval operating time from when the count is restarted by the operator.

The information image 510 displays the range of the surrounding image displayed as the surrounding image 500. The information image 510 includes an excavator image 510a representing the shape of the excavator 100 and a band-shaped direction display image 510b representing the photographing direction of the imaging device 80 that has captured the surrounding image 500 that is being displayed.

In this example, the direction display image 510b is displayed on the underside (opposite the diagram representing the attachment) of the excavator image 510a. This indicates that the image behind the excavator 100, taken by the back camera 80B included in the imaging device 80, is displayed as the surrounding image 500. For example, if the surrounding image 500 is displayed as an image captured by the right camera 80R included in the imaging device 80, the direction display image 510b is displayed on the right side of the excavator image 510a. For example, when an image captured by the left camera 80L included in the imaging device 80 is displayed as the surrounding image 500, the direction display image 510b is displayed on the left side of the excavator image 510a.

In the setting mode, a setting screen relating to the work area surrounding the excavator 100 to be described later, is displayed. The details are described below (see FIGS. 6 and 11).

In the view mode, the contents of the settings relating to the work area around the excavator 100 to be described later, are displayed. The details are described below (see FIG. 7).

The voice sound output device D2, for example, is mounted inside the cabin 10 and outputs voice sound under the control of the controller 30. The voice sound output device D2 may be, for example, a buzzer, a speaker, or the like.

(Setting Method Relating to Work Area Around the Excavator)

Next, a method of making settings relating to the work area around the excavator 100 by the controller 30 will be described with reference to FIG. 6.

Figure 6:
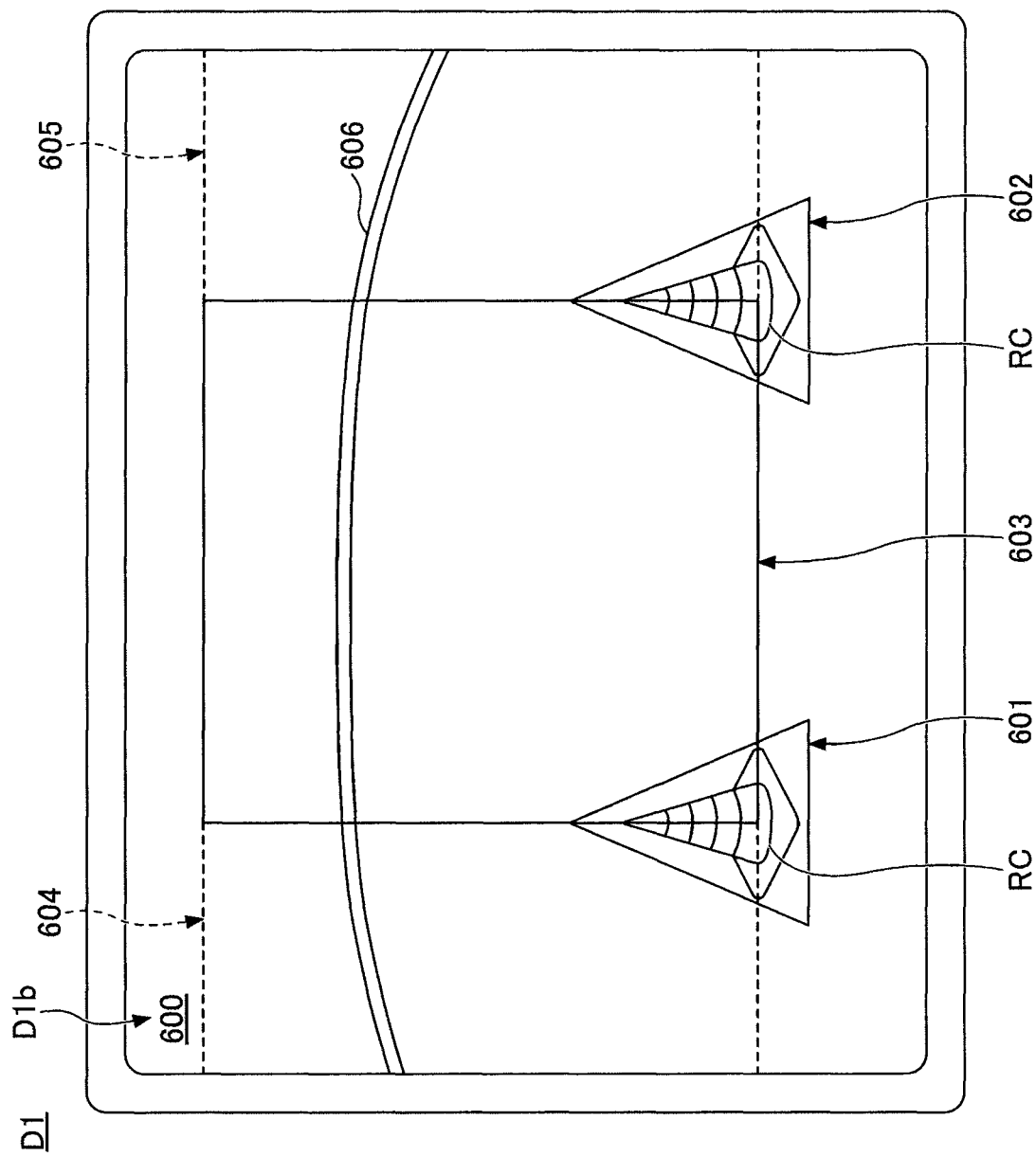
FIG. 6 is a diagram illustrating an example of the display contents of a display device in the setting mode.

FIG. 6 is a diagram illustrating an example of the display content of the display device D1 in the setting mode. Specifically, FIG. 6 is a diagram illustrating an example of a setting screen (a setting screen 600) relating to a work area around the excavator 100. In this example, the setting screen 600 is an operation screen for making settings for an avoidance object in the work area as a specific example of a setting relating to the work area according to an operation by an operator or the like on the operation input unit D1c. The controller 30 makes a setting relating to the avoidance object according to an operation on the setting screen 600.

In the setting mode, the contents of the setting screen 600 may be displayed on the display device D1 by being superimposed on the display contents of the surrounding image mode (for example, the surrounding image 500 and the information images 501 to 510 illustrated in FIG. 5). In this case, the contents of the setting screen 600 may be displayed in superimposition on the portion of the surrounding image 500 positioned at the center of the display area (the image display part D1b) in the vertical direction, in the display contents of the surrounding image mode. Accordingly, in the setting mode, the contents of the setting screen 600 and the contents of the information images 501 to 510 are displayed on the display device D1 in a manner visible from an operator.

The display device D1 displays the setting screen 600 in the image display part D1b under the control of the display control unit D1a. Specifically, the setting screen 600 displays a captured image (an example of an image representing a work area) captured by the imaging device 80 (in this example, the left camera 80L). In this example, two road cones RC are disposed side by side at the front and back on the ground on the left side of the excavator 100 (see FIG. 7), and two road cones RC are appearing (included) in the image captured by the left camera 80L. In this example, the two road cones RC are disposed to compartmentalize between the work site where the excavator 100 is located and the road through which vehicles pass, with a centerline 606 of the road appearing in the setting screen 600 (i.e., the image captured by the imaging device 80).

The display control unit D1a displays an image captured by the imaging device 80 on the image display part D1b (the setting screen 600) by using as a reference a predetermined coordinate system (hereinafter, as a matter of convenience, referred to as the "setting coordinate system") in such a state that predefined coordinates for the work area are associated with the respective pixels (an example of an image component portion) of an image captured by the imaging device 80. In this case, the coordinate positions on the ground surface or on any plane such as the ground contact surface of the excavator 100 and pixels may be associated with each other. Further, a detected object (see FIG. 3A and FIG. 3B) such as a road cone may be associated with pixels (specifically, pixels in a range in which the detected object appears). Thus, for example, by specifying pixels in the captured image in the setting screen 600 through the operation input unit D1c, the operator, etc., can specify a part of the work area corresponding to the coordinates associated with the corresponding pixels, that is, a part of the work area appearing in the corresponding pixels. In this case, the pixels in the captured image on the setting screen 600 may be specified by a fingertip of an operator or the like (for example, a tapping operation) through the touch panel, or the pixels may be specified by a movement of a cursor and a validation operation through a mouse, a joystick, or the like. The process of associating the coordinates of the work area in the setting coordinate system with the respective pixels in the image captured by the imaging device 80 may be performed by the display control unit D1*a* or may be performed outside the display device D1, for example, by the controller 30. The setting coordinate system may be, for example, a local coordinate system (e.g., a local coordinate system of a construction site determined at the time of measurement) that is uniquely set (fixed) within a particular geographical range, such as a working site of the excavator 100, or an absolute coordinate system (e.g., a world geodetic system) that is expressed in terms of longitude, latitude, altitude, etc. The setting coordinate system may be a local coordinate system fixed to the excavator 100 by using as a reference a predetermined position of the excavator 100, that is, a moving coordinate system (for example, an XYZ coordinate system fixed to the upper turning body 3 illustrated in FIGS. 3A and 3B). Hereinafter, the same shall apply to another example of the excavator 100 (FIG. 9) which will be described later.

The display control unit D1*a* may reduce or enlarge the reduction scale of the image captured by the imaging device 80 in the image display part D1*b* (the setting screen 600) in accordance with a predetermined operation input (for example, pinch-in operation or pinch-out operation on the touch panel) of an operator or the like to the operation input unit D1*c*. That is, the display control unit D1*a* may change the display area of the image captured by the imaging device 80 in the image display part D1*b* by reducing or enlarging the reduction scale of the image captured by the imaging device 80. In this case, as a matter of course, the association relationship between the coordinates on the setting coordinate system or an object and the like corresponding to the coordinates and the pixels, is changed in accordance with the change in the reduction scale of the captured image on the image display part D1*b* (the setting screen 600).

Further, the display control unit D1*a* may change the display area to be displayed on the setting screen 600, among the captured images of the surroundings of the excavator 100 output by the imaging device 80 (specifically, the front/back, left, and right of the upper turning body 3), according to the operation input of an operator, etc., to the operation input unit D1*c* (for example, a flick operation, a swipe operation, etc., on the touch panel). For example, when an operator or the like performs a flick operation or a swipe operation in the left direction to the touch panel, the area of the captured image on the right side that is not displayed on the setting screen 600, is gradually displayed on the setting screen 600. In this example, in the setting screen 600, the image captured by the left camera 80L is gradually switched to the image captured by the front camera 80F. At this time, the display control unit D1*a* may continuously switch the display area to be displayed on the setting screen 600, among the captured images output by the imaging device 80, according to the operation input of an operator or the like to the operation input unit D1*c* in a manner such that the surroundings of the excavator 100 are continuously displayed without interruption. Further, the display control unit D1*a* may select a camera corresponding to the captured image to be displayed on the setting screen 600 from among the front camera 80F, the back camera 80B, the left camera 80L, and the right camera 80R according to the operation input of an operator or the like to the operation input unit D1*c*. That is, the display control unit D1*a* may discontinuously switch the display area to be displayed on the setting screen 600, among the captured images output by the imaging device 80, according to the operation input of an operator or the like to the operation input unit D1*c*, for each captured image of the front camera 80F, the back camera 80B, the left camera 80L, and the right camera 80R. Accordingly, the operator or the like can switch the area of the captured image to be displayed on the setting screen 600 by an operation to the operation input unit D1*c*. The display control unit D1*a* may change the display area of the captured image in the setting screen 600 in a vertical direction according to an operation input of an operator or the like to the operation input unit D1*c* (for example, a flick operation or a swipe operation to the touch panel). When the display area of the captured image in the image display part D1*b* (the setting screen 600) is changed, as a matter of course, the association relationship between the coordinates on the setting coordinate system or an object and the like corresponding to the coordinates and the pixels, is changed in accordance with the change in the display area of the captured image in the setting screen 600.

Specifically, the imaging device 80 (the front camera 80F, the back camera 80B, the left camera 80L, and the right camera 80R) is fixed to the upper turning body 3, and the imaging range (image angle) is predefined (fixed). Therefore, for example, by taking into consideration the landform of the work area within the imaging range in advance, the relative position of the portion of the work area (landform) appearing in each pixel of the image captured by the imaging device 80 viewed from the excavator 100 (the upper turning body 3) can be identified. For example, when an object is detected in a work area within the imaging range by the object detection device 70, the relative position of the object viewed from the excavator 100, the type of the object, and the size of the object and the like can be taken into consideration, so that the relative position of the group of pixels corresponding to the object appearing in the image captured by the imaging device 80 in a manner that blocks the landform viewed from the excavator 100 (the upper turning body 3) can be identified. Accordingly, the display control unit D1*a*, the controller 30, or the like can associate the coordinates predefined for the work area in the setting coordinate system with each pixel of the image captured by the imaging device 80. For example, in the case of a moving coordinate system in which the setting coordinate system is fixed to the upper turning body 3, the above-described association can be realized by a map (hereinafter, an "association map") representing the association relationship between each pixel of the captured image and the relative position by using as a reference the imaging device 80 (the front camera 80F, the back camera 80B, the left camera 80L, or the right camera 80R). In the case of a fixed coordinate system in which the setting coordinate system is fixed in the work area, for example, the above-described association may be realized by the above-described association map and a conversion formula or a conversion map, etc., that converts the relative position defined in the association map into the coordinates of the setting coordinate system. In this case, as a matter of course, in the conversion formula and the conversion map, etc., the position (coordinates) of the excavator 100 in the setting coordinate system is taken into consideration, which is identified based on the positioning results of a positioning device such as the GNSS (Global Navigation Satellite System) mounted on the upper turning body 3. The conversion formula and the conversion map, etc., may be appropriately modified in accordance with the inclined state of the upper turning body 3 and the presence of an object detected by the object detection device 70 within the imaging range of the imaging device 80. This is because the portion of the work area (landform) included in the image captured by the imaging device 80 varies according to the inclined state of the excavator 100. For example, when an object is present in the imaging range of the imaging device 80 in the setting coordinate system, an object detected so as to block the background (landform, etc.) at the back appears in the image, and a deviation occurs in the relative position of the pixels of the corresponding image portion defined by the corresponding map as described above.

Note that the object detection information including the presence or absence of an object detected by the object detection device 70 and the position of the object present (for example, the relative position viewed from the upper turning body 3) may be notified (shared) by the controller 30 to the display control unit D1a. The same shall apply to another example of the excavator 100 described below.

The display control unit D1a displays an image captured by the imaging device 80 on the image display part D1b (the setting screen 600) in such a state that the coordinates of an object (target object) detected by the object detection device 70 in the work area, using the setting coordinate system as the reference, are associated with pixels corresponding to the object (for example, pixels of the image portion in which the object is included) in the image captured by the imaging device 80. For example, in the association map described above, a pixel corresponding to the coordinates of an object detected by the object detection device 70 (for example, the coordinates may be a representative coordinate or the coordinates may be a plurality of coordinates corresponding to a plurality of portions of an object) may be identified by the display control unit D1a or the like, and the association may be realized by distinguishing the identified one or more pixels by flags or the like. Hereinafter, the same shall apply to another example of the excavator 100 (FIG. 9) which will be described later. Accordingly, for example, the operator, etc., can specify a pixel of an image portion in which an object in the captured image on the setting screen 600 is appearing (included) through the operation input unit D1c, to specify the object that is positioned at a coordinate corresponding to the specified pixel.

In this example, as described above, two road cones RC (examples of objects) are appearing in the image captured by the left camera 80L constituting the setting screen 600. Therefore, the operator or the like can specify the road cone RC by specifying pixels of the image portion including the road cone RC through the operation input unit D1c (for example, a tapping operation on the touch panel). The detected object, such as the road cone RC, may be specified by a double tap operation or by a long tap operation.

Specifically, when the pixels of the road cone RC on the left side of the setting screen 600, that is, the image portion including the road cone RC on the front side with respect to the upper turning body 3, are specified, the display control unit D1a displays a triangular icon 601 surrounding the group of pixels including the road cone RC on the setting screen 600. The display control unit D1a notifies the controller 30 that the road cone RC is specified. Accordingly, the controller 30 can set the road cone RC on the front side with respect to the upper turning body 3 as an avoidance object during operation of the excavator 100.

Similarly, when the pixels of the road cone RC on the right side of the setting screen 600, that is, the image portion including the road cone RC on the back side with respect to the upper turning body 3, are specified, the display control unit D1a displays a triangular icon 602 surrounding the group of pixels including the road cone RC on the setting screen 600. The display control unit D1a notifies the controller 30 that the road cone RC is specified. Accordingly, the controller 30 can set the road cone RC on the back side with respect to the upper turning body 3 as an avoidance object during operation of the excavator 100.

When the two road cones RC are specified in the setting screen 600, the controller 30 may set an avoidance object section (hereinafter, an "avoidance object section") to complement the space between the two road cones. For example, a wall ("virtual wall") as a virtual avoidance object section extending from a line section connecting the two road cones RC to a predetermined height (e.g., 10 m) in a vertical direction may be set. For example, an operator or the like can set a virtual wall between the two road cones RC by specifying the two road cones RC in the setting screen 600 by a tapping operation, etc., on the touch panel and then by a dragging operation from one of the road cones RC to the other. In this case, the display control unit D1a displays a rectangular icon 603 indicating that a virtual wall is set between the two specified road cone RCs on the setting screen 600. This allows the operator to recognize that a virtual wall has been set between the area of the work site where the excavator 100 is located and the road.

Further, it is possible that a cone bar is bridged across the two road cones RC. In this case, the controller 30 may set a virtual wall along the cone bar when the two road cones RC are specified. Further, when three or more road cones RC are provided around the excavator 100, a plurality of virtual walls between the road cones RC may be configured to be connected. For example, if the road cones RC are disposed to surround the excavator 100 and all of the road cones are specified, a plurality of virtual walls, which are coupled to surround the excavator 100 as defined by the road cones RC, may be set.

Further, the virtual wall may be extended (expanded) not only between the two road cones RC but also to the space outside the two road cones RC. For example, the display control unit D1a expands the icon 603 to an area 604 on the left side of the left road cone RC when an operation is performed through the operation input unit D1c to extend the left end of the icon 603 in the left direction, specifically, when an operation is performed to drag the left end of the icon 603 toward the left side through a touch panel or the like. The display control unit D1a notifies the controller 30 that an operation has been performed to extend the virtual wall to a predetermined position on the left side of the left road cone RC on the setting screen 600, that is, to a predetermined position on the front side of the road cone RC on the front side with the upper turning body 3 as the reference. Similarly, the display control unit D1a expands the icon 603 to an area 605 on the right side of the road cone RC on the right side when an operation is performed through the operation input unit D1c to extend the right end of the icon 603 in the right direction, specifically, when the right end of the icon 603 is dragged to the right side through a touch panel or the like. The display control unit D1a notifies the controller 30 that an operation has been performed to extend the virtual wall to a predetermined position on the right side of the right road cone RC on the setting screen 600, that is, to extend the virtual wall to a predetermined position on the back side of the road cone RC on the back side with the upper turning body 3 as the reference. Accordingly, the controller 30 can extend the virtual wall to the space outside the two road cones in accordance with an operation by an operator or the like on the setting screen 600 through the operation input unit D1c.

The setting of the avoidance object by the controller 30 may be performed automatically based on the specification of an object such as the road cone RC on the setting screen 600, or may be performed when a predetermined operation is performed through the operation input unit D1c after the specification of the object. Similar settings may be made with other types of objects (e.g., people, utility poles, construction machines, fences, etc.) detected by the object detection device 70, instead of the road cone RC detected by the object detection device 70. For example, when a utility pole is detected by the object detection device 70, the utility pole may be set as an avoidance object in a similar manner, or a virtual wall may be set as an avoidance object based on a plurality of utility poles. In the present example, an avoidance object is set, but a target object may be set in a similar manner. For example, if a dump truck is appearing (or included) in the image captured by the imaging device 80, the dump truck may be set as the target object for loading waste soil by the excavator 100.

(Specific Example of Setting Content Relating to the Work Area Around the Excavator)

Figure 7:
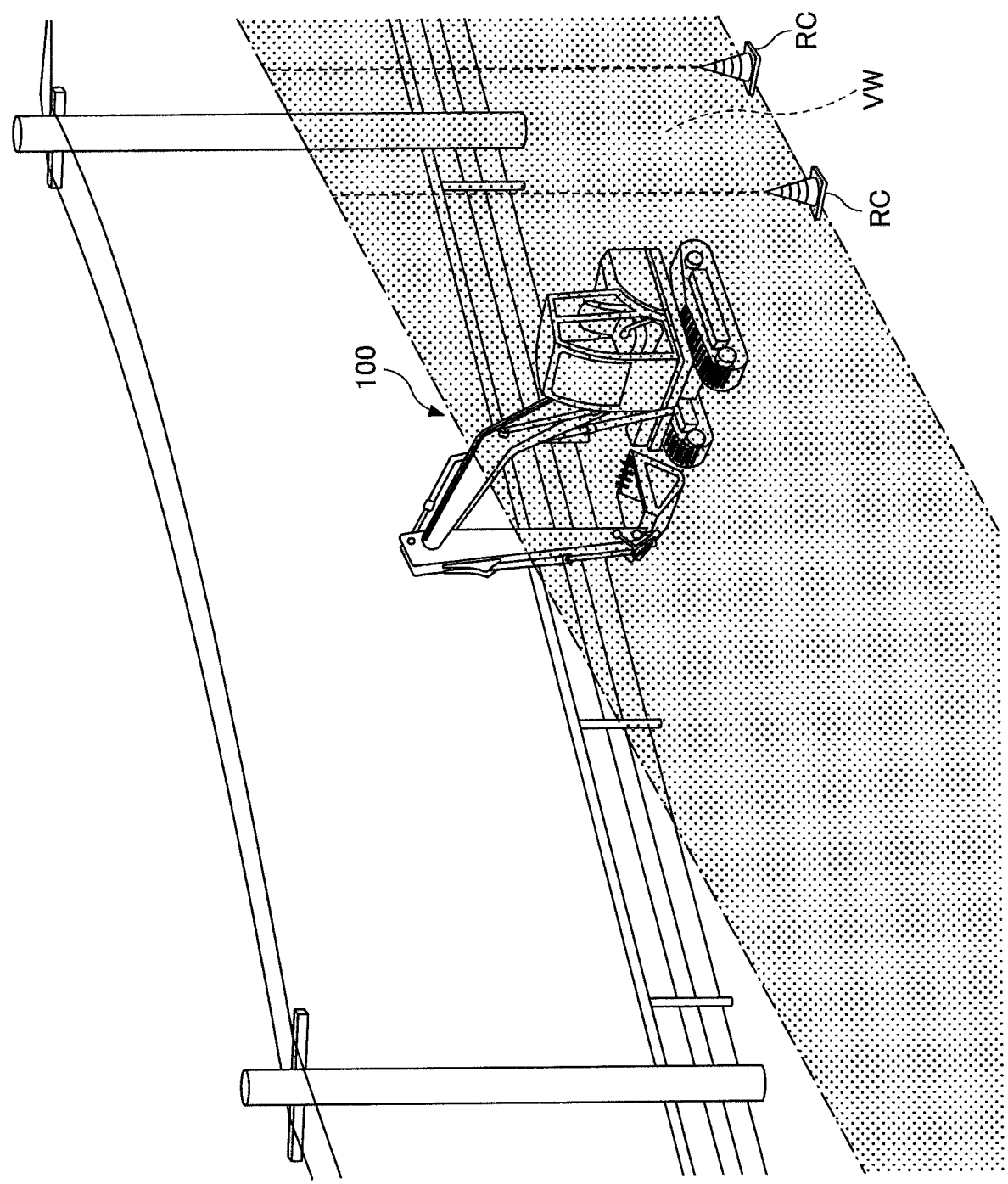
FIG. 7 is a diagram illustrating an example of the setting contents relating to a work area around the excavator.
Figure 8A:
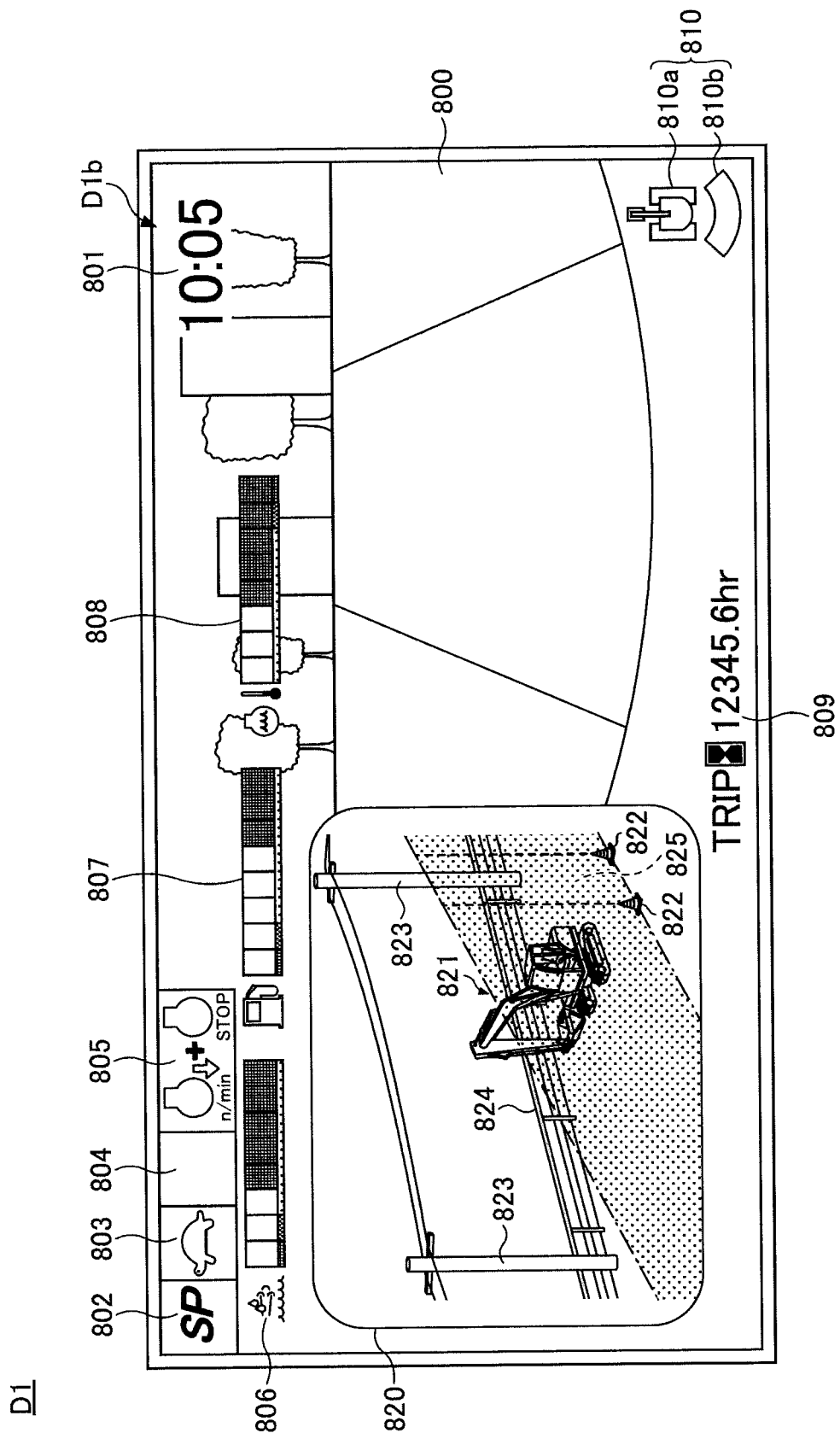
FIG. 8A is a diagram illustrating an example of the display contents of a display device in a view mode.
Figure 8B:
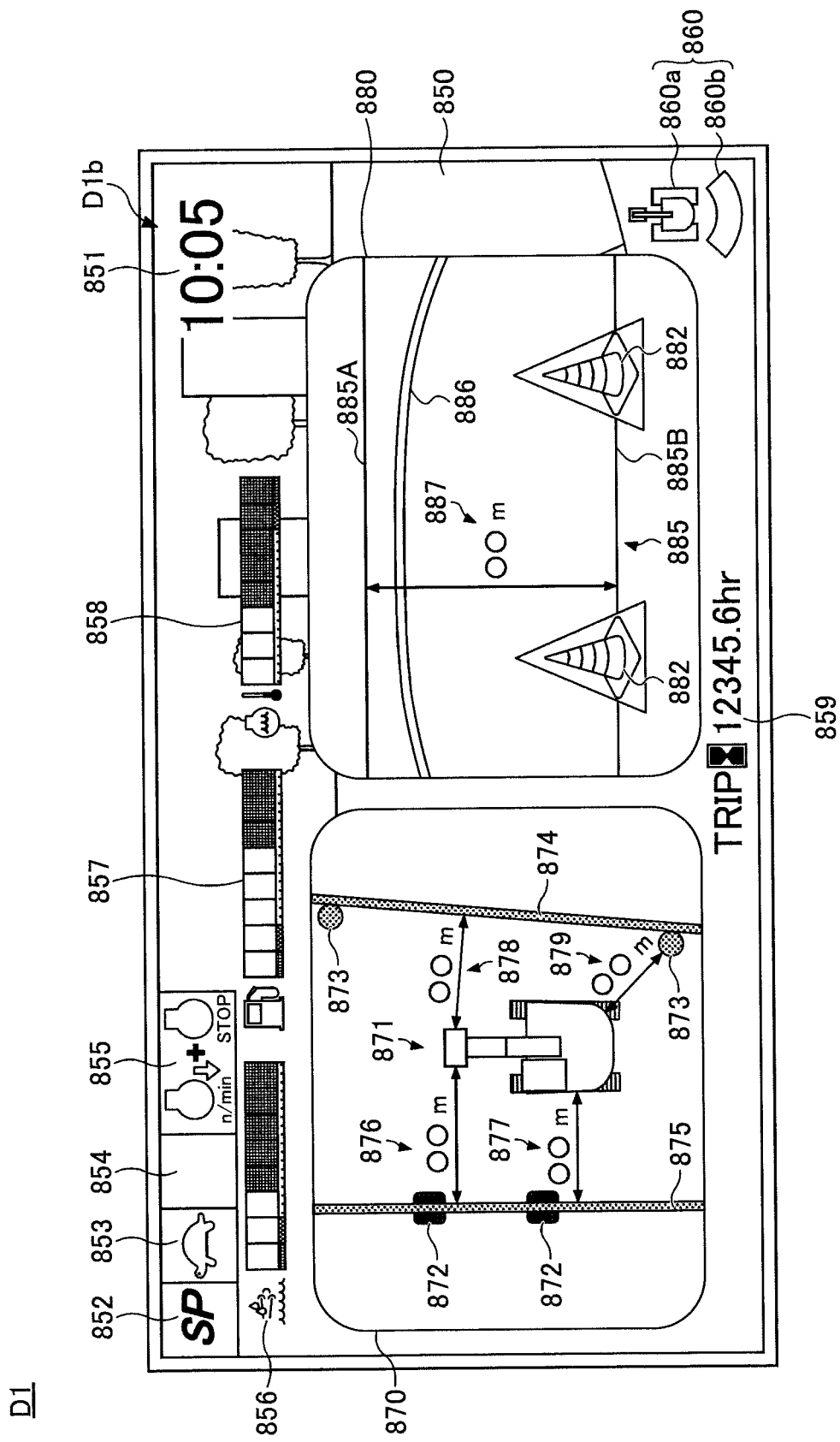
FIG. 8B is a diagram illustrating another example of the display contents of a display device in the view mode.

Referring now to FIGS. 7 and 8 (FIGS. 8A and 8B), a specific example of the operation of the excavator 100 based on the setting content relating to the work area around the excavator 100 will be described.

FIG. 7 is a diagram illustrating an example of a setting content relating to a work area around the excavator 100. Specifically, FIG. 7 is a perspective view of the excavator 100 illustrating the setting content relating to the work area around the excavator 100 set through the setting screen 600 of FIG. 6, and more specifically, a view for explaining a virtual wall VW set through the setting screen 600 of FIG. 6. FIGS. 8A and 8B respectively illustrate an example and another example of the display contents of the display device D1 in the view mode. Specifically, FIGS. 8A and 8B are diagrams respectively illustrating one example and another example of a confirmation screen of the setting content relating to the work area around the excavator 100, and more specifically, diagrams illustrating one example and another example of the confirmation screen of setting content set through the setting screen 600 of FIG. 6.

As illustrated in FIG. 7, in the present example, a virtual wall VW is set as an avoidance object in the work area, in a manner that a straight line connecting the two road cones RC disposed in front and back is extended by a predetermined distance in a vertical direction on the left side of the excavator 100 (the upper turning body 3). That is, in the setting screen 600 of FIG. 6, the icon 603 is expanded to the area 604 and the area 605, and the virtual wall VW is set as a avoidance object (section) in the work area.

The operator can confirm the setting content for the work area including the virtual wall VW through a confirmation screen displayed on the display device D1.

For example, as illustrated in FIG. 8A, a surrounding image 800 is displayed on the display device D1. Information images 801 to 810 are displayed on the display device D1. The information images 801 to 810 represent the same contents as the information images 501 to 510 of FIG. 5 and are displayed in a superimposed manner on the surrounding image 800 at the upper or lower end of the display area (the image display part D1b). Further, the display device D1 displays a setting confirmation image 820 superimposed on the surrounding image 800 in a manner that occupies substantially the left half with respect to central portion in a vertical direction of the display area. Thus, the display device D1 displays the setting confirmation image 820 and the contents of the information images 801 to 810 in a manner visible from an operator.

The setting confirmation image 820 is displayed by using a three-dimensional image of the setting content relating to the work area around the excavator 100 including the virtual wall VW. Specifically, the setting confirmation image 820 displays the excavator 100, the work area around the excavator 100, and the set virtual wall VW as a three-dimensional image viewed from a virtual viewpoint on the oblique upper side of the excavator 100 (hereinafter, simply referred to as "perspective virtual viewpoint").

The setting confirmation image 820 includes an excavator image 821, a road cone image 822, a utility pole image 823, a fence image 824, and a virtual wall image 825.

The excavator image 821 is a three-dimensional image of the excavator 100 viewed from the perspective virtual viewpoint. The excavator image 821 may be a captured image of the excavator 100 viewed from the perspective virtual viewpoint or may be a computer graphic simulating the excavator 100 viewed from the perspective virtual viewpoint. The same shall apply to an excavator image 871 described below.

The road cone image 822 is a three-dimensional image viewed from the perspective virtual viewpoint, of the road cone RC (i.e., the road cone RC of FIGS. 6 and 7) installed around the excavator 100.

The utility pole image 823 and the fence image 824 are three-dimensional images of the utility pole and the fence (i.e., the utility pole and the fence of FIG. 7) located around the excavator 100, respectively, viewed from the perspective virtual viewpoint.

The three-dimensional image representing the work area around the excavator 100, including the road cone image 822, the utility pole image 823, and the fence image 824, etc., may be generated as a viewpoint conversion image, for example, by performing a known viewpoint conversion process based on the image captured by the imaging device 80. The three-dimensional perspective image representing the work area around the excavator 100 may also be, for example, computer graphics generated from a pre-prepared image template of a detection target object using the detection results of the object detection device 70.

The virtual wall image 825 is a three-dimensional image viewed from the perspective virtual viewpoint, of the virtual wall VW set with the two road cones RC as a reference.

Further, for example, as illustrated in FIG. 8B, a surrounding image 850 is displayed on the display device D1. Information images 851 to 860 are displayed on the display device D1. The information images 851 to 860 represent the same contents as the information images 501 to 510 of FIG. 5 and are displayed in a superimposed manner on the surrounding image 850 at the upper or lower end of the display area (image display part D1b). On the display device D1, setting confirmation images 870 and 880 are superimposed on the surrounding image 850 in a manner that occupies a substantially left half and a substantially right half, respectively, with respect to central portion in a vertical direction of the display area. Thus, the display device D1 displays the setting confirmation images 870 and 880 and the contents of the information images 851 to 860 in a manner visible to the operator.

The setting confirmation images 870 and 880 are displayed using a two-dimensional image to display the setting content relating to the work area around the excavator 100 including a virtual wall VW. Specifically, in the setting confirmation image 870, the excavator 100, the work area around the excavator 100, and the set virtual wall VW are displayed as a two-dimensional (planar) image viewed from the virtual viewpoint directly above the excavator 100 (hereinafter, simply referred to as a "top view virtual viewpoint"). Further, the setting confirmation image 880 displays the work area around the excavator 100 and the set virtual wall VW as a two-dimensional (planar) image viewed horizontally from the excavator 100.

The setting confirmation image 870 includes the excavator image 871, a road cone image 872, a utility pole image 873, a fence image 874, a virtual wall image 875, and distance notification images 876 to 879.

The excavator image 871 is an image of the excavator 100 viewed from the top virtual viewpoint.

The road cone image 872 is an image (i.e., a top view image) viewed from the top view virtual viewpoint, of the road cone RC (i.e., the road cone RC of FIGS. 6 and 7) installed around the excavator 100.

The utility pole image 873 and the fence image 874 are the images (i.e., the top view images) viewed from the top view virtual viewpoint, respectively, of the utility pole and the fence (i.e., the utility pole and the fence of FIG. 7) that are present around the excavator 100.

A top view image representing the work area around the excavator 100, including the road cone image 872, the utility pole image 873, and the fence image 874, etc., may be generated as a viewpoint conversion image, for example, by performing a known viewpoint conversion process based on the image captured by the imaging device 80. The top view image representing the work area around the excavator 100 may also be, for example, computer graphics generated from a pre-prepared image template of a detection target object using the detection result of the object detection device 70.

The virtual wall image 875 is an image (i.e., a top view image) viewed from the top view virtual viewpoint, of the virtual wall VW set based on the two road cones RC.

The distance notification images 876 to 879 respectively represent the distance (e.g., the shortest distance) between the excavator 100 and a surrounding object to be detected or an avoidance object (section). Accordingly, the operator can operate the excavator 100 while more specifically recognizing the distance relationship between the excavator 100 and surrounding objects or avoidance objects (sections).

The distance notification image 876 represents the shortest distance between the end attachment (e.g., the bucket 6) of the excavator 100 and the virtual wall VW. The distance notification image 876 includes a double-sided arrow (dimension line) connecting portions corresponding to the shortest distance between the portion corresponding to the end attachment of the excavator image 871 and the virtual wall image 875, and includes character information ("○○ m") representing the distance.

The distance notification image 877 represents the shortest distance between the upper turning body 3 of the excavator 100 and the virtual wall VW. The distance notification image 877 includes a double-sided arrow (dimension line) connecting the portions corresponding to the shortest distance between the portion corresponding to the upper turning body 3 of the excavator image 871 and the virtual wall image 875, and includes character information representing the distance ("○○ m").

The distance notification image 878 represents the shortest distance between the end attachment (e.g., the bucket 6) of the excavator 100 and the fence. The distance notification image 878 includes a double-sided arrow (dimension line) connecting the portions corresponding to the shortest distance between the portion corresponding to the end attachment of the excavator image 871 and the fence image 874, and includes character information representing the distance ("○○ m").

The distance notification image 879 represents the shortest distance between the upper turning body 3 of the excavator 100 and the utility pole. The distance notification image 879 includes a double-sided arrow (dimension line) connecting the portions corresponding to the shortest distance between the portion corresponding to the upper turning body 3 of the excavator image 871 and the utility pole image 873, and includes character information representing the distance ("○○ m").

The setting confirmation image 880 includes a road cone image 882, a virtual wall image 885, a centerline image 886, and a height notification image 887.

The road cone image 882 is an image in which the road cone RC (i.e., the road cone RC of FIGS. 6 and 7) installed around the excavator 100 is viewed horizontally from the excavator 100.

The virtual wall image 885 is an image of the virtual wall VW set based on the two road cones RC viewed horizontally from the excavator 100. The virtual wall image 885 includes a virtual wall upper end image 885A representing the upper end of the virtual wall VW and a virtual wall lower end image 885B representing the lower end of the virtual wall VW.

The centerline image 886 is an image of the road centerline 606 viewed horizontally from the excavator 100.

An image of the work area around the excavator 100 viewed horizontally from the excavator 100, including the road cone image 882, the centerline image 886, or the like, may be generated as a viewpoint conversion image by performing a known viewpoint conversion process, for example, based on the image captured by the imaging device 80. The image of the work area around the excavator 100 viewed horizontally from the excavator 100 may also be, for example, a computer graphic generated from a pre-prepared image template of a detection target object using the detection result of the object detection device 70.

The height notification image 887 indicates the height of the set avoidance object section (the virtual wall VW). The height notification image 887 includes a double-sided arrow (dimension line) connecting the top-bottom direction (vertical direction) between the virtual wall upper end image 885A and the virtual wall lower end image 885B, and includes character information ("○○ m") representing the distance.

In this manner, the operator can recognize the positional relationship between the excavator 100 and the virtual wall VW set in the work area around the excavator 100 through the setting confirmation image 820 and the setting confirmation images 870 and 880.

The setting confirmation image 880 may be displayed as a two-dimensional (planar) image, including the excavator 100, the work area around the excavator 100, and the set virtual wall VW, viewed from a virtual viewpoint on the side of the excavator 100. In this case, the setting confirmation image 880 may display an image of an excavator representing the excavator 100, and an image of a utility pole or a fence representing a utility pole or a fence present around the excavator 100. In the view mode, only one of the setting confirmation image 870 and the setting confirmation image 880 may be displayed on the display device D1. In the view mode, either one of the setting confirmation image 820 or the setting confirmation images 870 and 880 may be displayed on the display device D1. In the view mode, the setting confirmation image may be superimposed on an information image other than the surrounding image.

The controller 30 may output an alarm when the excavator 100 is likely to contact the virtual wall VW so as not to contact the non-existent virtual wall VW.

For example, when the distance between the virtual wall VW and the excavator 100 (the lower traveling body 1, the upper turning body 3, the attachment AT, or the like) falls below a predetermined threshold value, the controller 30 may output a control signal to the voice sound output device D2 to output an alarm sound. At this time, the controller 30 can identify the position of the excavator 100 in the setting coordinate system based on the positioning result of a positioning device such as the GNSS device mounted on the upper turning body 3 and determine the positional relationship with the virtual wall VW. Further, the controller 30 may output different alarm sounds of plural levels as the distance between the virtual wall VW and the excavator 100 decreases. Further, the controller 30 may output an alarm based on an information image through the display device D1.

Further, the controller 30 may control (limit) the motion of the motion element of the excavator 100 so as not to contact the non-existent virtual wall VW, in other words, not to pass across the virtual wall VW.

For example, from the state of the excavator 100 illustrated in FIG. 7, when the upper turning body 3 is operated to turn in the left direction through the turning operation lever 26B, a part of the upper turning body 3 (for example, a counter weight) or an attachment AT may approach the virtual wall VW and pass across the virtual wall VW. Accordingly, for example, when the distance between the virtual wall VW and the upper turning body 3 or the attachment AT falls below a predetermined first threshold value in a situation where the turning operation lever 26B is operated and the upper turning body 3 is turning, the controller 30 may output a control signal to the decompression valve 50L to limit and decelerate the turning motion of the upper turning body 3. Further, the controller 30 may vary the degree of limitation of the upper turning body 3 to be increased as the distance between the virtual wall VW and the upper turning body 3 or the attachment AT increases. The same shall apply to a case in which the motion of the boom 4 is controlled (limited) as will be described later. Further, in a state where the turning operation lever 26B is operated and the upper turning body 3 is turning, when the attachment AT or the upper turning body 3 further approaches the virtual wall VW and the distance from the virtual wall VW falls below a predetermined second threshold value that is less than the first threshold value, the controller 30 may stop the turning motion of the upper turning body 3 by outputting a control signal to the decompression valve 50L and decompressing the control pressure output from the decompression valve 50L to a level equivalent to a lever operation amount of "zero". Accordingly, the controller 30 can control the motion of the upper turning body 3 so that the attachment AT or the upper turning body 3 does not pass across the virtual wall VW set as the avoidance object.

For example, in a state where the upper turning body 3 is turned in the left direction by a predetermined amount from the state of the excavator 100 illustrated in FIG. 7 and a virtual wall VW is present in front of the upper turning body 3, when the boom 4 is operated through the boom operation lever 26A, the attachment AT (for example, the bucket 6) may approach the virtual wall VW. Accordingly, in a state where the boom operation lever 26A is operated and the boom 4 is moving, for example, when the distance between the virtual wall VW and the attachment AT is below a predetermined first threshold value, the controller 30 may output a control signal to the decompression valve 50R to limit the motion of the boom 4. In a state where the boom operation lever 26A is operated and the boom 4 is moving, when the attachment AT approaches the virtual wall VW and the distance from the virtual wall VW falls below a predetermined second threshold value that is less than the first threshold value, the controller 30 may output a control signal to the decompression valve 50R and decompress the control pressure output from the decompression valve 50R to a level equivalent to a lever operation amount "zero" to stop the motion of the boom 4. Accordingly, the controller 30 can control the motion of the boom 4 so that the upper turning body 3 does not pass across the virtual wall VW set as the avoidance object.

The first threshold value concerning the limitation of the turning motion of the upper turning body 3 and the first threshold value concerning the limitation of the motion of the boom 4 may be the same or may be different, and the same shall apply to the second threshold value. When the decompression valve 50 is provided for controlling (limiting) the motion of the lower traveling body 1, the arm 5, and the bucket 6, the controller 30 may output a control signal to the decompression valve 50 to control (limit) the motion of the lower traveling body 1, the arm 5, and the bucket 6 so that the excavator 100 does not pass across the virtual wall VW.

<Another Example of Excavator>

Next, another example of the excavator 100 according to the present embodiment will be described in detail with reference to FIGS. 9 to 12 in addition to FIG. 1.

(Configuration of Excavator)

First, the configuration of the excavator 100 according to the present example will be described with reference to FIGS. 1, 9, and 10.

Figure 9:
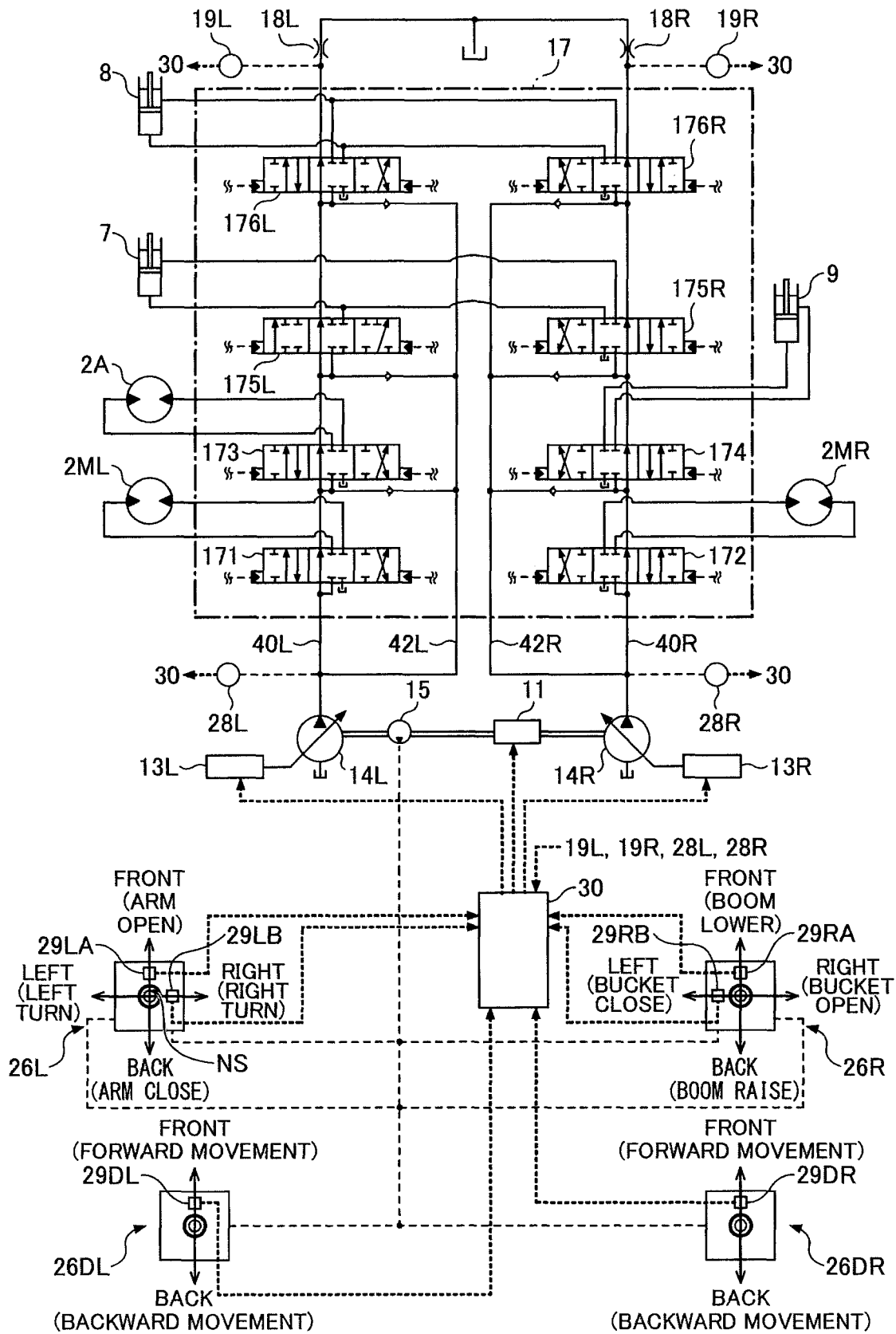
FIG. 9 is a schematic diagram illustrating another example of a configuration centering around a hydraulic system of the excavator.

FIG. 9 is a schematic diagram illustrating another example of a configuration centered on a hydraulic system of the excavator 100 according to the present embodiment. FIG. 10 (FIGS. 10A to 10D) are detailed diagrams illustrating components of an operation system in the hydraulic system of the excavator 100 according to the present embodiment, and specifically, are detailed diagrams illustrating components of an operation system in the hydraulic system of FIG. 9.

In FIG. 9, the mechanical power transmission system, the hydraulic oil line, the pilot line, and the electrical control system are represented by double lines, solid lines, dashed lines, and dotted lines, respectively, as in FIG. 2. Further, the configuration centered on the control system of the excavator 100 according to the present example is the same as that of FIG. 4 except that the decompression valve 50 in FIG. 4 is replaced with a shuttle valve 32 or the like to be described later, and, therefore, the figure of the control system is omitted.

The excavator 100 according to the present example includes hydraulic actuators such as the traveling hydraulic motor 2ML and 2MR, the turning hydraulic motor 2A, the boom cylinder 7, the arm cylinder 8, and the bucket cylinder 9 for hydraulically driving the lower traveling body 1, the upper turning body 3, the boom 4, the arm 5, and the bucket 6, respectively, as a configuration relating to the hydraulic system. Further, the excavator 100 according to the present example includes the engine 11, the regulator 13, the main pump 14, the pilot pump 15, the control valve 17, the operation device 26, the discharge pressure sensor 28, and the operation pressure sensor 29 as the configurations associated with the hydraulic system, as is the case with the excavator 100 described above.

The control valve 17 includes control valves 171 to 176 for controlling the flow rate and flow direction of hydraulic oil supplied from the main pump 14 to each of the hydraulic actuators. The control valve 171 corresponds to a traveling hydraulic motor 2ML. The control valve 172 corresponds to a traveling hydraulic motor 2MR. The control valve 173 corresponds to the turning hydraulic motor 2A, and the control valve 174 corresponds to the bucket cylinder 9. The control valve 175 corresponds to the boom cylinder 7 and includes control valves 175L and 175R. The control valve 176 corresponds to the arm cylinder 8 and includes control valves 176L and 176R.

The operation device 26 is connected to the control valve 17 through the shuttle valve 32, which will be described later, provided on the pilot line on the secondary side of the operation device 26. Thus, to the control valve 17, pilot pressure may be input, corresponding to the operation states of the lower traveling body 1, the upper turning body 3, the boom 4, the arm 5, and the bucket 6 at the operation device 26. Thus, the control valve 17 can drive the respective hydraulic actuators according to the operation state at the operation device 26. The operation device 26 includes left and right operation levers 26L and 26R for operating attachments AT, i.e., the boom 4 (the boom cylinder 7), the arm 5 (the arm cylinder 8), the bucket 6 (the bucket cylinder 9), and the upper turning body 3. Further, the operation device 26 includes a traveling lever 26D for operating the lower traveling body 1, and the traveling lever 26D includes a left traveling lever 26DL for operating the left crawler 1CL and a right traveling lever 26DR for operating the right crawler 1CR.

The left operation lever 26L is used for the turning operation of the upper turning body 3 and the operation of the arm 5. Specifically, an operation of the left operation lever 26L in the front/back direction is used for an operation of the arm 5, and an operation of the left operation lever 26L in the left/right direction is used for a turning operation of the upper turning body 3. That is, the component portion corresponding to the front/back operation of the left operation lever 26L corresponds to the arm operation lever in the example of the excavator 100 described above, and the component portion corresponding to the left/right operation of the left operation lever 26L corresponds to the turning operation lever 26B. When the left operation lever 26L is operated in the front/back direction (that is, the front/back direction of the upper turning body 3) as viewed from the operator in the cabin 10, the hydraulic oil discharged from the pilot pump 15 is used to output the control pressure (pilot pressure) according to the lever operation amount to the pilot line on the secondary side. When the left operation lever 26L is operated in the left/right direction (that is, the left/right direction of the upper turning body 3) as viewed from the operator in the cabin 10, the hydraulic oil discharged from the pilot pump 15 is used to output the control pressure (pilot pressure) according to the lever operation amount to the pilot line on the secondary side.

The left operation lever 26L is provided with a switch NS at a tip thereof. This allows the operator or the like to operate the left operation lever 26L while pressing the switch NS. The switch NS is, for example, a push-button switch, and a signal corresponding to the operation state of the switch NS is incorporated into the controller 30.

The switch NS may be provided on the right operation lever 26R or at other locations within the cabin 10 (preferably at a location that is easy to operate by the seated operator or the like).

The right operation lever 26R is used to operate the boom 4 and the bucket 6. Specifically, the front/back operation of the right operation lever 26R is used to operate the boom 4, and the left/right operation of the right operation lever 26R is used to operate the bucket 6. That is, the component portion corresponding to the front/back operation of the right operation lever 26R corresponds to the boom operation lever 26A in the example of the excavator 100 described above, and the component portion corresponding to the left/right operation of the right operation lever 26R corresponds to the bucket operation lever. When the right operation lever 26R is operated in the front/back direction as viewed from an operator in the cabin 10, the hydraulic oil discharged from the pilot pump 15 is used to output the control pressure (pilot pressure) according to the lever operation amount to the pilot line on the secondary side. When the right operation lever 26R is operated in the left/right direction, the hydraulic oil discharged from the pilot pump 15 is used to output the control pressure (pilot pressure) according to the lever operation amount to the pilot line on the secondary side.

The left traveling lever 26DL is used to operate the left crawler 1CL as described above and may be configured to interlock with a left traveling pedal (not illustrated). When the left traveling lever 26DL is operated in the front/back direction as viewed from an operator in the cabin 10, the hydraulic oil discharged from the pilot pump 15 is used to output the control pressure (pilot pressure) according to the lever operation amount to the pilot line on the secondary side. The pilot lines on the secondary side corresponding to the operations of the forward movement direction/backward movement direction of the left traveling lever 26DL are connected directly to the corresponding pilot ports of the control valve 171, respectively. That is, the spool position of the control valve 171 driving the traveling hydraulic motor 2ML reflects the operation content of the left traveling lever 26DL.

The right traveling lever 26DR is used to operate the right crawler 1CR as described above and may be configured to interlock with a right traveling pedal (not illustrated). When the right traveling lever 26DR is operated in the front/back direction as viewed from an operator in the cabin 10, the hydraulic oil discharged from the pilot pump 15 is used to output the control pressure (pilot pressure) according to the lever operation amount to the pilot line on the secondary side. The pilot lines on the secondary side corresponding to the operations of the forward movement direction/backward movement direction of the right traveling lever 26DR are connected directly to the corresponding pilot ports of the control valve 172, respectively. That is, the spool position of the control valve 172 driving the traveling hydraulic motor 2ML reflects the operation content of the right traveling lever 26DR.

Note that the operation device 26 (the left operation lever 26L, the right operation lever 26R, the left travelling lever 26DL, and the right traveling lever 26DR) may not be a hydraulic pilot type which outputs pilot pressure, but may be an electric type which outputs an electrical signal as described below (see, for example, FIG. 13). In this case, the control valves 171 to 176 in the control valve 17 may be electromagnetic solenoid spool valves.

The operation pressure sensor 29 includes operation pressure sensors 29LA, 29LB, 29RA, 29RB, 29DL, 29DR.

The operation pressure sensor 29LA detects the operation content (e.g., operation direction and operation amount) of the front/back direction with respect to the left operation lever 26L by the operator in the form of pressure (hereinafter referred to as "operation pressure") of the hydraulic oil of the pilot line on the secondary side of the left operation lever 26L.

The operation pressure sensor 29LB detects the operation content (e.g., operation direction and operation amount) of the left/right direction with respect to the left operation lever 26L by the operator in the form of the operation pressure of the pilot line on the secondary side of the left operation lever 26L.

The operation pressure sensor 29RA detects the operation content (e.g., operation direction and operation amount) of the front/back direction with respect to the right operation lever 26R by the operator in the form of the operation pressure of the pilot line on the secondary side of the right operation lever 26R.

The operation pressure sensor 29RB detects the operation content (e.g., operation direction and operation amount) of the left/right direction with respect to the right operation lever 26R by the operator in the form of the operation pressure of the pilot line on the secondary side of the right operation lever 26R.

The operation pressure sensor 29DL detects the operation content (e.g., operation direction and operation amount) of the front/back direction with respect to the left traveling lever 26DL by the operator in the form of the operation pressure of the pilot line on the secondary side of the left traveling lever 26DL.

The operation pressure sensor 29DR detects the operation content (e.g., operation direction and operation amount) of the front/back direction with respect to the right traveling lever 26DR by the operator in the form of the operation pressure of the pilot line on the secondary side of the right traveling lever 26DR.

The operation content at the operation device 26 (the left operation lever 26L, the right operation lever 26R, the left travelling lever 26DL, and the right traveling lever 26DR) may be detected by sensors (e.g., potentiometers mounted on the right operation lever 26R, the left travelling lever 26DL, and the right traveling lever 26DR) other than the operation pressure sensor 29.

As illustrated in FIG. 9, in the hydraulic system of the excavator 100, a portion of the hydraulic system of the drive system for driving the hydraulic actuator circulates the hydraulic oil from the main pump 14 driven by the engine 11 through the center bypass pipeline 40 and a parallel pipeline 42 to the hydraulic oil tank.

The center bypass pipeline 40 includes the center bypass pipelines 40L, 40R.

The center bypass pipeline 40L starts at the main pump 14L and passes sequentially through the control valves 171, 173, 175L, and 176L disposed within the control valve 17 in order to reach the hydraulic oil tank.

The center bypass pipeline 40R starts at the main pump 14R and passes sequentially through control valves 172, 174, 175R, and 176R disposed within the control valve 17 to reach the hydraulic oil tank.

The control valve 171 is a spool valve that supplies hydraulic oil discharged from the main pump 14L to the traveling hydraulic motor 2ML and discharges the hydraulic oil discharged from the traveling hydraulic motor 2ML to the hydraulic oil tank. That is, the control valve 171 corresponds to the control valve 151 of the example of the excavator 100 described above.

The control valve 172 is a spool valve that supplies hydraulic oil discharged from the main pump 14R to the traveling hydraulic motor 2MR and discharges the hydraulic oil discharged from the traveling hydraulic motor 2MR to the hydraulic oil tank. That is, the control valve 172 corresponds to the control valve 152 of the example of the excavator 100 described above.

The control valve 173 is a spool valve that supplies hydraulic oil discharged from the main pump 14L to the turning hydraulic motor 2A and discharges the hydraulic oil discharged from the turning hydraulic motor 2A to the hydraulic oil tank. That is, the control valve 173 corresponds to the control valve 157 of the example of the excavator 100 described above.

The control valve 174 is a spool valve that supplies hydraulic oil discharged from the main pump 14R to the bucket cylinder 9 and discharges the hydraulic oil in the bucket cylinder 9 to the hydraulic oil tank. That is, the control valve 174 corresponds to the control valve 158 of the example of the excavator 100 described above.

The control valves 175L and 175R are spool valves that supply the hydraulic oil discharged by the main pumps 14L and 14R to the boom cylinder 7 and discharge the hydraulic oil in the boom cylinder 7 to the hydraulic oil tank, respectively. That is, the control valves 175L and 175R correspond to the control valves 154 of the example of the excavator 100 described above.

The control valves 176L and 176R are spool valves that supply the hydraulic oil discharged by the main pumps 14L and 14R to the arm cylinder 8 and discharge the hydraulic oil in the arm cylinder 8 to the hydraulic oil tank, respectively. That is, the control valves 176L and 176R correspond to the control valve 155 of the example of the excavator 100 described above.

The control valves 171, 172, 173, 174, 175L, 175R, 176L, and 176R respectively adjust the flow rate of hydraulic oil supplied to and discharged from the hydraulic actuator and switch the direction of flow, according to the pilot pressure acting on the pilot port.

The parallel pipeline 42 includes parallel pipelines 42L, 42R.

The parallel pipeline 42L supplies hydraulic oil of the main pump 14L to the control valves 171, 173, 175L, and 176L in parallel with the center bypass pipeline 40L. Specifically, the parallel pipeline 42L branches from the center bypass pipeline 40L at the upstream side of the control valve 171 and is configured to supply the hydraulic oil of the main pump 14L to each of the control valves 171, 173, 175L, and 176R in parallel. Accordingly, the parallel pipeline 42L can supply hydraulic oil to a further downstream control valve when the flow of hydraulic oil passing through the center bypass pipeline 40L is limited or interrupted by one of the control valves 171, 173, and 175L.

The parallel pipeline 42R supplies the hydraulic oil of the main pump 14R to the control valves 172, 174, 175R, 176R in parallel with the center bypass pipeline 40R. Specifically, the parallel pipeline 42R branches from the center bypass pipeline 4CR at the upstream side of the control valve 172 and is configured to supply hydraulic oil of the main pump 14R to each of the control valves 172, 174, 175R, and 176R in parallel. The parallel pipeline 42R can supply hydraulic oil to a further downstream control valve when the flow of hydraulic oil passing through the center bypass pipeline 40R is limited or interrupted by one of the control valves 172, 174, and 175R.

The regulators 13L and 13R adjust the discharge amounts of the main pumps 14L and 14R by adjusting the tilt angles of the swash plates of the main pumps 14L and 14R, respectively, under the control of the controller 30.

The discharge pressure sensor 28L detects the discharge pressure of the main pump 14L, and a detection signal corresponding to the detected discharge pressure is incorporated into the controller 30. The same applies to the discharge pressure sensor 28R. Thus, the controller 30 can control the regulators 13L and 13R according to the discharge pressure of the main pumps 14L and 14R.

The center bypass pipelines 40L and 40R are provided with negative control diaphragms 18L and 18R between the control valves 176L and 176R, respectively, which are most downstream, and the hydraulic oil tank. Accordingly, the flow of hydraulic oil discharged by the main pumps 14L and 14R is limited by the negative control diaphragms 18L and 18R. The negative control diaphragms 18L and 18R generate a control pressure (hereinafter, "negative control pressure") for controlling the regulators 13L and 13R.

Negative control pressure sensors 19L and 19R detect the negative control pressure, and the detection signal corresponding to the detected negative control pressure is incorporated into the controller 30.

The controller 30 may control the regulators 13L and 13R according to the discharge pressure of the main pumps 14L and 14R detected by the discharge pressure sensors 28L and 28R to adjust the discharge amounts of the main pumps 14L and 14R, respectively. For example, the controller 30 may control the regulator 13L according to an increase in the discharge pressure of the main pump 14L to adjust the tilt angle of the swash plate of the main pump 14L to reduce the discharge amount. The same applies to the regulator 13R. Accordingly, the controller 30 can control the total horsepower of the main pumps 14L and 14R so that the absorbed horsepower of the main pumps 14L and 14R, which is expressed as the product of the discharge pressure and the discharge amount, does not exceed the output horsepower of the engine 11.

The controller 30 may adjust the discharge amount of the main pumps 14L and 14R by controlling the regulators 13L and 13R according to the negative control pressure detected by the negative control pressure sensors 19L and 19R. For example, the controller 30 decreases the discharge amount of the main pumps 14L and 14R as the pressure of the negative control increases, and increases the discharge amount of the main pumps 14L and 14R as the pressure of the negative control decreases.

Specifically, in a standby state in which none of the hydraulic actuators in the excavator 100 is operated (the state illustrated in FIG. 9), the hydraulic oil discharged from the main pumps 14L and 14R passes through the center bypass pipelines 40L and 40R to reach the negative control diaphragms 18L and 18R. The flow of hydraulic oil discharged from the main pumps 14L and 14R increases the negative control pressure generated upstream of the negative control diaphragms 18L and 18R. As a result, the controller 30 reduces the discharge amount of the main pumps 14L and 14R to the allowable minimum discharge amount and prevents pressure loss (pumping loss) when the discharged hydraulic oil passes through the center bypass pipeline 40L and 40R.

On the other hand, when any of the hydraulic actuators is operated through the operation device 26, the hydraulic oil discharged from the main pumps 14L and 14R flows into the hydraulic actuator that is operated through a control valve corresponding to the hydraulic actuator that is operated. The flow of the hydraulic oil discharged from the main pumps 14L and 14R decreases or eliminates the amount leading to the negative control diaphragms 18L and 18R, thereby lowering the negative control pressure generated upstream of the negative control diaphragms 18L and 18R. As a result, the controller 30 can increase the discharge amount of the main pumps 14L and 14R, circulate sufficient hydraulic oil in the hydraulic actuator that is operated, and reliably drive the hydraulic actuator that is operated.

Further, as illustrated in FIGS. 9 and 10, in the hydraulic system of the excavator 100, the hydraulic system portion relating to the operating system includes the pilot pump 15, the operation device 26 (the left operation lever 26L, the right operation lever 26R, the left traveling lever 26DL, and the right traveling lever 26DR), a proportional valve 31, the shuttle valve 32, and a decompression proportional valve 33.

The proportional valve 31 is provided on a pilot line connecting the pilot pump 15 and the shuttle valve 32 and is configured to change the flow area of the pilot line (the cross-sectional area through which hydraulic oil can flow). The proportional valve 31 operates in response to a control command input from the controller 30. Thus, the controller 30 can supply hydraulic oil discharged from the pilot pump 15 to the pilot ports of corresponding control valves (specifically, the control valves 173 to 176) in the control valve 17 through the proportional valve 31 and the shuttle valve 32, even when the operation device 26 (specifically, the left operation lever 26L and the right operation lever 26R) is not operated by an operator or the like. The proportional valve 31 includes proportional valves 31AL, 31AR, 31BL, 31BR, 31CL, 31CR, 31DL, 31DR.

The shuttle valve 32 has two inlet ports and one outlet port and causes the outlet port to output the hydraulic oil having the higher pilot pressure among the pilot pressures input to the two inlet ports. The shuttle valve 32 connects one of the two inlet ports to the operation device 26 and the other one of the two inlet ports to the proportional valve 31. The outlet port of shuttle valve 32 is connected, through a pilot line, to a pilot port of a corresponding control valve within the control valve 17. Thus, the shuttle valve 32 can cause the higher one of the pilot pressure generated by the operation device 26 and the pilot pressure generated by the proportional valve 31, to act on the pilot port of the corresponding control valve. That is, the controller 30 outputs from the proportional valve 31 a pilot pressure higher than the pilot pressure on the secondary side output from the operation device 26, so that the corresponding control valve can be controlled regardless of the operation with respect to the operation device 26 by the operator, and the motion of the lower traveling body 1, the upper turning body 3, and the attachment AT can be controlled. The shuttle valve 32 includes shuttle valves 32AL, 32AR, 32BL, 32BR, 32CL, 32CR, 32DL, 32DR.

The decompression proportional valve 33 is provided on the pilot line connecting the operation device 26 and the shuttle valve 32 and is configured to change the flow area of the pilot line. The decompression proportional valve 33 operates in response to a control command input from the controller 30. Thus, the controller 30 can forcibly depressurize the pilot pressure output from the operation device 26 when the operator is operating the operation device 26 (specifically, the left operation lever 26L and the right operation lever 26R). Accordingly, the controller 30 may forcibly suppress or stop the motion of the hydraulic actuator corresponding to the operation at the operation device 26 even when the operation device 26 is operated. The controller 30, for example, can depressurize the pilot pressure output from the operation device 26 to be lower than the pilot pressure output from the proportional valve 31 even when the operation device 26 is operated. Accordingly, the controller 30 can control the proportional valve 31 and the decompression proportional valve 33 to ensure that the desired pilot pressure is applied to the pilot port of the control valve in the control valve 17 regardless of the operation content at the operation device 26. The decompression proportional valve 33 includes decompression proportional valves 33AL, 33AR, 33BL, 33BR, 33CL, 33CR, 33DL, and 33DR.

Figure 10A:
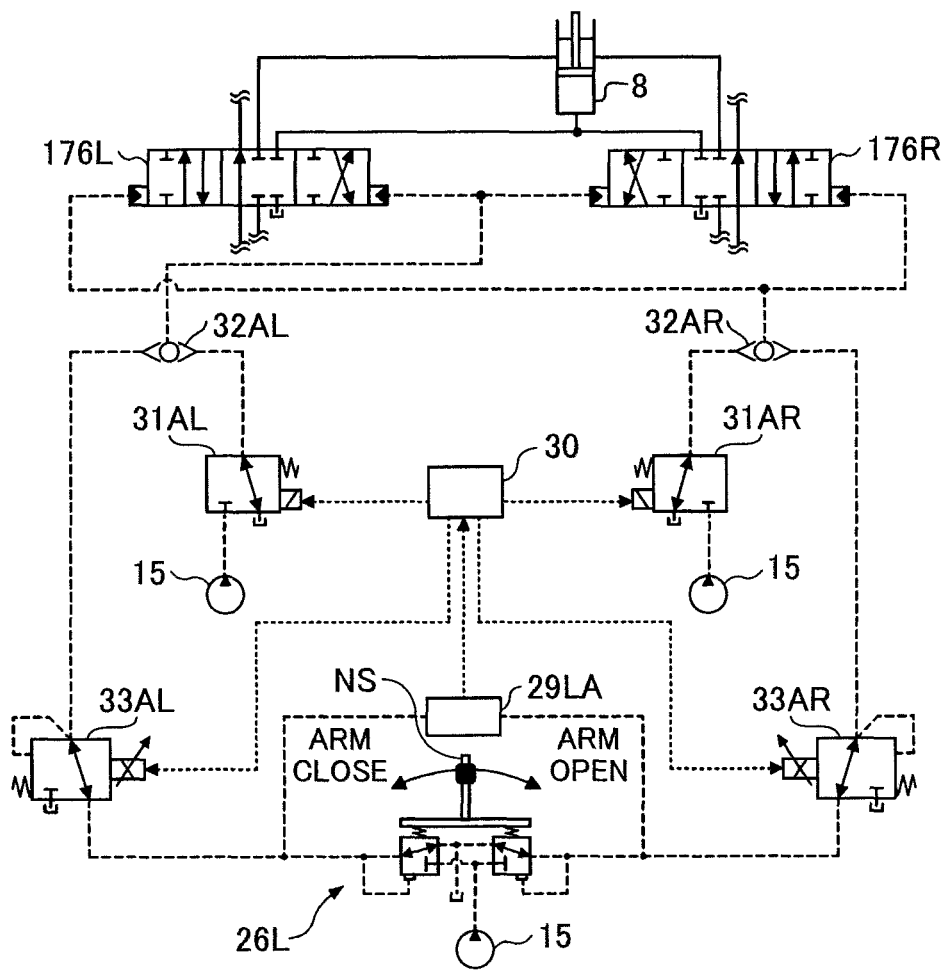
FIG. 10A is a detailed diagram illustrating the components relating to the operation system in the hydraulic system of FIG. 7.

As illustrated in FIG. 10A, the left operation lever 26L is used to operate the arm cylinder 8 corresponding to the arm 5 by being tilted in the front/back direction by the operator. That is, when the left operation lever 26L is tilted in the front/back direction, the motion of the arm 5 is the operation target. The left operation lever 26L uses the hydraulic oil discharged from the pilot pump 15 to output the pilot pressure, according to the operation content in the front/back direction, to the secondary side.

In the shuttle valve 32AL, two inlet ports are respectively connected to a pilot line on the secondary side of the left operation lever 26L corresponding to an operation in the closing direction of the arm 5 (hereinafter, "arm closing operation") and to a pilot line on the secondary side of the proportional valve 31AL, and the outlet port is connected to the pilot port on the right side of the control valve 176L and to the pilot port on the left side of the control valve 176R.

In the shuttle valve 32AR, two inlet ports are respectively connected to the pilot line on the secondary side of the left operation lever 26L corresponding to an operation in the opening direction of the arm 5 (hereinafter, "arm opening operation") and to the pilot line on the secondary side of the proportional valve 31AR, and the outlet port is connected to the pilot port on the left side of the control valve 176L and to the pilot port on the right side of the control valve 176R.

That is, the left operation lever 26L applies a pilot pressure according to the operation content in the front/back direction, on the pilot ports of the control valves 176L, 176R through the shuttle valves 32AL, 32AR. Specifically, when the arm closing operation is performed, the left operation lever 26L outputs pilot pressure according to the amount of operation to one of the inlet ports of the shuttle valve 32AL and applies the pilot pressure on the pilot port on the right side of the control valve 176L and the pilot port on the left side of the control valve 176R through the shuttle valve 32AL. When the arm opening operation is performed, the left operation lever 26L outputs a pilot pressure according to the amount of operation to one of the inlet ports of the shuttle valve 32AR and applies the pilot pressure on the pilot port on the left side of the control valve 176L and the pilot port on the right side of the control valve 176R through the shuttle valve 32AR.

The proportional valve 31AL operates in response to a control current input from the controller 30. Specifically, the proportional valve 31AL uses hydraulic oil discharged from the pilot pump 15 to output pilot pressure corresponding to the control current input from the controller 30 to the other pilot port of the shuttle valve 32AL. This allows the proportional valve 31AL to adjust the pilot pressure acting on the pilot port on the right side of the control valve 176L and the pilot port on the left side of the control valve 176R through the shuttle valve 32AL.

The proportional valve 31AR operates in response to a control current input from the controller 30. Specifically, the proportional valve 31AR uses hydraulic oil discharged from the pilot pump 15 to output pilot pressure corresponding to the control current input from the controller 30 to the other pilot port of the shuttle valve 32AR. This allows the proportional valve 31AR to adjust the pilot pressure acting on the pilot port on the left side of the control valve 176L and the pilot port on the right side of the control valve 176R through the shuttle valve 32AR.

That is, the proportional valves 31AL and 31AR can adjust the pilot pressure output to the secondary side so that the control valves 176L and 176R can be stopped at any valve position regardless of the operation state of the left operation lever 26L.

The decompression proportional valve 33AL operates in response to a control current input from the controller 30. Specifically, when the control current from the controller 30 is not input, the decompression proportional valve 33AL directly outputs the pilot pressure corresponding to the arm closing operation of the left operation lever 26L, to the secondary side. On the other hand, when the control current from the controller 30 is input, the decompression proportional valve 33AL decompresses the pilot pressure of the pilot line on the secondary side corresponding to the arm closing operation of the left operation lever 26L to a level corresponding to the control current, and outputs the decompressed pilot pressure to one of the inlet ports of the shuttle valve 32AL. Thus, the decompression proportional valve 33AL can forcibly suppress or stop the motion of the arm cylinder 8 corresponding to the arm closing operation if necessary, even when the arm closing operation is performed with the left operation lever 26L. Further, the decompression proportional valve 33AL can lower the pilot pressure acting on one of the inlet ports of the shuttle valve 32AL to a level lower than the pilot pressure acting on the other inlet port of the shuttle valve 32AL from the proportional valve 31AL, even when the left operation lever 26L is being operated to perform the arm closing operation. Accordingly, the controller 30 controls the proportional valve 31AL and the decompression proportional valve 33AL to ensure that the desired pilot pressure is applied to the pilot ports on the arm closing side of the control valves 176L and 176R.

The decompression proportional valve 33AR operates in response to a control current input from the controller 30. Specifically, the decompression proportional valve 33AR directly outputs a pilot pressure corresponding to the arm opening operation of the left operation lever 26L, to the secondary side, when a control current from the controller 30 is not input. On the other hand, when the control current from the controller 30 is input, the decompression proportional valve 33AR decompresses the pilot pressure of the pilot line on the secondary side corresponding to the arm opening operation of the left operation lever 26L, to a level corresponding to the control current, and outputs the decompressed pilot pressure to one of the inlet ports of the shuttle valve 32AR. Thus, the decompression proportional valve 33AR can forcibly suppress or stop the motion of the arm cylinder 8 corresponding to the arm opening operation if necessary, even when the arm opening operation is performed with the left operation lever 26L. Further, the decompression proportional valve 33AR can lower the pilot pressure acting on one of the inlet ports of the shuttle valve 32AR to a level lower than the pilot pressure acting on the other inlet port of the shuttle valve 32AR from the proportional valve 31AR, even when the left operation lever 26L is being operated to perform the arm opening operation. Accordingly, the controller 30 controls the proportional valve 31AR and the decompression proportional valve 33AR to ensure that the desired pilot pressure is applied to the pilot ports on the arm opening side of the control valves 176L and 176R.

As described above, the decompression proportional valves 33AL and 33AR can forcibly suppress or stop the motion of the arm cylinder 8 corresponding to the operation state of the left operation lever 26L in the front/back direction. Further, the decompression proportional valves 33AL and 33AR can decompress the pilot pressure acting on one of the inlet ports of the shuttle valves 32AL and 32AR and assist the pilot pressure of the proportional valves 31AL and 31AR to reliably act on the pilot ports of the control valves 176L and 176R through the shuttle valves 32AL and 32AR.

Note that instead of controlling the decompression proportional valve 33AL, the controller 30 may control the proportional valve 31AR to forcibly suppress or stop the motion of the arm cylinder 8 corresponding to the arm closing operation of the left operation lever 26L. For example, when the arm closing operation is performed with the left operation lever 26L, the controller 30 may control the proportional valve 31AR, to act on the pilot port on the arm opening side of the control valves 176L, 176R from the proportional valve 31AR through the shuttle valve 32AR. As a result, the pilot pressure is applied to the pilot port on the arm opening side of the control valves 176L and 176R in a manner as to oppose against the pilot pressure acting on the pilot port on the arm closing side of the control valves 176L and 176R from the left operation lever 26L through the shuttle valve 32AL. Accordingly, the controller 30 may forcibly bring the control valves 176L and 176R close to the neutral position to suppress or stop the motion of the arm cylinder 8 corresponding to the arm closing operation of the left operation lever 26L. Similarly, instead of controlling the decompression proportional valve 33AR, the controller 30 may control the proportional valve 31AL to forcibly suppress or stop the motion of the arm cylinder 8 corresponding to the arm opening operation of the left operation lever 26L.

The operation pressure sensor 29LA detects the operation content in the front/back direction with respect to the left operation lever 26L by the operator in the form of pressure (operation pressure), and a detection signal corresponding to the detected pressure is incorporated into the controller 30. This allows the controller 30 to recognize the operation content in the front/back direction with respect to the left operation lever 26L. The operation content in the front/back direction with respect to the left operation lever 26L that is the detection target may include, for example, an operation direction and an operation amount (operation angle). Hereinafter, the same shall apply to operation content in the left/right direction with respect to the left operation lever 26L and the operation content in the left/right direction with respect to the right operation lever 26R.

The controller 30 may supply hydraulic oil discharged from the pilot pump 15 through the proportional valve 31AL and the shuttle valve 32AL, to the pilot port on the right side of the control valve 176L and the pilot port on the left side of the control valve 176R, regardless of arm closing operation by the operator to the left operation lever 26L. Further, the controller 30 may supply hydraulic oil discharged from the pilot pump 15 to the pilot port on the left side of the control valve 176L and the pilot port on the right side of the control valve 176R through the proportional valve 31AR and the shuttle valve 32AR, regardless of the arm opening operation by the operator to the left operation lever 26L. That is, the controller 30 can automatically control the opening/closing operation of the arm 5.

Figure 10B:
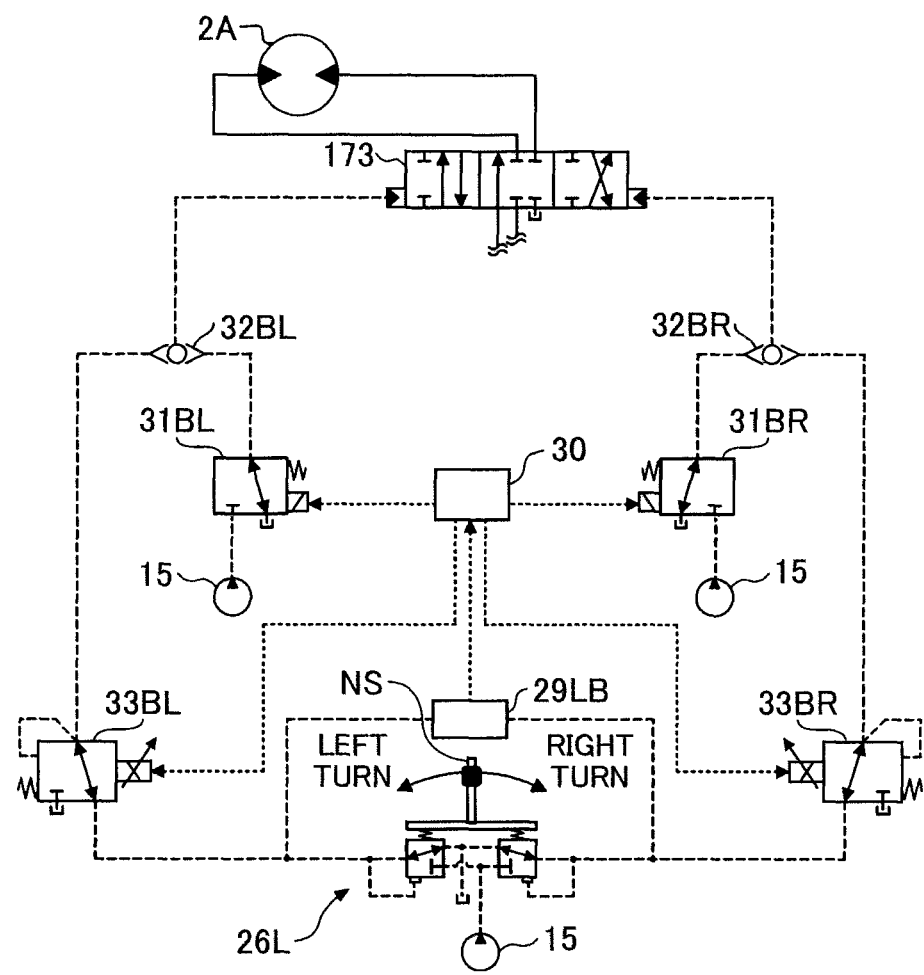
FIG. 10B is a detailed diagram illustrating the components relating to the operation system in the hydraulic system of FIG. 7.

Further, for example, as illustrated in FIG. 10B, the left operation lever 26L is used to operate the turning hydraulic motor 2A corresponding to the upper turning body 3 (the turning mechanism 2) in a manner as to be tilted in the left/right direction by the operator. That is, when the left operation lever 26L is tilted in the left/right direction, the turning motion of the upper turning body 3 is the operation target. The left operation lever 26L uses the hydraulic oil discharged from the pilot pump 15 to output a pilot pressure according to the operation content in the left/right direction to the secondary side.

In the shuttle valve 32BL, two inlet ports are respectively connected to a pilot line on the secondary side of the left operation lever 26L corresponding to a turning operation in the left direction of the upper turning body 3 (hereinafter, "left turning operation") and to a pilot line on the secondary side of the proportional valve 31BL, and the outlet port is connected to the pilot port on the left side of the control valve 173.

In the shuttle valve 32BR, two inlet ports are respectively connected to the pilot line on the secondary side of the left operation lever 26L corresponding to a turning operation in the right direction of the upper turning body 3 (hereinafter, "right turning operation") and to a pilot line on the secondary side of the proportional valve 31BR, and the outlet port is connected to the pilot port on the right side of the control valve 173.

That is, the left operation lever 26L applies a pilot pressure according to the operation content in the left/right direction, on the pilot port of the control valve 173 through the shuttle valves 32BL, 32BR. Specifically, when a left turning operation is performed, the left operation lever 26L outputs pilot pressure according to the amount of operation to one of the inlet ports of the shuttle valve 32BL to act on the pilot port on the left side of the control valve 173 through the shuttle valve 32BL. Further, when a right turning operation is performed, the left operation lever 26L outputs pilot pressure according to the amount of operation to one of the inlet ports of the shuttle valve 32BR to act on the pilot port on the right side of the control valve 173 through the shuttle valve 32BR.

The proportional valve 31BL operates in response to a control current input from the controller 30. Specifically, the proportional valve 31BL uses hydraulic oil discharged from the pilot pump 15 to output pilot pressure corresponding to the control current input from the controller 30 to the other pilot port of the shuttle valve 32BL. This allows the proportional valve 31BL to adjust the pilot pressure acting on the pilot port on the left side of the control valve 173 through the shuttle valve 32BL.

The proportional valve 31BR operates in response to the control current output by the controller 30. Specifically, the proportional valve 31BR uses hydraulic oil discharged from the pilot pump 15 to output pilot pressure corresponding to the control current input from the controller 30 to the other pilot port of the shuttle valve 32BR. This allows the proportional valve 31BR to adjust the pilot pressure acting on the pilot port on the right side of the control valve 173 through the shuttle valve 32BR.

That is, the proportional valves 31BL, 31BR can adjust the pilot pressure output to the secondary side so that the control valve 173 can be stopped at any valve position regardless of the operation state of the left operation lever 26L.

The decompression proportional valve 33BL operates in response to a control current input from the controller 30. Specifically, when the control current from the controller 30 is not input, the decompression proportional valve 33BL directly outputs the pilot pressure corresponding to the left turning operation of the left operation lever 26L to the secondary side. On the other hand, when the control current from the controller 30 is input, the decompression proportional valve 33BL decompresses the pilot pressure of the pilot line on the secondary side corresponding to the left turning operation of the left operation lever 26L to a level corresponding to the control current, and outputs the decompressed pilot pressure to one of the inlet ports of the shuttle valve 32BL. Accordingly, the decompression proportional valve 33BL can forcibly suppress or stop the motion of the turning hydraulic motor 2A corresponding to the left turning operation if necessary, even when the left turning operation is performed with the left operation lever 26L. Further, the decompression proportional valve 33BL can lower the pilot pressure acting on one of the inlet ports of the shuttle valve 32BL to a level lower than the pilot pressure acting on the other inlet port of the shuttle valve 32BL from the proportional valve 31BL, even when the left operation lever 26L is being operated to perform a left turning operation. Thus, the controller 30 controls the proportional valve 31BL and the decompression proportional valve 33BL to ensure that the desired pilot pressure is applied to the pilot port on the left turning side of the control valve 173.

The decompression proportional valve 33BR operates in response to a control current input from the controller 30. Specifically, when the control current from the controller 30 is not input, the decompression proportional valve 33BR directly outputs the pilot pressure corresponding to the right turning operation of the left operation lever 26L to the secondary side. On the other hand, when the control current from the controller 30 is input, the decompression proportional valve 33BR decompresses the pilot pressure of the pilot line on the secondary side corresponding to the right turning operation of the left operation lever 26L to a level corresponding to the control current, and outputs the decompressed pilot pressure to one of the inlet ports of the shuttle valve 32BR. Accordingly, the decompression proportional valve 33BR can forcibly suppress or stop the motion of the turning hydraulic motor 2A corresponding to the right turning operation if necessary, even when the left operation lever 26L is being operated to perform a right turning operation. Further, the decompression proportional valve 33BR can lower the pilot pressure acting on one of the inlet ports of the shuttle valve 32BR to a level lower than the pilot pressure acting on the other inlet port of the shuttle valve 32BR from the proportional valve 31BR, even when the left operation lever 26L is being operated to perform a right turning operation. Accordingly, the controller 30 controls the proportional valve 31BR and the decompression proportional valve 33BR to ensure that the desired pilot pressure is applied to the pilot port on the right turning side of the control valve 173.

As described above, the decompression proportional valves 33BL and 33BR can forcibly suppress or stop the motion of the turning hydraulic motor 2A corresponding to the operation state of the left operation lever 26L in the left/right direction. Further, the decompression proportional valves 33BL and 33BR can lower the pilot pressure acting on one of the inlet ports of the shuttle valves 32BL and 32BR to assist the pilot pressure of the proportional valves 31BL and 31BR to reliably act on the pilot port of the control valve 173 through the shuttle valves 32BL and 32BR.

Instead of controlling the decompression proportional valve 33BL, the controller 30 may control the proportional valve 31BR to forcibly suppress or stop the motion of the turning hydraulic motor 2A corresponding to the left turning operation of the left operation lever 26L. For example, when a left turning operation is performed with the left operation lever 26L, the controller 30 may control the proportional valve 31BR to act on the pilot port on the right turning side of the control valve 173 through the shuttle valve 32BR from the proportional valve 31BR. As a result, the pilot pressure is applied to the pilot port on the right turning side of the control valve 173 in a manner as to oppose against the pilot pressure acting on the pilot port on the left turning side of the control valve 173 from the left operation lever 26L through the shuttle valve 32BL. Accordingly, the controller 30 may forcibly bring the control valve 173 close to the neutral position to suppress or stop the motion of the turning hydraulic motor 2A corresponding to the left turning operation of the left operation lever 26L. Similarly, instead of controlling the decompression proportional valve 33BR, the controller 30 may control the proportional valve 31BL to forcibly suppress or stop the motion of the turning hydraulic motor 2A corresponding to the right turning operation of the left operation lever 26L.

The operation pressure sensor 29LB detects the operation state with respect to the left operation lever 26L by the operator as pressure and a detection signal corresponding to the detected pressure is incorporated into the controller 30. This allows the controller 30 to recognize the operation content in the left/right direction with respect to the left operation lever 26L.

The controller 30 may cause the hydraulic oil discharged from the pilot pump 15 to be supplied to the pilot port on the left side of the control valve 173 through the proportional valve 31BL and the shuttle valve 32BL, regardless of the operator's left turning operation with respect to the left operation lever 26L. Further, the controller 30 may cause the hydraulic oil discharged from the pilot pump 15 to be supplied to the pilot port on the right side of the control valve 173 through the proportional valve 31BR and the shuttle valve 32BR, regardless of the operator's right turning operation with respect to the left operation lever 26L. That is, the controller 30 can automatically control the turning motion of the upper turning body 3 in the right/left direction.

Figure 10C:
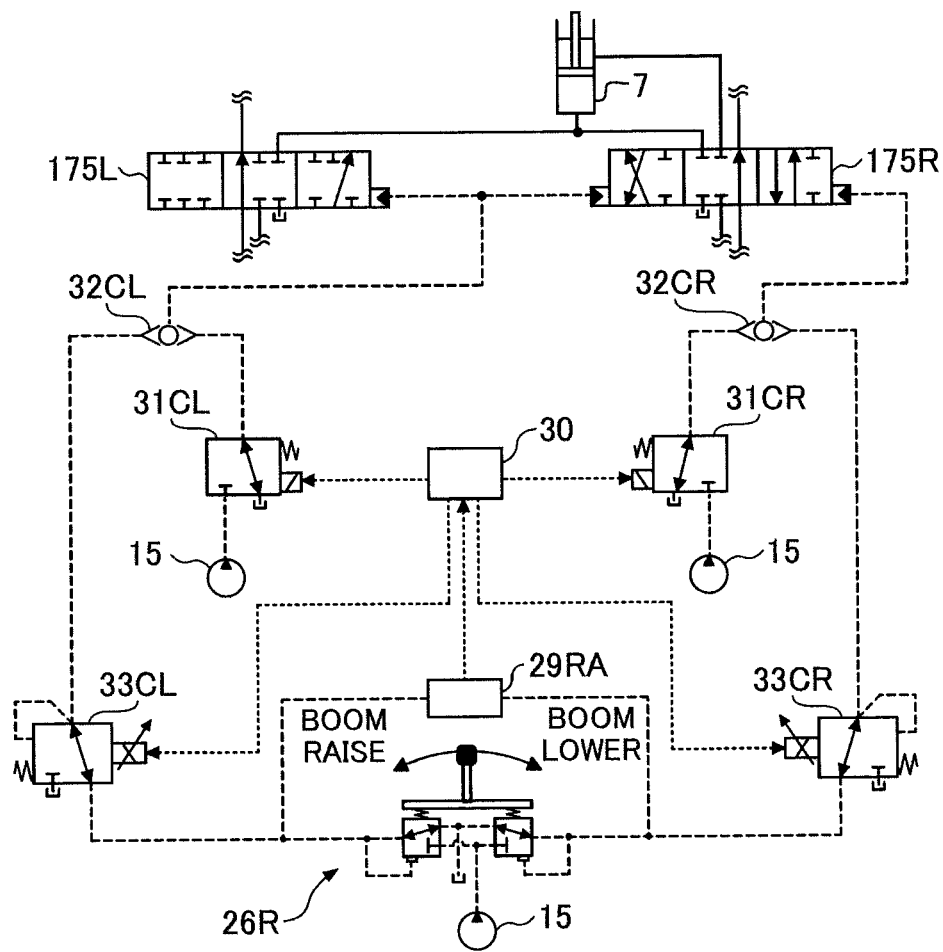
FIG. 10C is a detailed diagram illustrating the components relating to the operation system in the hydraulic system of FIG. 7.

Further, for example, as illustrated in FIG. 10C, the right operation lever 26R is used to operate the boom cylinder 7 corresponding to the boom 4 by being tilted in the front/back direction by the operator. That is, when the right operation lever 26R is tilted in the front/back direction, the motion of the boom 4 is the operation target. The right operation lever 26R uses the hydraulic oil discharged from the pilot pump 15 to output the pilot pressure according to the operation content in the front/back direction to the secondary side.

In the shuttle valve 32CL, two inlet ports are respectively connected to a pilot line on the secondary side of the right operation lever 26R corresponding to an operation in the raising direction of the boom 4 (hereinafter, "boom raising operation") and to a pilot line on the secondary side of the proportional valve 31CL, and the outlet port is connected to the pilot port on the right side of the control valve 175L and to the pilot port on the left side of the control valve 175R.

In the shuttle valve 32CR, two inlet ports are respectively connected to a pilot line on the secondary side of the right operation lever 26R corresponding to an operation in the lowering direction of the boom 4 (hereinafter, "boom lowering operation") and to a pilot line on the secondary side of the proportional valve 31CR, and the outlet port is connected to the pilot port on the right side of the control valve 175R.

That is, the right operation lever 26R applies a pilot pressure according to the operation content in the front/back direction, on the pilot ports of the control valves 175L, 175R through the shuttle valves 32CL, 32CR. Specifically, when the boom raising operation is performed, the right operation lever 26R outputs pilot pressure according to the amount of operation to one of the inlet ports of the shuttle valve 32CL and applies the pilot pressure on the pilot port on the right side of the control valve 175L and the pilot port on the left side of the control valve 175R through the shuttle valve 32CL. When the boom lowering operation is performed, the right operation lever 26R outputs a pilot pressure according to the amount of operation to one of the inlet ports of the shuttle valve 32CR and applies the pilot pressure on the pilot port on the right side of the control valve 175R through the shuttle valve 32CR.

The proportional valve 31CL operates in response to a control current input from the controller 30. Specifically, the proportional valve 31CL uses hydraulic oil discharged from the pilot pump 15 to output pilot pressure corresponding to the control current input from the controller 30 to the other inlet port of the shuttle valve 32CL. This allows the proportional valve 31CL to adjust the pilot pressure acting on the pilot port on the right side of the control valve 175L and the pilot port on the left side of the control valve 175R through the shuttle valve 32CL.

The proportional valve 31CR operates in response to a control current input from the controller 30. Specifically, the proportional valve 31CR uses hydraulic oil discharged from the pilot pump 15 to output pilot pressure corresponding to the control current input from the controller 30 to the other inlet port of the shuttle valve 32CR. This allows the proportional valve 31CR to adjust the pilot pressure acting on the pilot port on the right side of the control valve 175R through the shuttle valve 32CR.

That is, the proportional valves 31CL and 31CR can adjust the pilot pressure output to the secondary side so that the control valves 175L and 175R can be stopped at any valve position regardless of the operation state of the right operation lever 26R.

The decompression proportional valve 33CL operates in response to a control current input from the controller 30. Specifically, when the control current from the controller 30 is not input, the decompression proportional valve 33CL directly outputs the pilot pressure corresponding to the boom raising operation of the right operation lever 26R to the secondary side. On the other hand, when the control current from the controller 30 is input, the decompression proportional valve 33CL decompresses the pilot pressure of the pilot line on the secondary side corresponding to the boom raising operation of the right operation lever 26R to a level corresponding to the control current, and outputs the decompressed pilot pressure to one of the inlet ports of the shuttle valve 32CL. Accordingly, the decompression proportional valve 33CL can forcibly suppress or stop the motion of the boom cylinder 7 corresponding to the boom raising operation if necessary, even when a boom raising operation is performed with the right operation lever 26R. Further, the decompression proportional valve 33CL can lower the pilot pressure acting on one of the inlet ports of the shuttle valve 32CL to a level lower than the pilot pressure acting on the other inlet port of the shuttle valve 32CL from the proportional valve 31CL, even when the right operation lever 26R is being used to perform a boom raising operation. Accordingly, the controller 30 controls the proportional valve 31CL and the decompression proportional valve 33CL to ensure that the desired pilot pressure is applied to the pilot port on the boom raising side of the control valves 175L and 175R.

The decompression proportional valve 33CR operates in response to a control current input from the controller 30. Specifically, when the control current from the controller 30 is not input, the decompression proportional valve 33CR directly outputs the pilot pressure corresponding to the boom lowering operation of the right operation lever 26R to the secondary side. On the other hand, when the control current from the controller 30 is input, the decompression proportional valve 33CR decompresses the pilot pressure on the pilot line on the secondary side corresponding to the boom lowering operation of the right operation lever 26R to a level corresponding to the control current, and outputs the decompressed pilot pressure to one of the inlet ports of the shuttle valve 32CR. Accordingly, the decompression proportional valve 33CR can forcibly suppress or stop the motion of the boom cylinder 7 corresponding to the boom lowering operation if necessary, even when the right operation lever 26R is being used to perform a boom lowering operation. Further, the decompression proportional valve 33CR can lower the pilot pressure acting on one of the inlet ports of the shuttle valve 32CR to a lower level than the pilot pressure acting on the other inlet port of the shuttle valve 32CR from the proportional valve 31CR, even when the right operation lever 26R is being used to perform a boom lowering operation. Accordingly, the controller 30 controls the proportional valve 31CR and the decompression proportional valve 33CR to ensure that the desired pilot pressure is applied to the pilot port at the boom lowering side of the control valves 175L and 175R.

As described above, the decompression proportional valves 33CL and 33CR can forcibly suppress or stop the motion of the boom cylinder 7 corresponding to the operation state of the right operation lever 26R in the front/back direction. Further, the decompression proportional valves 33CL and 33CR can decompress the pilot pressure acting on one of the inlet ports of the shuttle valves 32CL and 32CR and assist the pilot pressure of the proportional valves 31CL and 31CR to reliably act on the pilot port of the control valves 175L and 175R through the shuttle valves 32CL and 32CR.

The controller 30 may control the proportional valve 31CR instead of the decompression proportional valve 33CL to forcibly suppress or stop the motion of the boom cylinder 7 corresponding to the boom raising operation of the right operation lever 26R. For example, when a boom raising operation is performed with the right operation lever 26R, the controller 30 may control the proportional valve 31CR to act on the pilot port at the boom lowering side of the control valves 175L and 175R from the proportional valve 31CR through the shuttle valve 32CR. As a result, the pilot pressure is applied to the pilot port at the boom lowering side of the control valves 175L and 175R in a manner as to oppose against the pilot pressure acting on the pilot port at the boom raising side of the control valves 175L and 175R from the right operation lever 26R through the shuttle valve 32CL. Therefore, the controller 30 can forcibly bring the control valves 175L and 175R close to the neutral position to suppress or stop the motion of the boom cylinder 7 corresponding to the boom raising operation of the right operation lever 26R. Similarly, instead of controlling the decompression proportional valve 33CR, the controller 30 may control the proportional valve 31CL to forcibly suppress or stop the motion of the boom cylinder 7 corresponding to the boom lowering operation of the right operation lever 26R.

The operation pressure sensor 29RA detects the operation content in the front/back direction with respect to the right operation lever 26R by the operator in the form of a pressure (operation pressure), and a detection signal corresponding to the detected pressure is incorporated into the controller 30. This allows the controller 30 to recognize the operation content in the front/back direction with respect to the right operation lever 26R.

The controller 30 may cause the hydraulic oil discharged from the pilot pump 15 to be supplied to the pilot port on the right side of the control valve 175L and the pilot port on the left side of the control valve 175R through the proportional valve 31CL and the shuttle valve 32CL, regardless of the operator's boom raising operation with respect to the right operation lever 26R. Further, the controller 30 may supply hydraulic oil discharged from the pilot pump 15 to the pilot port on the right side of the control valve 175R through the proportional valve 31CR and the shuttle valve 32CR, regardless of the operator's boom lowering operation with respect to the right operation lever 26R. That is, the controller 30 can automatically control the raising and lowering motion of the boom 4.

Figure 10D:
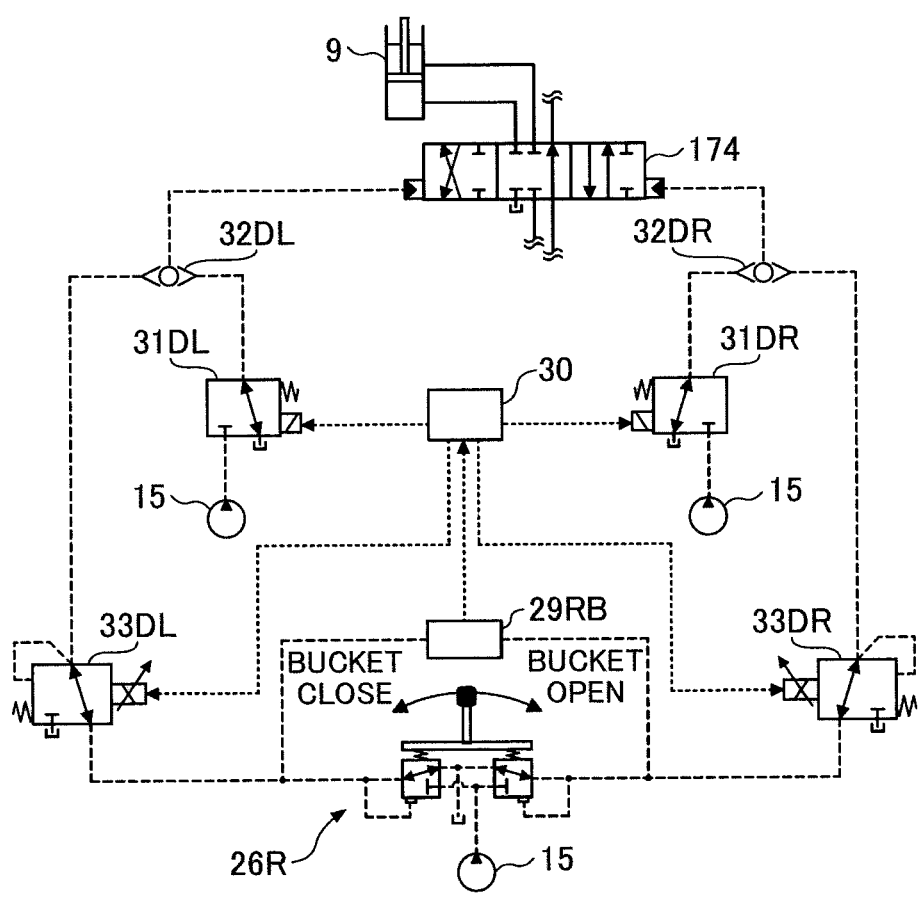
FIG. 10D is a detailed diagram illustrating the components relating to the operation system in the hydraulic system of FIG. 7.

As illustrated in FIG. 10D, the right operation lever 26R is used to operate the bucket cylinder 9 corresponding to the bucket 6 in a manner as to be tilted in the left/right direction by the operator. That is, when the right operation lever 26R is tilted in the left/right direction, the motion of the bucket 6 is the operation target. The right operation lever 26R uses the hydraulic oil discharged from the pilot pump 15 to output the pilot pressure according to the operation content in the left/right direction to the secondary side.

In the shuttle valve 32DL, two inlet ports are respectively connected to the pilot line on the secondary side of the right operation lever 26R corresponding to an operation in the closing direction of the bucket 6 (hereinafter, "bucket closing operation") and to a pilot line on the secondary side of the proportional valve 31DL, and the outlet port is connected to the pilot port on the left side of the control valve 174.

In the shuttle valve 32DR, two inlet ports are respectively connected to the pilot line on the secondary side of the right operation lever 26R corresponding to an operation in the opening direction of the bucket 6 (hereinafter, "bucket opening operation") and to a pilot line on the secondary side of the proportional valve 31DR, and the outlet port is connected to the pilot port on the right side of the control valve 174.

That is, the right operation lever 26R applies a pilot pressure according to the operation content in the left/right direction, on the pilot port of the control valve 174 through the shuttle valves 32DL, 32DR. Specifically, when a bucket closing operation is performed, the right operation lever 26R outputs pilot pressure according to the amount of operation to one of the inlet ports of the shuttle valve 32DL to act on the pilot port on the left side of the control valve 173 through the shuttle valve 32DL. Further, when a bucket opening operation is performed, the right operation lever 26R outputs pilot pressure according to the amount of operation to one of the inlet ports of the shuttle valve 32DR to act on the pilot port on the right side of the control valve 174 through the shuttle valve 32DR.

The proportional valve 31DL operates in response to a control current input from the controller 30. Specifically, the proportional valve 31DL uses hydraulic oil discharged from the pilot pump 15 to output pilot pressure corresponding to the control current input from the controller 30 to the other pilot port of the shuttle valve 32DL. This allows the proportional valve 31DL to adjust the pilot pressure acting on the pilot port on the left side of the control valve 174 through the shuttle valve 32DL.

The proportional valve 31DR operates in response to the control current output by the controller 30. Specifically, the proportional valve 31DR uses hydraulic oil discharged from the pilot pump 15 to output pilot pressure corresponding to the control current input from the controller 30 to the other pilot port of the shuttle valve 32DR. This allows the proportional valve 31DR to adjust the pilot pressure acting on the pilot port on the right side of the control valve 174 through the shuttle valve 32DR.

That is, the proportional valves 31DL, 31DR can adjust the pilot pressure output to the secondary side so that the control valve 174 can be stopped at any valve position regardless of the operation state of the right operation lever 26R.

The decompression proportional valve 33DL operates in response to a control current input from the controller 30. Specifically, when the control current from the controller 30 is not input, the decompression proportional valve 33DL directly outputs the pilot pressure corresponding to the bucket closing operation of the right operation lever 26R to the secondary side. On the other hand, when the control current from the controller 30 is input, the decompression proportional valve 33DL decompresses the pilot pressure of the pilot line on the secondary side corresponding to the bucket closing operation of the right operation lever 26R to a level corresponding to the control current, and outputs the decompressed pilot pressure to one of the inlet ports of the shuttle valve 32DL. Accordingly, the decompression proportional valve 33DL can forcibly suppress or stop the motion of the bucket cylinder 9 corresponding to the bucket closing operation if necessary, even when the bucket closing operation is performed with the right operation lever 26R. Further, the decompression proportional valve 33DL can lower the pilot pressure acting on one of the inlet ports of the shuttle valve 32DL to a level lower than the pilot pressure acting on the other inlet port of the shuttle valve 32DL from the proportional valve 31DL, even when the right operation lever 26R is being operated to perform a bucket closing operation. Thus, the controller 30 controls the proportional valve 31DL and the decompression proportional valve 33DL to ensure that the desired pilot pressure is applied to the pilot port on the bucket closing side of the control valve 174.

The decompression proportional valve 33DR operates in response to a control current input from the controller 30. Specifically, when the control current from the controller 30 is not input, the decompression proportional valve 33DR directly outputs the pilot pressure corresponding to the bucket opening operation of the right operation lever 26R to the secondary side. On the other hand, when the control current from the controller 30 is input, the decompression proportional valve 33DR decompresses the pilot pressure of the pilot line on the secondary side corresponding to the bucket opening operation of the right operation lever 26R to a level corresponding to the control current, and outputs the decompressed pilot pressure to one of the inlet ports of the shuttle valve 32DR. Accordingly, the decompression proportional valve 33DR can forcibly suppress or stop the motion of the bucket cylinder 9 corresponding to the bucket opening operation if necessary, even when the right operation lever 26R is being operated to perform a bucket opening operation. Further, the decompression proportional valve 33DR can lower the pilot pressure acting on one of the inlet ports of the shuttle valve 32DR to a level lower than the pilot pressure acting on the other inlet port of the shuttle valve 32DR from the proportional valve 31DR, even when the right operation lever 26R is being operated to perform a bucket opening operation. Accordingly, the controller 30 controls the proportional valve 31DR and the decompression proportional valve 33DR to ensure that the desired pilot pressure is applied to the pilot port on the bucket opening side of the control valve 174.

As described above, the decompression proportional valves 33DL and 33DR can forcibly suppress or stop the motion of the bucket cylinder 9 corresponding to the operation state of the right operation lever 26R in the left/right direction. Further, the decompression proportional valves 33DL and 33DR can lower the pilot pressure acting on one of the inlet ports of the shuttle valves 32DL and 32DR to assist the pilot pressure of the proportional valves 3/DL and 31DR to reliably act on the pilot port of the control valve 174 through the shuttle valves 32DL and 32DR.

Instead of controlling the decompression proportional valve 33DL, the controller 30 may control the proportional valve 31DR to forcibly suppress or stop the motion of the bucket cylinder 9 corresponding to the bucket closing operation of the right operation lever 26R. For example, when a bucket closing operation is performed with the right operation lever 26R, the controller 30 may control the proportional valve 31DR to act on the pilot port on the bucket opening side of the control valve 174 through the shuttle valve 32DR from the proportional valve 31DR. As a result, the pilot pressure is applied to the pilot port on the bucket opening side of the control valve 174 in a manner as to oppose against the pilot pressure acting on the pilot port on the bucket closing side of the control valve 174 from the right operation lever 26R through the shuttle valve 32DL. Accordingly, the controller 30 may forcibly bring the control valve 174 close to the neutral position to suppress or stop the motion of the bucket cylinder 9 corresponding to the bucket closing operation of the right operation lever 26R. Similarly, instead of controlling the decompression proportional valve 33DR, the controller 30 may control the proportional valve 31DL to forcibly suppress or stop the motion of the bucket cylinder 9 corresponding to the bucket opening operation of the right operation lever 26R.

The operation pressure sensor 29RB detects the operation content in the left/right direction with respect to the right operation lever 26R by the operator in the form of pressure (operation pressure) and a detection signal corresponding to the detected pressure is incorporated into the controller 30. This allows the controller 30 to recognize the operation content in the left/right direction with respect to the right operation lever 26R.

The controller 30 may cause the hydraulic oil discharged from the pilot pump 15 to be supplied to the pilot port on the left side of the control valve 174 through the proportional valve 31DL and the shuttle valve 32DL, regardless of the operator's bucket closing operation with respect to the right operation lever 26R. Further, the controller 30 may cause the hydraulic oil discharged from the pilot pump 15 to be supplied to the pilot port on the right side of the control valve 174 through the proportional valve 31DR and the shuttle valve 32DR, regardless of the operator's bucket opening operation with respect to the right operation lever 26R. That is, the controller 30 can automatically control the opening and closing motion of the bucket 6.

The lower traveling body 1 may be configured to be automatically controlled by the controller 30, similar to the boom 4, the arm 5, the bucket 6, and the upper turning body 3. In this case, for example, to the pilot line on the secondary side between each of the left traveling lever 26DL and the right traveling lever 26DR, and the corresponding control valve 171, 172, the shuttle valve 32 is to be provided, and the proportional valve 31 controllable by the controller 30 is to be provided by being connected to the shuttle valve 32. Accordingly, the controller 30 can automatically control the traveling motion of the lower traveling body 1 by outputting a control current to the proportional valve 31.

As a configuration of the control system, the excavator 100 according to the present example mainly includes the controller 30, the ECU 74, the boom angle sensor S1, the arm angle sensor S2, the bucket angle sensor S3, the machine tilt sensor S4, the turning state sensor S5, the boom cylinder pressure sensor 7a, the object detection device 70, the imaging device 80, the display device D1, and the voice sound output device D2, similar to the excavator 100 of the above example.

The controller 30 controls the excavator 100 with respect to a machine guidance function that guides the operator's manual operation of the excavator 100.

For example, the controller 30 communicates work information such as the distance between a target construction surface and the leading end of the attachment AT (e.g., the claw tip of the bucket 6, the back surface of the bucket 6, etc.) to an operator through the display device D1, the voice sound output device D2, or the like. Specifically, the controller 30 acquires information from the boom angle sensor S1, the arm angle sensor S2, the bucket angle sensor S3, the machine tilt sensor S4, the turning state sensor S5, the object detection device 70, the imaging device 80, the positioning device, or the like. The controller 30 may, for example, calculate the distance between the bucket 6 and the target construction surface based on the acquired information and notify the operator of the calculated distance by an image displayed on the display device D1 or a voice sound output from the voice sound output device D2. Thus, the controller 30 can notify an operator of the operation information through the display device D1, the voice sound output device D2, or the like, and guide the operation of the excavator 100 through the operation device 26. The data relating to the target construction surface is represented, for example, in a predetermined reference coordinate system, e.g., a world geodetic system. The world geodetic system is a three-dimensional orthogonal XYZ coordinate system having an origin at the center of the earth's gravity, in which the X-axis is in the direction of the intersection of the Greenwich meridian and equator, the Y-axis is in the direction of 90 degrees east longitude, and the Z-axis is in the direction of the North Pole.

Further, for example, the controller 30 supports the manual operation of the excavator 100 by an operator, and executes control of the excavator 100 relating to a machine control function for causing the excavator 100 to move automatically or autonomously. For example, the machine control function is enabled while the switch NS is pressed. That is, the operator or the like can operate the operation device 26 while pressing the switch NS to cause the excavator 100 to perform the work using the machine control function. For example, the machine control function may be enabled when the distance between the target construction surface and a predetermined portion of the attachment AT to be controlled (e.g., the claw tip of the bucket 6; hereinafter, "the control target portion") becomes relatively short, that is, below a predetermined threshold value.

The controller 30, for example, calculates the target trajectory of the claw tip of the bucket 6 so that the claw tip of the bucket 6 does not pass across the target construction surface when the operator performs manual operation to drill or level the ground, etc., while the machine control function is enabled. The controller 30 may control the proportional valve 31 to move the bucket 6 along the calculated target trajectory and cause the boom 4, the arm 5, and the bucket 6 to move autonomously. Accordingly, the operator or the like can easily cause the excavator 100 to perform the drilling work, the leveling work, or the like, so that the claw tip of the bucket 6 or the like does not pass across the target construction surface, regardless of the level of operation skill.

The controller 30, for example, calculates the target trajectory of the claw tip of the bucket 6 so that the claw tip of the bucket 6 coincides with the target construction surface when the operator is operating the left operation lever 26L in a front/back direction with the machine control function enabled. The controller 30 may control the proportional valve 31 to move the bucket 6 along the calculated target trajectory and cause at least one of the boom 4, the arm 5, and the bucket 6 to move autonomously. Accordingly, the operator can operate the excavator 100 to perform excavation work, leveling work, or the like to realize the target construction surface, by simply operating the left operation lever 26L in a front/back direction.

Further, the controller 30, for example, calculates a target trajectory of a control target portion, such as a claw tip of the bucket 6, for moving the bucket 6 onto a target position for disposing waste soil (hereinafter, a "waste soil disposal target position") set in advance when a combined operation of a boom raising operation and a turning operation (hereinafter, a "boom raising and turning operation") is performed through the operation device 26 while the machine control function is enabled. The controller 30 may control the proportional valve 31 so that the claw tip of the bucket 6 or the like moves along a target trajectory and cause at least one of the upper turning body 3, the boom 4, the arm 5, and the bucket 6 to move autonomously. Thus, the operator or the like can easily move the bucket 6 to a predetermined location (the waste soil disposal target position) and dispose waste soil such as earth and sand and the like contained in the bucket 6 regardless of the degree of operation skill.

Further, the controller 30 may realize, for example, a boom raising and turning operation of the excavator 100 semi-automatically with the machine control function enabled, i.e., by either a boom raising operation of the right operation lever 26R or a turning operation of the left operation lever 26L. In this case, the controller 30 may control the proportional valve 31 to move along the calculated target trajectory so that the claw tip of the bucket 6 or the like moves toward a predetermined waste soil disposal target position in response to either a boom raising operation of the right operation lever 26R or a turning operation of the left operation lever 26L, and cause at least one of the upper turning body 3, the boom 4, the arm 5, and the bucket 6 to move autonomously. Accordingly, the operator or the like can perform only one of the boom raising operation of the right operation lever 26R and the turning operation of the left operation lever 26L to cause the excavator 100 to perform the boom raising and turning operation and to dispose the earth and sand contained in the bucket 6 to a predetermined location.

(Setting Method of Work Area Around the Excavator)

Next, a method of setting the work area around the excavator 100 by the controller 30 will be described with reference to FIG. 11.

Figure 11:
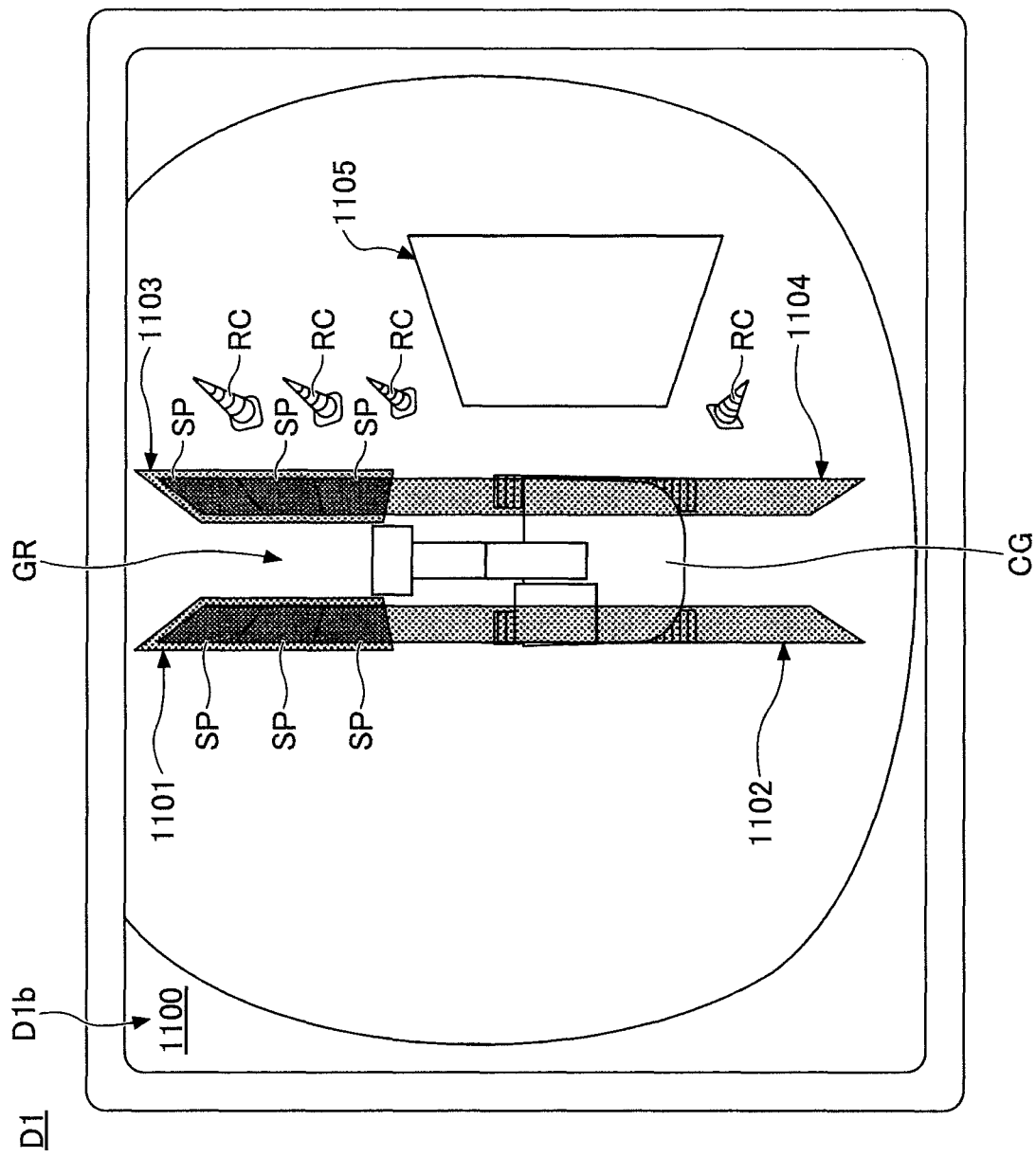
FIG. 11 is a diagram illustrating another example of the display contents of a display device in a setting mode.

FIG. 11 is a diagram illustrating another example of the display content of the display device D1 in the setting mode. Specifically, FIG. 11 is a diagram illustrating another example of a setting screen (a setting screen 1100) relating to a work area around the excavator 100. In this example, the setting screen 1100 is an operation screen for setting the target object (specifically, the target construction surface and the waste soil disposal target position) in the work area as an example of setting the work area according to an operation by an operator or the like on the operation input unit D1c. The controller 30 sets the target object according to an operation with respect to the setting screen 1100.

Similar to the case of the above example of the excavator 100 (FIG. 6), the display device D1 displays the setting screen 1100 on the image display part D1b under the control of the display control unit D1a. Specifically, the setting screen 1100 displays a bird's-eye image viewed from directly above the excavator 100 (hereinafter, simply referred to as a "bird's-eye image") (an example of an image representing a work area) that is generated by combining the images captured by the front camera 80F, the back camera 80B, the left camera 80L, and the right camera 80R after performing a known viewpoint conversion process. The image CG representing the excavator 100 (hereinafter, the "excavator image") is disposed at the center of the bird's-eye image. In this example, the excavator 100 is positioned so that the attachment AT faces the already drilled groove GR for drilling a straight groove. Further, a sheet pile SP is installed on the wall of the groove GR that has already been drilled in front of the excavator 100 (the upper turning body 3). On the left side of the already drilled groove GR and the portion to be drilled from now on, the road cones RC are disposed along the direction in which the already drilled groove GR and the portion to be drilled from now on extend.

The display control unit D1a displays the bird's-eye image on the image display part D1b (the setting screen 1100), in which the coordinates predefined for the work area and the respective pixels of the bird's-eye image (an example of an image component portion) are associated with each other, based on the setting coordinate system, in the same manner as in the case of the example of the excavator 100 (FIG. 6) described above. Thus, for example, by specifying a pixel in the bird's-eye image of the setting screen 1100 through the operation input unit D1c (for example, a touch panel), the operator, etc., can specify a part of the work area corresponding to the coordinates associated with the pixel, that is, a part of the work area displayed on the pixel.

The display control unit D1a displays the bird's-eye image on the image display part D1b (the setting screen 600) in such a state that the coordinates of the object (the target object) detected by the object detection device 70 in the work area and the pixels corresponding to the object in the bird's-eye image (for example, the pixels of the image portion in which the object is included) are associated with each other, based on the setting coordinate system, as in the case of the example of the excavator 100 (FIG. 6) described above. Thus, for example, the operator or the like can specify a pixel of an image portion in which an object in the bird's-eye image of the setting screen 1100 is appearing (included), through the operation input unit D1c, to specify an object that is located at coordinates corresponding to the specified pixel.

In the present example, as described above, the bird's-eye image constituting the setting screen 1100 includes the groove GR already drilled in front of the excavator 100 (the upper turning body 3) and the three sheet piles SP (an example of an object) installed on each of the walls on the left and right sides of the groove GR. Accordingly, by specifying pixels of the image portion including the sheet piles SP through the operation input unit D1c, the operator or the like can specify the sheet piles SP as a reference for the target construction surface (in this example, the walls of the groove GR).

Specifically, when pixels of the image portion including the sheet piles SP on the left side of the setting screen 1100 are specified, the display control unit D1a displays an icon 1101 surrounding the group of pixels including the sheet piles SP on the setting screen 1100. The display control unit D1a notifies that the sheet piles SP of the wall on the left side of the already drilled groove GR are specified. Thus, the controller 30 can set the sheet piles SP of the wall on the left side of the already drilled groove GR as a reference object of the target construction surface (the wall on the left side of the groove GR to be drilled from now on). The controller 30 sets the target construction surface in a manner that the backside of the sheet piles SP extends in a front/back direction. In this case, the display control unit D1a displays an icon 1102 indicating that a target construction surface is set in the extending direction of the specified three sheets of sheet piles SP on the left side, in the setting screen 1100.

In the present example, three sheet piles SP of the wall on the left side of the groove GR that has already been drilled, are specified by the operation of the operation input unit D1c, but one or two sheet piles SP may be specified. Hereinafter, the same applies to the case where the sheet piles SP of the wall on the right side of the already drilled groove GR is specified.

Similarly, when pixels of the image portion including the sheet piles SP on the right side of the setting screen 1100 are specified, the display control unit D1a displays an icon 1103 surrounding the group of pixels including the sheet piles SP on the setting screen 1100. The display control unit D1a notifies that the sheet piles SP of the wall on the right side of the groove GR that has already been drilled, are specified. Thus, the controller 30 can set the sheet piles SP of the wall on the right side of the already drilled groove GR as the reference object of the target construction surface (the wall on the right side of the groove GR to be drilled from now on). The controller 30 sets the target construction surface in a manner that the backside of the sheet pile SP extends in a front/back direction. In this case, the display control unit D1a displays an icon 1104 indicating that a target construction surface is set in the extending direction of the specified three sheets of sheet piles SP on the right side, in the setting screen 1100.

The target construction surface may be set by the controller 30 automatically based on the specification of the sheet pile SP on the setting screen 1100, or may be performed when a predetermined operation is performed through the operation input unit D1c after the specification of the sheet pile SP. The same shall apply to the setting of the waste soil disposal target position, which will be described later.

In the present example, an operator or the like specifies, through the operation input unit D1c, a ground portion adjacent to the right side of the excavator image CG in the bird's-eye image in the setting screen 1100. The display control unit D1a displays an icon 1105 representing that the ground portion is specified, on the corresponding ground portion. The display control unit D1a notifies the controller 30 that the ground portion on the right side of the excavator 100 is specified. This allows the controller 30 to set the ground portion on the right side of the excavator 100 as the waste soil disposal target position during excavation work of the excavator 100.

(Specific Example of Setting Content Relating to the Work Area Around the Excavator)

Next, a specific example of the work of the excavator 100 based on the setting content of the work area around the excavator 100 will be described with reference to FIG. 12.

Figure 12:
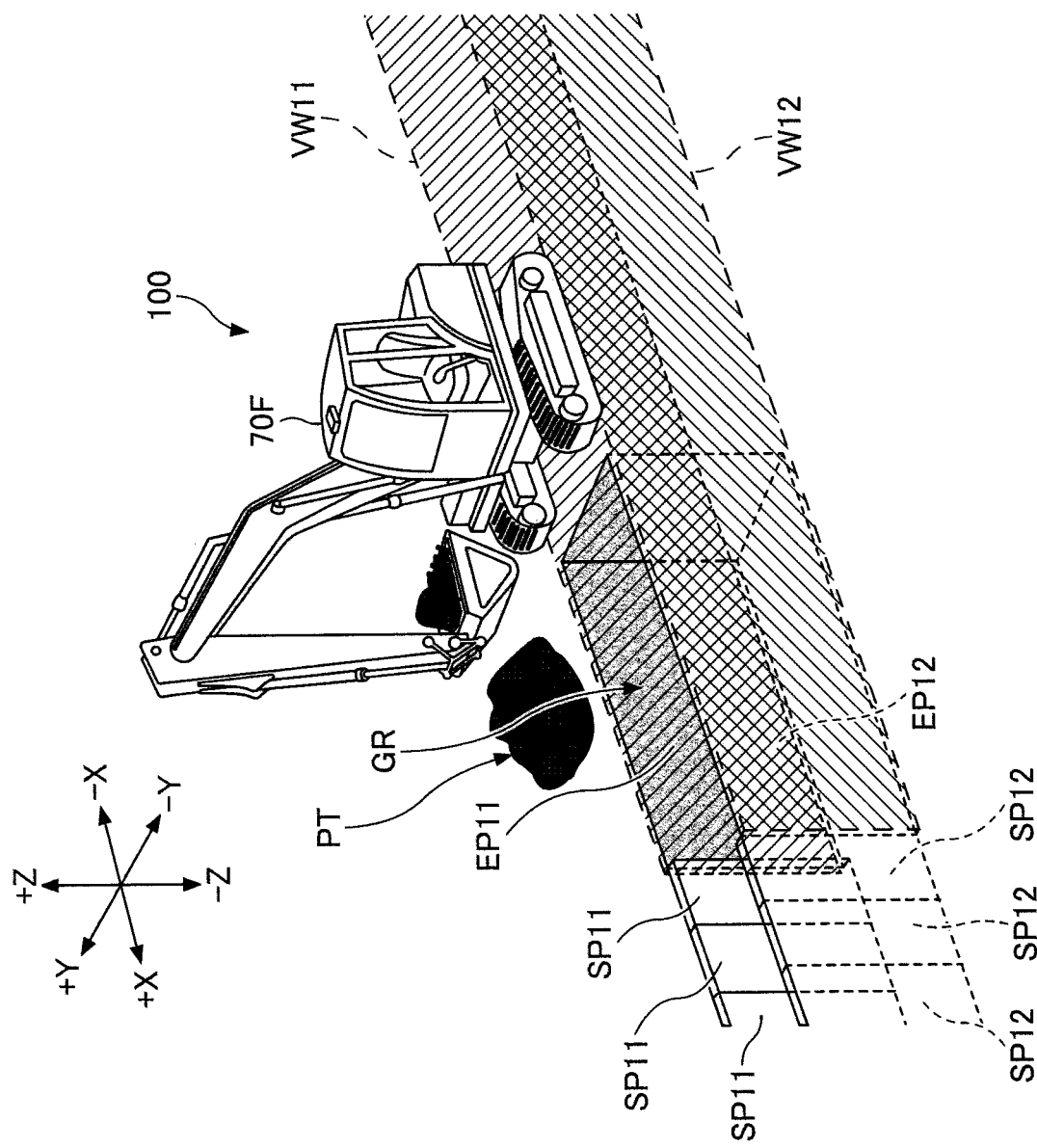
FIG. 12 is a diagram illustrating another example of the setting contents relating to the work area around the excavator.

FIG. 12 is a diagram for describing another example of a setting content relating to a work area around the excavator 100. Specifically, FIG. 12 is a perspective view of the excavator 100 illustrating the setting content relating to the work area around the excavator 100 set through the setting screen 1100 of FIG. 11. More specifically, FIG. 12 is a diagram illustrating target construction surfaces VW11 and VW12 and a waste soil disposal target position PT set through the setting screen 1100 of FIG. 11. Hereinafter, in the present example, the explanation will proceed on the assumption that a machine guidance function and a machine control function are enabled.

As illustrated in FIG. 12, in the present example, the groove GR that has already been drilled is located in front of the excavator 100, and the sheet piles SP (sheet piles SP11 of the +Y side wall in the figure and sheet piles SP12 of the −Y side wall in the figure) are installed on the right and left (the +Y side and −Y side in the figure) walls of the groove GR. Then, the virtual walls VW (the target construction surface VW11 corresponding to the +Y side wall in the figure and the target construction surface VW12 corresponding to the −Y side wall in the figure) corresponding to the walls of the groove GR in a manner in which the back surface of the sheet piles SP on the right and left sides of the walls are extended to the back side (the −X side in the figure) with the upper turning body 3, are set as a reference.

Similar to the example of the excavator 100 described above (FIGS. 8A and 8B), the operator can confirm the setting content of the work area including the virtual wall VW (target construction surfaces VW11 and VW12) through the view mode confirmation screen displayed on the display device D1.

The controller 30 may notify an operator or the like of the distance between the target construction surfaces VW11 and VW12 corresponding to the right and left walls of the groove GR and the control target portion such as the claw tip of the bucket 6, through the display device D1, the voice sound output device D2, or the like. Accordingly, the operator, etc., can perform the drilling work so that the claw tip, etc., of the bucket 6 do not pass across the target construction surface, according to the notified content. Therefore, as illustrated in FIG. 12, the operator or the like can further proceed with the drilling work from the position where the sheet piles SP are installed using the excavator 100 and perform construction on drilling surfaces EP (a drilling surface EP11 on the +Y side and a drilling surface EP12 on the −Y side illustrated in the figure) (corresponding to the walls of the groove GR) in a manner substantially matching the target construction surfaces VW11 and VW12.

The controller 30 may operate the attachment AT so that the claw tip of the bucket 6 moves along a target trajectory such that the claw tip does not pass across the target construction surfaces VW11 and VW12 in accordance with the operation at the operation device 26 by an operator or the like. Accordingly, the drilling surfaces EP11 and EP12 substantially matching the target construction surfaces VW11 and VW12 can be easily constructed by an operator or the like using the excavator 100.

Further, the controller 30 may move the upper turning body 3 and the attachment AT so that the control target portion, such as the claw tip of the bucket 6, moves along the target trajectory such that the bucket 6 moves above the waste soil disposal target position PT in the case where a boom raising and turning operation is performed with a turning operation in the direction toward the waste soil disposal target position (in the present example, a turning operation in the right direction) through the operation device 26. Thus, the operator or the like can easily move the bucket 6 above the waste soil disposal target position PT and dispose the earth and sand contained in the bucket 6 as a result of the drilling work of the groove GR.

<Another Example of the Operation Device>

Next, another example of the operation device 26 of the excavator 100 will be described with reference to FIG. 13.

Figure 13:
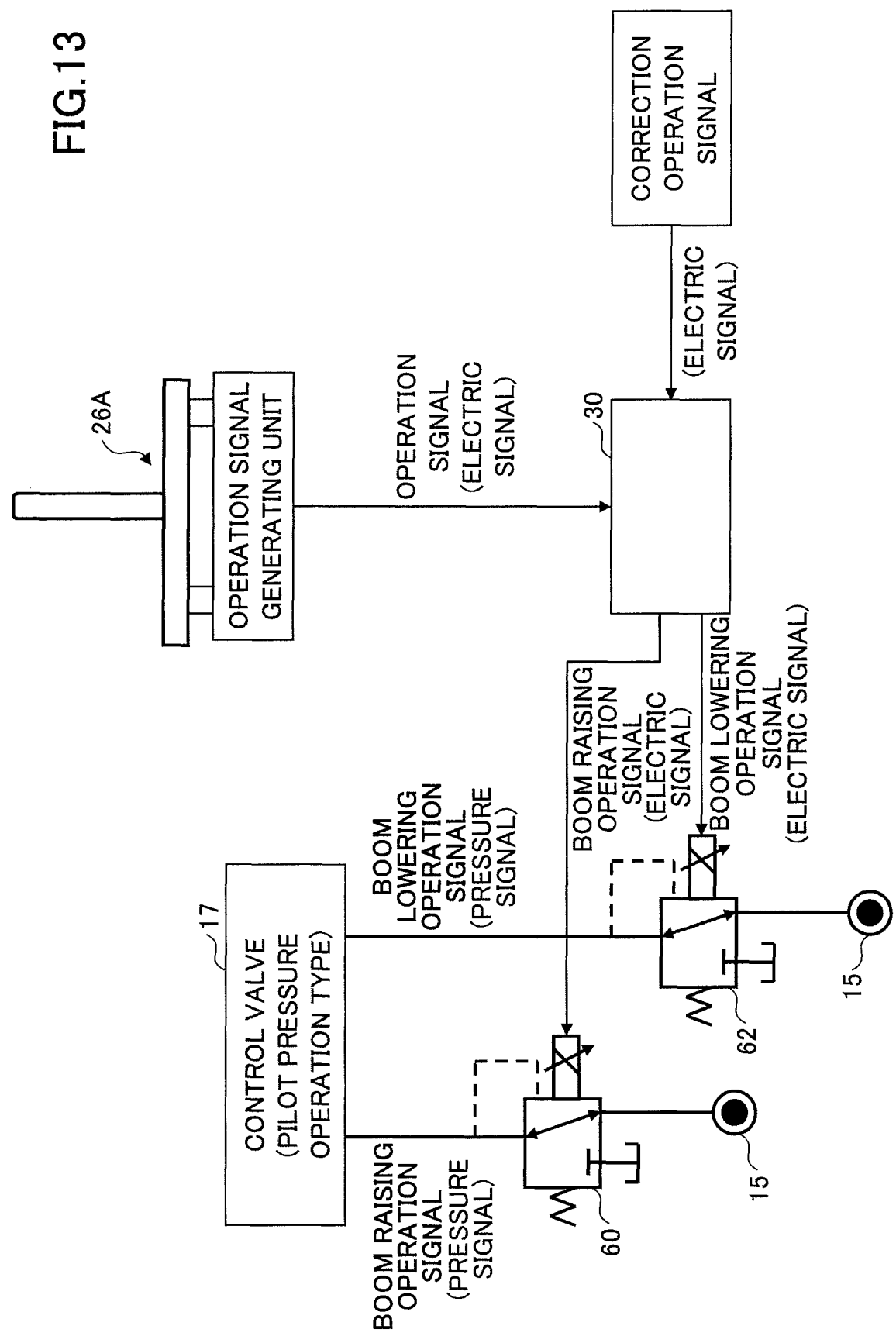
FIG. 13 is a diagram illustrating another example of an operation device.

FIG. 13 is a diagram illustrating another example of the operation device 26. Specifically, FIG. 13 is a diagram illustrating a specific example of a pilot circuit in which a pilot pressure is applied to the control valves 17 (the control valves 175L and 175R) for controlling the hydraulic pressure of the boom cylinder 7 based on an operation of the boom operation lever 26A of an electric type.

The pilot circuit for controlling the hydraulic pressure of the arm cylinder 8 and the bucket cylinder 9 is represented in the same manner as the pilot circuit of FIG. 13 for controlling the hydraulic pressure of the boom cylinder 7. A pilot circuit for controlling the hydraulic pressure of the traveling hydraulic motors 1L and 1R for driving the lower traveling body 1 (the respective crawlers on the left and right) is also represented in the same manner as in FIG. 13. A pilot circuit for controlling the hydraulic pressure of the turning hydraulic motor 2A for driving the upper turning body 3 is also represented in the same manner as in FIG. 13. Thus, the illustration of these pilot circuits is omitted.

As illustrated in FIG. 13, the operation device 26 of at least one of the example and the other example of the excavator 100 described above may be an electrical type that outputs an electrical signal corresponding to the operation content thereof.

The pilot circuit in this example includes a solenoid valve 60 for a boom raising operation and a solenoid valve 62 for a boom lowering operation.

The solenoid valve 60 is configured to adjust the pressure of the hydraulic oil in the oil path (pilot line) which connects the pilot pump 15 and the pilot port on the boom raising side of the control valve 17 that is a pilot pressure operated type (specifically, the control valves 175L and 175R (see FIG. 9)).

The solenoid valve 62 is configured to adjust the pressure of the hydraulic oil in the oil path (pilot line) which connects the pilot pump 15 and the pilot port on the lowering side of the control valve 17 (the control valves 175L and 175R).

When the boom 4 (the boom cylinder 7) is manually operated, the controller 30 generates a boom raising operation signal (electrical signal) or a boom lowering operation signal (electrical signal) in response to an operation signal (electrical signal) output by the boom operation lever 26A (operation signal generating unit). The operation signal (electrical signal) output from the boom operation lever 26A represents the operation content thereof (e.g., the operation amount and the operation direction), and the boom raising operation signal (electrical signal) and the boom lowering operation signal (electrical signal) output by the operation signal generating unit of the boom operation lever 26A varies according to the operation content (the operation amount and the operation direction) of the boom operation lever 26A.

Specifically, when the boom operation lever 26A is operated in the boom raising direction, the controller 30 outputs a boom raising operation signal (an electrical signal) corresponding to the amount of operation thereof to the solenoid valve 60. The solenoid valve 60 operates in response to the boom raising operation signal (electrical signal) and controls a pilot pressure acting on the pilot port on the boom raising side of the control valve 175, that is, the boom raising operation signal (pressure signal). Similarly, when the boom operation lever 26A is operated in the boom lowering direction, the controller 30 outputs a boom lowering operation signal (an electrical signal) corresponding to the amount of operation thereof to the solenoid valve 62. The solenoid valve 62 operates in response to the boom lowering operation signal (an electrical signal) and controls a pilot pressure acting on the pilot port at the boom lowering side of the control valve 175, that is, the boom lowering operation signal (a pressure signal). Thus, the control valve 17 can realize the operation of the boom cylinder 7 (the boom 4) according to the operation content of the boom operation lever 26A.

On the other hand, when the boom 4 (the boom cylinder 7) automatically operates based on the automatic operation function, the controller 30 generates, for example, a boom raising operation signal (electrical signal) or a boom lowering operation signal (electrical signal) according to a correction operation signal (electrical signal), regardless of the operation signal (electrical signal) output by the operation signal generating unit of the boom operation lever 26A. The correction operation signal may be an electrical signal generated by the controller 30 or an electrical signal generated by a control device or the like other than the controller 30. Thus, the control valve 17 can realize an operation of the boom 4 (the boom cylinder 7) according to the correction operation signal (electrical signal) corresponding to the automatic operation function.

Similarly, when the boom 4 (boom cylinder 7) is remotely operated, the controller 30 generates, for example, a boom raising operation signal (electrical signal) or a boom lowering operation signal (electrical signal) according to the correction operation signal (electrical signal), regardless of the operation signal (electrical signal) output by the operation signal generating unit of the boom operation lever 26A. The correction operation signal is generated, for example, based on a remote operation signal received from a predetermined external device (e.g., a management apparatus 300 described below). Thus, the control valve 17 can realize the operation of the boom 4 (the boom cylinder 7) according to the remote operation signal.

The operation of the arm 5 (the arm cylinder 8), the bucket 6 (the bucket cylinder 9), the upper turning body 3 (the turning hydraulic motor 2A), and the lower traveling body 1 (traveling hydraulic motors 1L and 1R) based on the same pilot circuit may be the same as the operation of the boom 4 (the boom cylinder 7).

Thus, when the operation device 26 of an electric type is employed, the controller 30 can more easily perform the automatic and remote operation functions of the excavator 100 than when the operation device 26 of a hydraulic pilot type is employed.

<Excavator Management System>

Next, an excavator management system SYS will be described with reference to FIG. 14.

As illustrated in FIG. 14, the excavator 100 of the example and the other example described above may be included in the excavator management system SYS.

The excavator management system SYS includes the excavator 100, a terminal apparatus 200, and the management apparatus 300. The excavator 100 included in the excavator management system SYS may be one or more excavators. The terminal apparatus 200 included in the excavator management system SYS may be one or more apparatuses.

In the excavator 100, a predetermined communication device is mounted, to be communicatively connected to the management apparatus 300 through a predetermined communication line NW. The excavator 100 may also be communicatively connected to the terminal apparatus 200 through the communication line NW. The communication line NW may, for example, include a mobile communication network with a base station at the end thereof. The communication line NW may also include, for example, a satellite communication network using a communication satellite. The communication line NW may also include, for example, an Internet network. The communication line NW may also include a short distance communication network such as Bluetooth (registered trademark) or Wi-Fi.

The excavator 100 uploads various kinds of information acquired by the controller 30 (hereinafter, the "excavator information") to the management apparatus 300 through the communication line NW. At this time, the excavator 100 may transmit the excavator information to the management apparatus 300 together with information concerning the date and time when the excavator information is acquired (hereinafter, the "acquisition date and time information"). Accordingly, the management apparatus 300 can recognize the date and time when the excavator information is acquired. The excavator 100 may upload the excavator information to the management apparatus 300 upon receiving a request from the management apparatus 300, or may automatically and periodically upload the excavator information at predetermined timings.

The excavator information uploaded to the management apparatus 300 may include output of various sensors (e.g., the sensors S1 to S5, the object detection device 70, the imaging device 80, etc.) mounted to the excavator 100. The excavator information may include information concerning the control state of various devices mounted to the excavator 100 (for example, control commands output from the controller 30 to the proportional valve 31).

The terminal apparatus 200 is used by a person related to the excavator 100. A user of the terminal apparatus 200 (a person related to the excavator 100) may be, for example, an owner of the excavator 100, a manager of the excavator 100, a supervisor of the site of the excavator 100, an operator of the excavator 100, or the like. The terminal apparatus 200 may be, for example, a portable terminal, such as a cellular phone, a smartphone, a tablet terminal, a laptop computer terminal, or the like. The terminal apparatus 200 may be, for example, a stationary terminal, such as a desktop type computer terminal.

The terminal apparatus 200 is communicatively connected to the management apparatus 300 through the communication line NW. The terminal apparatus 200 may be communicatively connected to the excavator 100 through the communication line NW.

The terminal apparatus 200 includes, for example, a display device such as a liquid crystal display (LCD) or an organic EL display (EL) and a voice sound output device such as a speaker to provide various kinds of information to a user. The terminal apparatus 200, for example, receives information concerning the excavator 100 distributed from the management apparatus 300 (for example, the excavator information described above or processed information generated based on the excavator information) and provides the information to a user through a display device or a voice sound output device. The terminal apparatus 200 may receive excavator information directly distributed from the excavator 100 and provide the excavator information to a user through a display device or a voice sound output device, for example. The information distributed from the management apparatus 300 or the excavator 100 may include, for example, image information of the excavator 100 captured by the imaging device 80 in substantially real time. Thus, the user of the terminal apparatus 200 can remotely recognize the on-site status of the excavator 100.

The terminal apparatus 200 may also be configured to remotely operate the excavator 100. Specifically, the terminal apparatus 200 displays the image information captured by the imaging device 80 distributed from the management apparatus 300 or the excavator 100 on the display device, and the user may perform remote operation of the excavator 100 while viewing the image information. In this case, the user may use an operation input means (e.g., a touch panel, a touch pad, a joystick, etc.) mounted on the terminal apparatus 200 or communicatively connected to the terminal apparatus 200. The terminal apparatus 200 transmits a remote operation signal, including the contents of the remote operation, directly or indirectly through the management apparatus 300, to the excavator 100 through the communication line NW. This allows the excavator 100 to operate according to the remote operation signals from the terminal apparatus 200 under the control of the controller 30 as described above. The terminal apparatus 200 may display the same display contents as those of the setting screen (for example, the setting screens 600 and 1100) and the confirmation screen (for example, the setting confirmation images 820, 870 and 880) corresponding to the setting mode and the view mode in the above-described display device D1. Accordingly, the user can make settings relating to the work area around the excavator 100 and confirm the setting content through the terminal apparatus 200.

The management apparatus 300 is disposed outside the excavator 100 and, for example, manages various states of the excavator 100 (e.g., the motion state, the control state, the presence or absence of abnormalities, etc.). The management apparatus 300 is, for example, a server installed at a different location from the work site where the excavator 100 performs the work. The server can be a cloud server or an edge server. The management apparatus 300 may be, for example, an edge server or a management terminal disposed at a management office of a work site where the excavator 100 performs work. The management terminal may be, for example, a desktop type computer terminal installed in a management office or a portable terminal (e.g., a tablet terminal, a laptop computer terminal, or the like) which can be portable by a manager or the like at a work site.

The management apparatus 300 receives excavator information transmitted (uploaded) from the excavator 100 and stores the information in a non-volatile storage device for each excavator 100 and in a manner that can be extracted in time series. The storage device may be an internal storage device of the management apparatus 300 or an external storage device that is communicatively connected.

The management apparatus 300 performs management of various states of the excavator 100 based on, for example, excavator information. The management apparatus 300 generates control information of the excavator 100 based on, for example, the latest excavator information and transmits the information to the excavator 100 through the communication line NW. The management apparatus 300, for example, provides the terminal apparatus 200 with the excavator information or processed information generated from the excavator information, through the communication line NW.

The management apparatus 300 may also be configured to remotely operate the excavator 100. Specifically, the management apparatus 300 displays the image information of the imaging device 80 distributed from the excavator 100 on a display device such as a liquid crystal display or an organic EL display, and the operator of the remote operation may remotely operate the excavator 100 while viewing the image information. At this time, the operator of the remote operation may use an operation input means for remote operation provided in the management apparatus 300 (for example, a general-purpose operation device such as a touch panel, a touch pad, a joystick, or the like, or a special-purpose operation device simulating the operation device 26). The management apparatus 300 transmits a remote operation signal, including the contents of the remote operation, to the excavator 100 through the communication line NW. This allows the excavator 100 to operate in response to the remote operation signals from the management apparatus 300 under the control of the controller 30 as described above. The management apparatus 300 may display the same display contents as the setting screens (for example, the setting screens 600 and 1100) and the confirmation screens (for example, the setting confirmation images 820, 870 and 880) corresponding to the setting mode and the view mode in the above-described display device D1. Thus, the operator of remote operation can make settings relating to the work area around the excavator 100 and confirm the setting contents, through the management apparatus 300.

<Operations>

Next, the overall operations of the excavator 100 according to the above-described embodiment will be described.

In the present embodiment, the excavator 100 includes the display device D1 for displaying an image (hereinafter, a "work area image") representing a work area around the excavator 100. In this case, the work area image is, for example, an image captured by the imaging device 80 or a conversion image in which a predetermined conversion process or the like is performed on the captured image. The display device D1 displays the work area image in such a state that the coordinates predetermined for the work area are associated with an image component portion (for example, a pixel) included in the work area image.

Thus, for example, by performing an operation to specify a certain pixel in a captured image on the setting screen 600, the operator, etc., can specify a portion of the work area corresponding to the coordinates associated with the pixel, that is, a portion of the work area appearing at the pixel. Accordingly, the operator or the like may instruct the controller 30 about any position in the work area around the excavator 100 without performing any additional work such as attaching an identification mark to an object around the excavator 100 to cause the excavator 100 to recognize the object, and the controller 30 can make settings relating to the work area based on the instructed position. Accordingly, the controller 30 can make settings relating to the work area while considering workability.

The work area image may be an image based on the output of the other sensors rather than the output (the captured image) of the imaging device 80. For example, the work area image may be a distance image based on output of, for example, a LIDAR or a millimeter wave radar included in the object detection device 70. The image component portion may be an image component section that is a larger unit than a pixel, for example, a predetermined number of pixels may be one section. In this case, the sizes of the respective image component sections may all be the same or may be at least partially different.

In the present embodiment, the controller 30 may make settings relating to a portion of the work area corresponding to the coordinates associated with the image component portion specified by the operation input relating to the work area image displayed on the display device D1.

Accordingly, the controller 30 can specifically specify a portion of the work area corresponding to a specified image component portion in a work area image according to an operation by an operator or the like, and make settings relating to the portion of the work area.

In the present embodiment, the display device D1 may display the work area image, in a state where the coordinates corresponding to the position of a predetermined object (e.g., the road cone RC) detected in the work area around the excavator 100, and the image component portion of the work area image corresponding to the object, are associated with each other.

Thus, for example, the operator, etc., can specify an object that is located at the coordinates corresponding to the specified pixel by an operation of specifying a pixel of the image portion in which the object in the captured image in the setting screen 600 is appearing (included). Therefore, the operator or the like may instruct the controller 30 about the position of a predetermined object in the work area around the excavator 100 without performing additional work such as attaching an identification mark to an object around the excavator 100 and having the excavator 100 recognize the object, and the controller 30 can make settings relating to the work area based on the specified object position. Accordingly, the controller 30 can make settings relating to the work area while considering workability.

In the present embodiment, the controller 30 may make settings relating to the object corresponding to the coordinates associated with the image component portion specified by the operation input relating to the work area image displayed on the display device D1.

Thus, the controller 30 can make settings for making an object corresponding to an image component portion specified according to an operation by an operator or the like as an avoidance object, a target object, or the like, when work is performed by the excavator 100.

In the present embodiment, the controller 30 may set, as a target relating to work, a portion of the work area identified by the coordinates associated with the image component portion specified by the operation input relating to the work area image.

Thus, for example, the controller 30 can set, as the waste soil disposal target position, etc., the ground portion, etc., of the work area corresponding to the image component portion specified according to the operation of an operator, etc.

In the present embodiment, the controller 30 may set, as a target relating to work, an object that is positioned at coordinates associated with an image component portion specified by an operation input relating to the work area image, or may set a target relating to work based on the object.

This allows the controller 30 to set, as a target relating to the work (e.g., a dump truck target for loading waste soil), for example, an object corresponding to an image component portion that is specified, according to the operation of an operator. The controller 30 may, for example, set a target relating to the work based on an object corresponding to an image component portion that is specified according to an operation by an operator or the like (for example, set a target construction surface based on a specified sheet pile).

In the present embodiment, the controller 30 may set an object positioned at coordinates associated with an image component portion specified by an input operation relating to the work area image as an avoidance object relating to work or may set an avoidance object relating to work based on the object.

Thus, the controller 30 can set an object (e.g., a road cone RC, a utility pole, etc.) corresponding to an image component portion specified according to an operation of an operator, etc., as an avoidance object relating to work. The controller 30 may, for example, set an avoidance object relating to work (e.g., a virtual wall that does not exist) based on an object (e.g., a road cone, a utility pole, or the like) corresponding to an image component portion specified according to an operation by an operator or the like.

According to the present embodiment, when an operation (for example, a pinch-in operation, a pinch-out operation, a flick operation, a swipe operation, or the like) of changing the area to be displayed on the display unit D1 in the work area image (for example, an image captured by the imaging device 80) is performed, the association relationship between the coordinates that are predefined for the work area and the image component portion included in the work area image is changed in accordance with the change of the area of the work area image to be displayed on the display unit D1.

Accordingly, even when the area displayed on the display device D1 in the work area image is changed, the operator or the like can appropriately instruct (specify) any position of the work area around the excavator 100 to the controller 30.

In the present embodiment, the controller 30 may specify an avoidance object section (for example, the virtual wall VW) corresponding to the coordinates associated with the image component portion specified by the operation input. The display device D1 may display a distance from the excavator to the avoidance object section (for example, the distance notification images 876 and 877).

Accordingly, the operator can operate the excavator 100 while more specifically recognizing the distance between the excavator and the avoidance object section displayed on the display device D1.

According to one embodiment of the present invention, an excavator capable of making settings relating to the work area while considering the workability, can be provided.

The excavator is not limited to the specific embodiments described in the detailed description, and variations and modifications may be made without departing from the spirit and scope of the present invention.

What is claimed is:

1. An excavator comprising:
   a display device; and
   a hardware processor configured to
      associate coordinates predefined for a work area around the excavator with an image component portion included in an image representing the work area and display the image on the display device with the image component portion being associated with the coordinates, and
      make a setting relating to a part of the work area in response to an input operation specifying the image component portion, the part of the work area corresponding to the coordinates associated with the specified image component portion.

2. The excavator according to claim 1, wherein the hardware processor is configured to display the image on the display device with the image component portion corresponding to a predetermined object detected in the work area being associated with the coordinates corresponding to a position of the predetermined object.

3. The excavator according to claim 2, wherein the predetermined object is detected based on a predetermined model.

4. The excavator according to claim 2, wherein the hardware processor is configured to make the setting relating to the predetermined object, the predetermined object corresponding to the coordinates associated with the specified image component portion.

5. The excavator according to claim 1, wherein the hardware processor is configured to set, as a target relating to work, the part of the work area identified by the coordinates associated with the specified image component portion.

6. The excavator according to claim 4, wherein the hardware processor is configured to set, as a target relating to work, the predetermined object positioned at the coordinates associated with the specified image component portion or to set a target relating to work based on the predetermined object.

7. The excavator according to claim 4, wherein the hardware processor is configured to set, as an avoidance object relating to work, the predetermined object positioned at the coordinates associated with the specified image component portion or to set an avoidance object relating to work based on the predetermined object.

8. The excavator according to claim 1, wherein an association relationship between the coordinates and the image component portion is changed in accordance with a change in an area of the image to be displayed on the display device, upon detecting that an operation to change the area of the image to be displayed on the display device is performed.

9. The excavator according to claim 1, wherein
   the hardware processor is configured to set an avoidance object section corresponding to the coordinates associated with the specified image component portion; and
   display a distance from the excavator to the avoidance object section on the display device.

10. A display device for an excavator, wherein
   the display device is configured to display an image representing a work area around the excavator
   with an image component portion included in the displayed image being associated with coordinates predefined for the work area, and
   a setting is made in relation to a part of the work area in response to an input operation specifying the image component portion on the display device, the part of the work area corresponding to the coordinates associated with the specified image component portion.

11. The display device according to claim 10, wherein the display device is configured to display the image with the image component portion corresponding to a predetermined object detected in the work area being associated with the coordinates corresponding to a position of the predetermined object.

12. A terminal apparatus comprising:
   a display device configured to display an image representing a work area around the excavator
   with an image component portion included in the image being associated with coordinates predefined for the work area,
   wherein a setting is made in relation to a part of the work area in response to an input operation specifying the image component portion on the display device, the part of the work area corresponding to the coordinates associated with the specified image component portion.

* * * * *